United States Patent
Kamada et al.

(10) Patent No.: US 7,982,702 B2
(45) Date of Patent: Jul. 19, 2011

(54) LIQUID CRYSTAL DISPLAY DEVICE WITH IMPROVED VIEWING ANGLE CHARACTERISTICS

(75) Inventors: Tsuyoshi Kamada, Kawasaki (JP); Arihiro Takeda, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 1135 days.

(21) Appl. No.: 11/068,715

(22) Filed: Mar. 1, 2005

(65) Prior Publication Data

US 2005/0253797 A1    Nov. 17, 2005

(30) Foreign Application Priority Data

Apr. 30, 2004  (JP) .................. 2004-134954

(51) Int. Cl.
- *G09G 3/36* (2006.01)
- *G09G 5/10* (2006.01)
- *G02F 1/1343* (2006.01)

(52) U.S. Cl. .............. 345/89; 345/690; 349/144
(58) Field of Classification Search .............. 345/690, 345/89, 698, 695, 90; 349/56, 144
See application file for complete search history.

(56) References Cited

U.S. PATENT DOCUMENTS

| | | | | |
|---|---|---|---|---|
| 5,610,739 A | * | 3/1997 | Uno et al. | 349/39 |
| 5,677,741 A | * | 10/1997 | Yui | 348/649 |
| 5,847,688 A | * | 12/1998 | Ohi et al. | 345/98 |
| 6,297,791 B1 | * | 10/2001 | Naito et al. | 345/89 |
| 6,424,398 B1 | * | 7/2002 | Taniguchi | 349/143 |
| 6,909,485 B2 | | 6/2005 | Yoon et al. | |
| 6,922,183 B2 | * | 7/2005 | Ting et al. | 345/87 |
| 6,965,365 B2 | * | 11/2005 | Nakamura | 345/87 |
| 7,113,159 B2 | * | 9/2006 | Sawabe | 345/89 |
| 7,355,666 B2 | * | 4/2008 | Song et al. | 349/144 |
| 7,466,298 B2 | * | 12/2008 | Sawabe | 345/89 |
| 2004/0174320 A1 | * | 9/2004 | Matthijs et al. | 345/30 |

FOREIGN PATENT DOCUMENTS

| | | |
|---|---|---|
| CN | 1482501 | 3/2004 |
| JP | 3-122621 | 5/1991 |
| JP | 4-348324 | 12/1992 |
| JP | 5-066412 | 3/1993 |
| JP | 5-107556 | 4/1993 |
| JP | 06-332009 | 12/1994 |
| JP | 7-013191 | 1/1995 |
| JP | 7-072509 | 3/1995 |
| JP | 7-191634 | 7/1995 |
| JP | 8-507880 | 8/1996 |
| JP | 2947350 | 7/1999 |
| JP | 2000-235371 | 8/2000 |
| JP | 2002-072985 | 3/2002 |

* cited by examiner

*Primary Examiner* — William L Boddie
(74) *Attorney, Agent, or Firm* — Kratz, Quintos & Hanson, LLP

(57) ABSTRACT

A liquid crystal display device, in which the liquid crystal molecules are aligned vertically when no voltage is applied, includes pixels each having plural sub-pixel electrodes, a data bus drive circuit for applying drive signals to the sub-pixel electrodes via a data bus line and a switching element, and alignment regulation structure for regulating the direction of alignment of liquid crystal molecules. The first and second sub-pixel electrodes have different areas. The data bus drive circuit applies a first drive signal, which causes luminance to change from minimum to maximum for an increase of input grayscale of image signal, to the first sub-pixel electrode, and a second drive signal, which causes the luminance to be lower than the first drive signal, to the second sub-pixel electrode.

14 Claims, 37 Drawing Sheets

Grayscale Conversion Table (Area 1:2)

Sub-pixel Electrode Area Ratio 1: 3

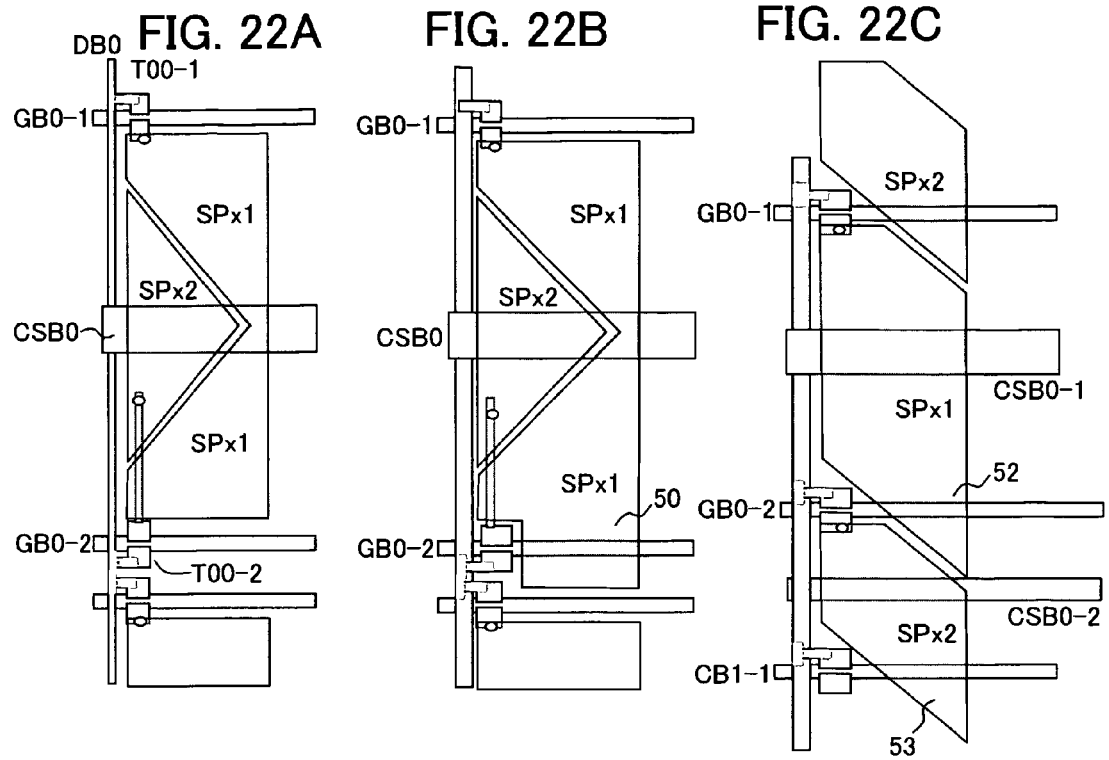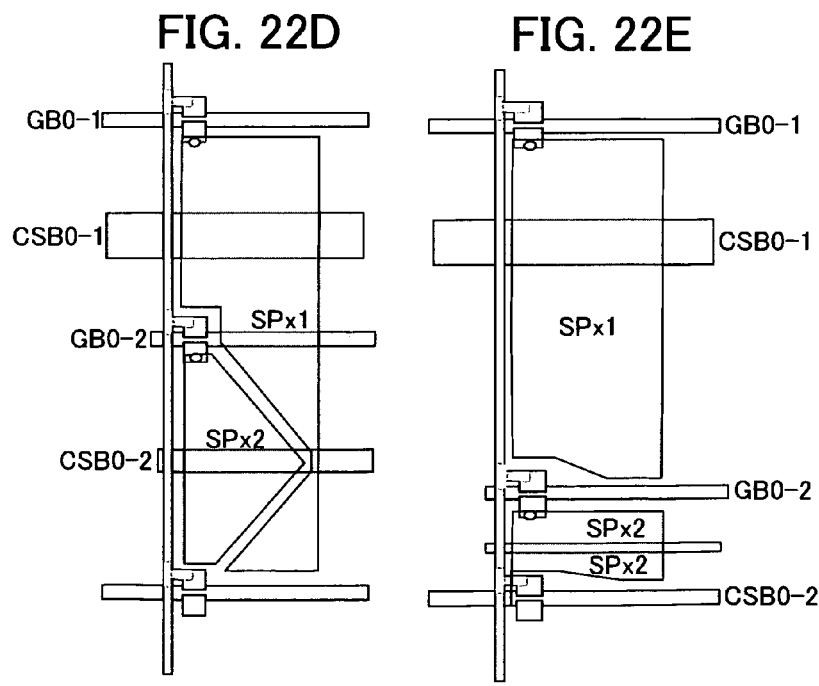

FIG. 30 Grayscale Conversion Table (Areas 1:2:4)

|  | AR1 | AR2 | AR3 | AR4 | AR5 | AR6 | AR7 |
|---|---|---|---|---|---|---|---|
| DoutS | 1 | 0 | 1 | 0 | 1 | 0 | 1 |
| DoutM | 0 | 1 | 1 | 0 | 0 | 1 | 1 |
| DoutL | 0 | 0 | 0 | 1 | 1 | 1 | 1 |

Third Embodiment

Grayscale Conversion Table (Area 1:2, 2:1, pattern B)

Grayscale Conversion Table (Area 1:2, 2:1, pattern C)

Grayscale Conversion Table (Area 1:2, 2:1, pattern B)

Pattern A : Small Luminance
Pattern B : Medium Luminance
Pattern C : Large Luminance

FIG. 42A

|   | ① | ② | ③ | ④ | ⑤ | ⑥ | ⑦ |
|---|---|---|---|---|---|---|---|
| R | 120 | 120 | 120 | 120 | 120 | 120 | 120 |
| G | 117 | 118 | 119 | 120 | 121 | 122 | 123 |
| B | 0 | 0 | 0 | 0 | 0 | 0 | 0 |

FIG. 42B

|         | ① | ② | ③ | ④ | ⑤ | ⑥ | ⑦ |
|---------|---|---|---|---|---|---|---|
| R Table | C | C | C | B | B | B | B |
| G Table | B | B | B | B | C | C | C |
| B Table | A | A | A | A | A | A | A |

FIG. 42C

When grayscales are close within n levels, it is deemed to be "equal"    (n=1)

|         | ① | ② | ③ | ④ | ⑤ | ⑥ | ⑦ |
|---------|---|---|---|---|---|---|---|
| R Table | C | C | B | B | B | B | B |
| G Table | B | B | B | B | B | C | C |
| B Table | A | A | A | A | A | A | A |

Pattern A : Small Luminance
Pattern B : Medium Luminance
Pattern C : Large Luminance

Fifth Emdodiment

FIG. 48
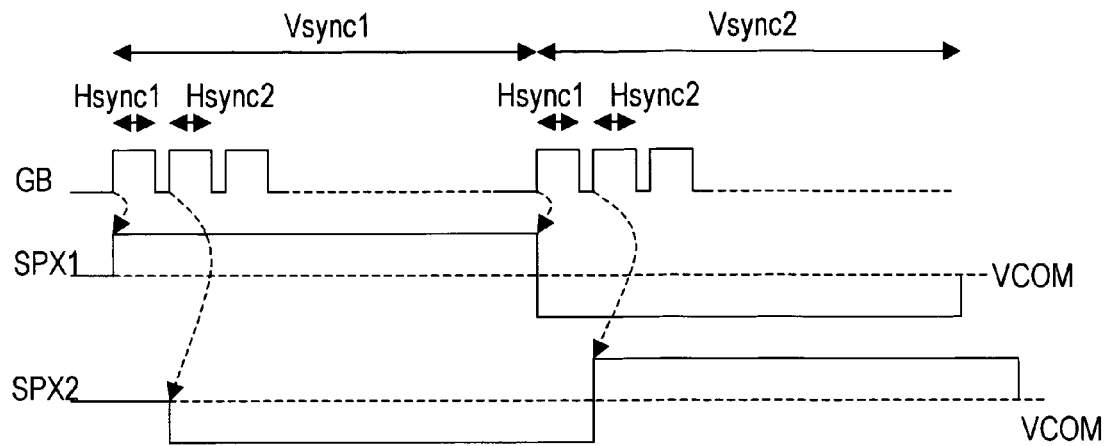
FIG. 49   Sixth Embodiment
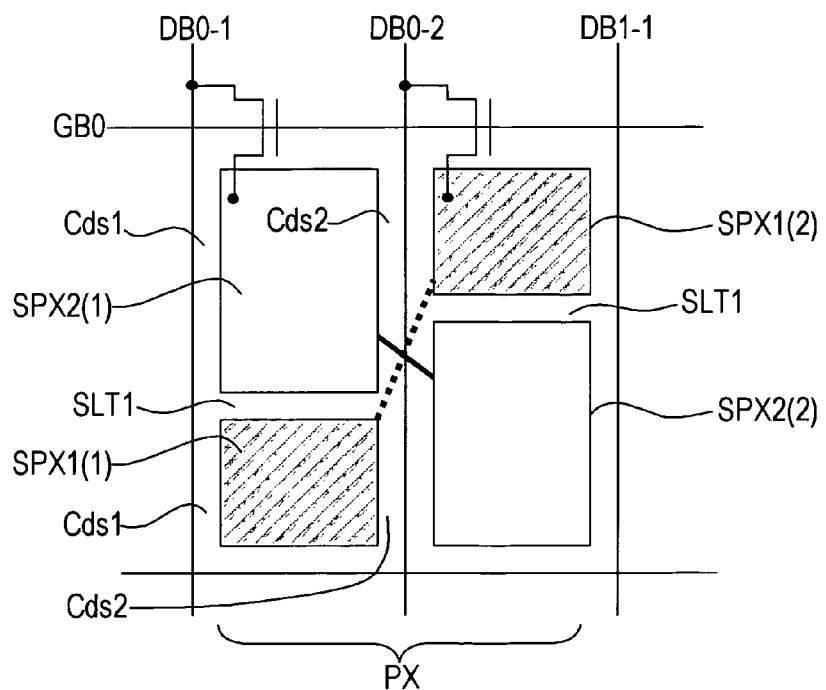

Seventh Embodiment

LIQUID CRYSTAL DISPLAY DEVICE WITH IMPROVED VIEWING ANGLE CHARACTERISTICS

CROSS-REFERENCE TO RELATED APPLICATIONS

This application is based upon and claims the benefit of priority from the prior Japanese Patent Application No. 2004-134954, filed on Apr. 30, 2004, the entire contents of which are incorporated herein by reference.

BACKGROUND OF THE INVENTION

1. Field of the Invention

This invention relates to a perpendicular-alignment type liquid crystal display device, and in particular to a liquid crystal display device in which viewing angle characteristics are improved, so that degradation of color reproduction of an image when viewed at an oblique angle with respect to the display screen is alleviated.

2. Description of the Related Art

Liquid crystal display devices can be classified into various display modes according to how the liquid crystal material is controlled when displaying text and images. For example, a twisted-nematic (TN) liquid crystal type is a display type utilizing nematic liquid crystals with a liquid crystal molecule twist angle of 90°, and is normally-white, with the liquid crystal molecules oriented in a horizontal direction and transmittance maximum in the state in which no voltage is applied; by applying a voltage the liquid crystal molecules are aligned in the perpendicular direction, and transmittance falls. However, in a TN-mode liquid crystal display device, viewing angles are generally narrow, and a viewing-angle broadening film or similar is necessary.

Problems with TN-type devices include the occurrence of a grayscale inversion phenomenon viewed from an oblique direction, at a low display luminance or brightness with a high voltage applied. In this grayscale inversion phenomenon, when the applied voltage is increased, grayscales change from a decreasing trend to a temporary increase, and then decrease once again. In order to suppress this decrease, halftone technologies have been proposed, in for example Japanese Patent Laid-open No. 3-122621, Japanese Patent Laid-open No. 4-348324, Japanese Patent Laid-open No. 5-66412, Japanese Patent Laid-open No. 5-107556, Japanese Patent Laid-open No. 6-332009, Japanese Patent Laid-open No. 8-507880, Japanese Patent Laid-open No. 7-13191, Japanese Patent Laid-open No. 7-72509, and Japanese Patent Laid-open No. 7-191634. In these halftone technologies, pixel electrodes are divided into a plurality of capacitively coupled subpixel electrodes, a single voltage is applied to the plurality of subpixel electrodes via a common data bus line and a thin film transistor, and due to the capacitive coupling, different voltages are applied to the subpixel electrodes, the applied voltage-transmittance characteristics are shifted, and the above-described grayscale inversion phenomenon is suppressed.

In these halftone technologies, a voltage is applied to a plurality of subpixels via capacitive coupling, so that there is the problem that the applied voltage needs to be too high. Also, there is also the problem that capacitance must be formed between electrodes in three dimensions for the capacitive coupling, so that structures become complicated. Also, because TN-type liquid crystal display devices are normally-white when a voltage is not applied, it is necessary to block light leaving from the gaps between subpixel electrodes, so that a light-blocking film to block light must be provided between subpixel electrodes within pixels; consequently the aperture ratio is reduced, and there is the problem that overall luminance is decreased. Due to such problems, products adopting halftone technologies for TN-mode devices have not yet been announced.

On the other hand, in-plane switching (IPS) type methods and vertical-alignment (VA) type methods and similar have also been proposed as techniques to realize broad viewing angles. Of these, VA type liquid crystal display devices modify the transmittance by moving liquid crystals aligned normally to the substrate in horizontal direction by application of a vertical electric field in the perpendicular direction. Normally-black operation, in which the transmittance is small (substantially 0%) when no voltage is applied, is possible, and by applying a voltage the transmittance can be increased to display white. Also, these applicants have proposed a multi-domain VA (MVA) type device, in which the direction of inclination of liquid crystal molecules is restricted to a plurality of directions within one pixel. See for example Japanese Patent Publication No. 2,947,350.

FIG. 1 through FIG. 3 are drawings to explain an MVA type liquid crystal display device. As shown in the cross-sectional view of FIG. 1, a thin film transistor (TFT) substrate 1 on which are formed TFTs to apply a voltage to pixel electrodes, data bus lines, gate bus lines and similar, and an opposing substrate 2 on which is formed a common electrode, are placed in opposition with spacers 3 and a liquid crystal layer 4 intervening; the periphery of the substrates 1 and 2 is sealed by a peripheral seal 5. Polarizing plates 6 and 7 are provided on both substrates and a mounting terminal group 8 for connection of driving circuitry and similar is formed on the TFT substrate.

FIG. 2 is a plan view of the TFT substrate 1; data bus lines DB1, DB2 are provided in the vertical direction with respect to the pixel electrodes PX1, PX2 arranged in a matrix, and are connected to the pixel electrodes PX1, PX2 respectively via the thin film transistors TFT1, TFT2, which are switching transistors. The gate bus line GB1, which controls conduction of the TFTs, and an auxiliary electrode bus line SE1 to suppress fluctuations in the voltage applied to the pixel electrodes, are provided in the horizontal direction.

FIG. 3 is a cross-sectional view which explains the perpendicular or vertical alignment of liquid crystal molecules between pixel electrode and the common electrode in an MVA type device. Pixel electrodes PX are formed on the TFT substrate 1, and projections 14 are provided on the surface of the pixel electrodes PX to regulate the alignment direction of liquid crystal molecules. An alignment film 10 is formed on the uppermost surface thereof. On the other hand, the common electrode COM, which is the opposing electrode, is formed on the opposing substrate 2, and this is covered with an alignment film 12 on which are provided projections 14 which regulate the alignment direction of liquid crystal molecules thereabove. By providing projections, liquid crystal molecules which are aligned in the perpendicular direction with no voltage applied can be caused to incline somewhat, as shown in the figure, according to the shape of the projections. Together with this, the direction of inclination of liquid crystal molecules when a voltage is applied can be restricted to the same direction. When projections which act as such alignment regulation means are not provided, the directions of inclination of liquid crystal molecules with a voltage applied are scattered, and singularities are formed in the display area; but by providing alignment regulation means, the direction of inclination of liquid crystal molecules can be restricted to a plurality of directions, and scattering of the direction of inclination can be prevented. Further, when liquid crystal molecules are inclined in only a single direction while a voltage is applied, a bias occurs in the viewing angle characteristics; but by providing alignment regulation means and causing the liquid crystal molecules to be inclined in a plurality of directions during voltage application, the above bias in viewing angle characteristics is averaged, and the viewing angle characteristics can be improved.

FIG. 4 is a cross-sectional view used to explain the vertical alignment of liquid crystal molecules between pixel electrodes and the common electrode in another MVA type device. In this example, the configuration of the TFT substrate 1 is the same as in FIG. 3, but on the opposing substrate 2, slits 20 are provided in the common electrode COM rather than projections as the alignment regulation means. By providing the slits 20, the direction of the electric field in the liquid crystal molecule layer can be inclined, the liquid crystal molecules are in a somewhat inclined state with respect to the electric field direction during voltage application, and in effect the same state as when projections are provided can be reproduced.

Projections have a greater alignment regulation effect, but entail a complex structure and cause increases in cost; provision of slits in the electrode results in a simpler structure and reduced costs.

In addition, it has been proposed (for example, in Japanese Patent Laid-open No. 2000-235371 and Japanese Patent Laid-open No. 2002-72985) that in an liquid crystal display device, each pixel electrode be divided into two subpixel electrodes, and voltages of opposite polarity be applied to the subpixel electrodes to prevent flicker. However, there are no descriptions of vertical alignment (VA) or of multi-domain vertical alignment (MVA) type devices, nor is there a description of problems specific to vertical alignment type devices.

SUMMARY OF THE INVENTION

An MVA type liquid crystal display device has broad viewing angle characteristics, and by restricting the liquid crystal molecule alignment direction to a plurality of directions, averages the bias in viewing angles and so improves the viewing angle characteristics. However, depending on the displayed image, the image as viewed from, for example, elevated 60° appears to be whitish (washout) comparing to the image viewed from the front or perpendicular direction of the display panel.

FIG. 5 illustrates the front or perpendicular direction and the direction elevated 60° relative to the display panel. The front direction 24, corresponding to the direction perpendicular to the liquid crystal display panel 22, the downward-60° direction 28 corresponding to the direction lowered 60° from the perpendicular direction, and the upward-60° direction 26 corresponding to the direction raised 60°, are considered. In the liquid crystal display panel, the design of display grayscales (luminance of each color) corresponding to the image signal to be displayed is optimized for the front or perpendicular position 24. Consequently there is the problem that a shift from the optimal grayscales occurs in the upward-60° direction 26 and downward-60° direction 28.

FIG. 6 shows the relation between liquid crystal molecules and the direction of observation. In a VA type liquid crystal display panel, the liquid crystal molecules LC are aligned in the direction perpendicular to the substrate 1. By applying a voltage across a pixel electrode and the opposing electrode, the liquid crystal molecules LC can be inclined, to change the liquid crystal layer transmittance. FIG. 6 illustrates the state in which the liquid crystal molecules LC are inclined somewhat, and an image of low luminance is observed from the front direction 24. In this case, the liquid crystal molecules LC as seen from the upward-60° direction 26 are more prominently inclined than from the front direction 24, so that the liquid crystal layer transmittance is higher, and an image of higher luminance is observed. On the other hand, from the downward-60° direction 28, an image of reduced luminance is observed. Even in MVA type liquid crystal display panels in which the liquid crystal alignment direction is restricted to a plurality of directions and this phenomenon is suppressed, a similar problem occurs.

Thus in VA type and MVA type liquid crystal display panels, an image observed from for example the upward-60° direction has higher luminance than the image observed from the front direction. According to studies performed by these inventors, the luminance becomes higher for lower grayscales, and becomes lower for higher grayscales, and an image having a certain combination of colors will become whitish (washout) when observed from the upward-60° direction.

One object of this invention is to provide an MVA type liquid crystal display device capable of ensuring that an image observed from, for example, the upward-60° direction or another oblique direction, is more nearly like the image observed from the front direction.

A further object of this invention is to provide a liquid crystal display device which can be driven at low driving voltages, and capable of ensuring that an image observed from, for example, the upward-60° direction or another oblique direction, is more nearly like the image observed from the front direction.

In order to attain the above objects, a first aspect of the invention is a liquid crystal display device having a liquid crystal layer provided between a pair of substrates and in which liquid crystal molecules in the liquid crystal layer are aligned substantially perpendicularly in a state in which no voltage is applied, and having:

a plurality of pixels, arranged in a matrix on one of the substrates, and each having a plurality of subpixel electrodes;

a plurality of switching elements, each connected to the plurality of subpixel electrodes;

a plurality of data bus lines connected to the switching elements;

a plurality of gate bus lines, connected to the switching elements, for controlling the switching elements;

a data bus driving circuit, which supplies a driving signal to the data bus lines to apply the driving signal to the subpixel electrodes via the switching elements; and, alignment regulation structure, which regulates the direction of alignment of the liquid crystal molecules provided between the substrates in a plurality of directions; and characterized in that within each pixel, first and second subpixel electrodes with different areas are provided, and the data bus driving circuit applies to the first subpixel electrode a first driving signal which causes luminance thereof to change from low luminance to high luminance according to grayscale increase for input grayscale of the image signal, and applies to the second subpixel electrode a second driving signal which causes the luminance thereof to change from low luminance to high luminance according to the grayscale increase for the input grayscale of the image signal, and which moreover causes the luminance to be lower than the first driving signal.

Further, in order to attain the above objects, a second aspect of the invention is a liquid crystal display device having a liquid crystal layer provided between a pair of substrates and in which liquid crystal molecules in the liquid crystal layer are aligned substantially perpendicularly in a state in which no voltage is applied, and having:

a plurality of pixels, arranged in a matrix on one of the substrates, and each having a first and a second subpixel electrode;

a plurality of switching elements, each connected to the plurality of subpixel electrodes;

a plurality of data bus lines connected to the switching elements;

a plurality of gate bus lines, connected to the switching elements, for controlling the switching elements;

a data bus driving circuit, which supplies a driving signal to the data bus lines to apply the driving signal to the subpixel electrodes via the switching elements; and, alignment regulation structure, which regulates the direction of alignment of the liquid crystal molecules provided between the substrates in a plurality of directions; and characterized in that within each pixel are provided first and second subpixel electrodes, with a first slit therebetween as the alignment regulation structure, and the data bus driving circuit applies driving voltages of opposite polarities to the first and second subpixel electrodes.

By means of the first aspect, washout of an image when viewed from an oblique direction can be suppressed, to improve image quality. By means of the second aspect, the width of the slit between the subpixel electrodes can be reduced, to improve the aperture ratio.

BRIEF DESCRIPTION OF THE DRAWINGS

FIG. 22 shows examples of the configuration of subpixel electrodes with an area ratio of 2:1 in the first embodiment;

FIG. 42 shows an example of selection of a conversion table by the grayscale conversion circuit;

FIG. 48 shows a driving signal waveform in the fifth embodiment;

FIG. 49 shows the configuration of subpixel electrodes in a sixth embodiment;

DESCRIPTION OF THE PREFERRED EMBODIMENTS

Below, embodiments of this invention are explained based on the drawings. However, the technical scope of the invention is not limited to these embodiments, but extends to the description in the scope of claims and to devices equivalent thereto.

Figure 7:
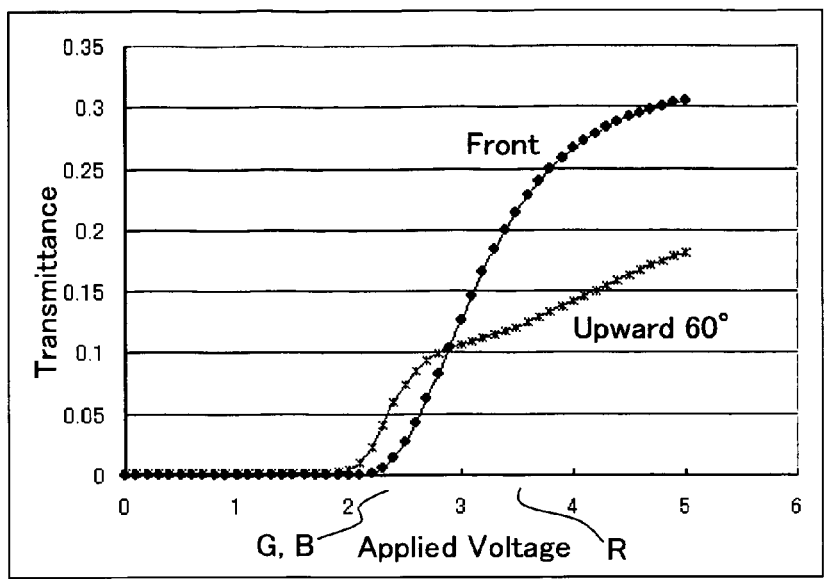
FIG. 7 shows the relation between the applied voltage and the liquid crystal layer transmittance in an MVA type liquid crystal display panel.

FIG. 7 shows the relation between the applied voltage and the liquid crystal layer transmittance in an MVA type liquid crystal display panel. In an MVA type liquid crystal display panel, in the state in which no voltage is applied, the transmittance is substantially 0% and black is displayed. The transmittance observed from the front gradually increases as the applied voltage is raised. On the other hand, the transmittance observed from the upward-60° direction first increases rapidly with rising applied voltage, and then the rate of increase drops off. Hence below a certain applied voltage, the transmittance in the upward-60° direction results in higher than from the front direction so as to be higher luminance, but when the above-described applied voltage is exceeded, the transmittance in the upward-60° direction becomes lower that from the front direction so as to be lower luminance.

Figure 8:
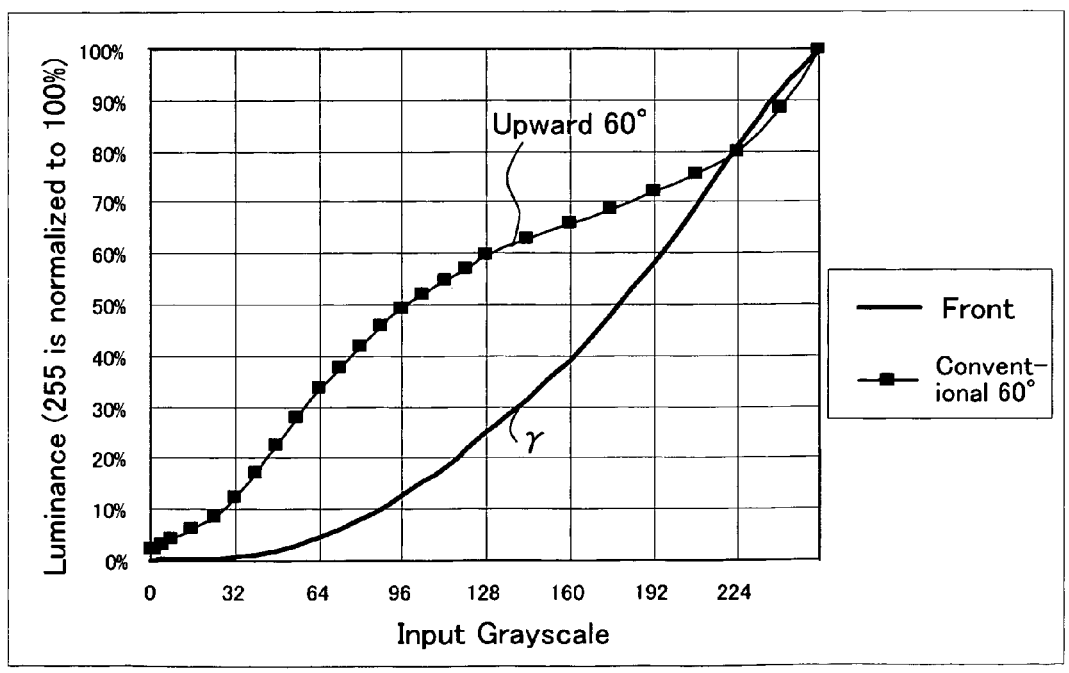
FIG. 8 shows the luminance as a function of input grayscale in an MVA type liquid crystal display panel.

FIG. 8 shows the luminance as a function of input grayscale in an MVA type liquid crystal display panel. The applied voltage in FIG. 7 is replaced with the input grayscale, and the transmittance is replaced with the luminance. The liquid crystal display device is designed so as to obtain the ideal luminance for an input grayscale in the front direction. That is, the design ensures that the luminance has the ideal γ characteristic for the input grayscale in FIG. 8, according to the relation between applied voltage and transmittance in the front direction in FIG. 7. In this case, the luminance from the upward-60° direction (in FIG. 8, the "conventional 600°" direction (that is, the direction 60° above perpendicular, in a liquid crystal display of conventional structure not employing this invention)) is higher than that from the front direction in the low input grayscale region, and becomes lower than from the front direction in the high input grayscale region. Due to such a luminance characteristic in the upward-60° direction, an image comprising a prescribed combination of luminance appears to be washed-out when observed from the upward-60° direction.

Figure 9:
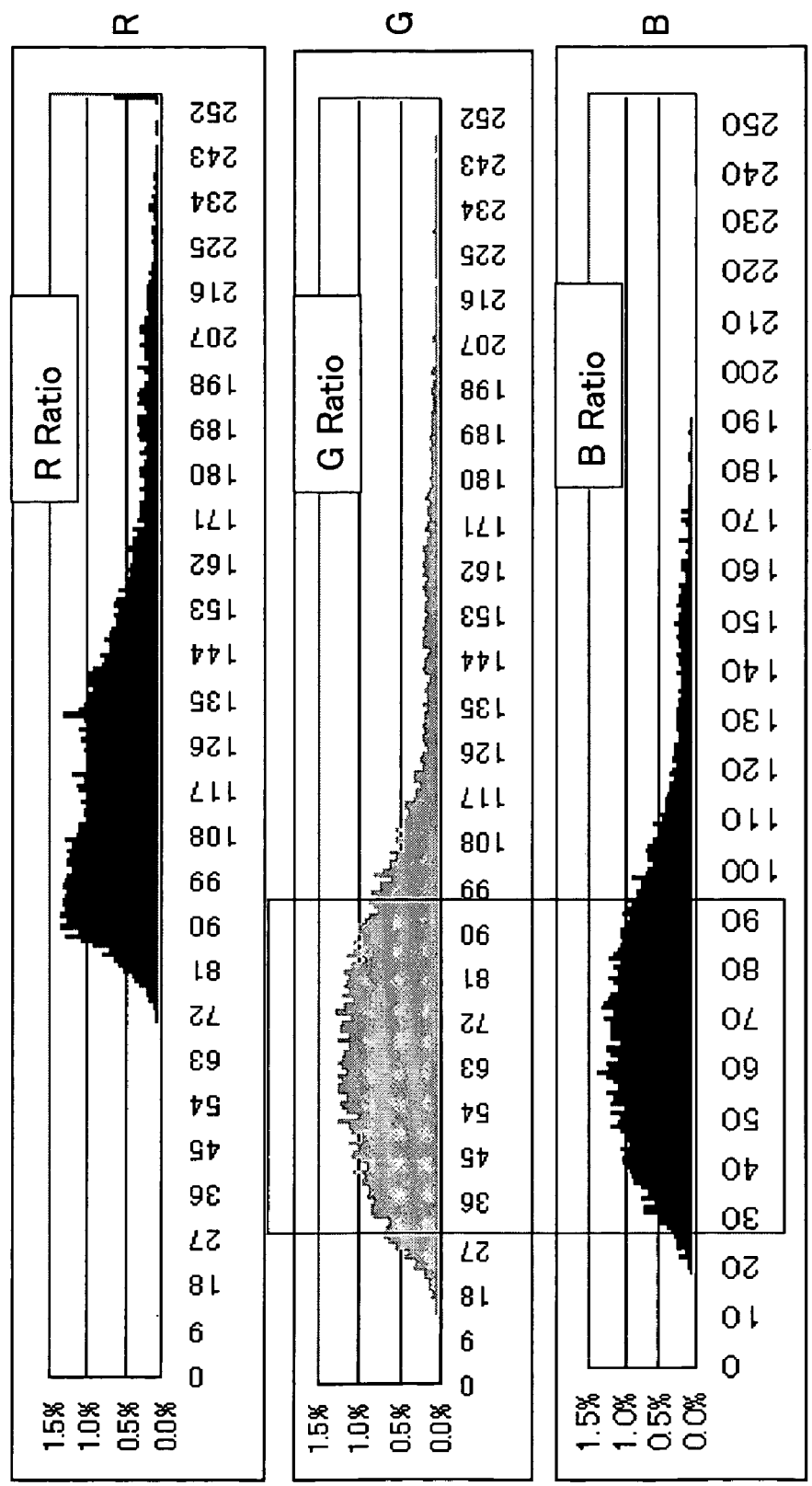
FIG. 9 shows a histogram of the RGB luminance for an image example having a prescribed combination of luminance.

FIG. 9 shows a histogram of the RGB luminance for an image example having a prescribed combination of luminance. This image example may be, for example, a photograph of a pure-red persimmon or apple, with blue sky as background. The light blue of the sky is a mixture of green G and blue B, and so green G and blue B have approximately the same grayscales (luminance). The luminance of red R is generally higher than the luminance of green G and blue B. Consequently in FIG. 7 the green G and blue B occur in the regions in which the transmittance at upward-60° is higher, and red R occurs in the regions in which the transmittance at upward-60° is lower, so that compared with the image as seen from the front, the colors are washed-out.

As is clear from FIG. 8, the input grayscale-luminance characteristic deviates greatly between the front-direction γ characteristic and upward-60° characteristic. Hence in order to suppress deviation from the ideal luminance in the upward-60° direction, the upward-60° characteristic must be made closer to the front-direction γ characteristic.

First Embodiment

Figure 10:
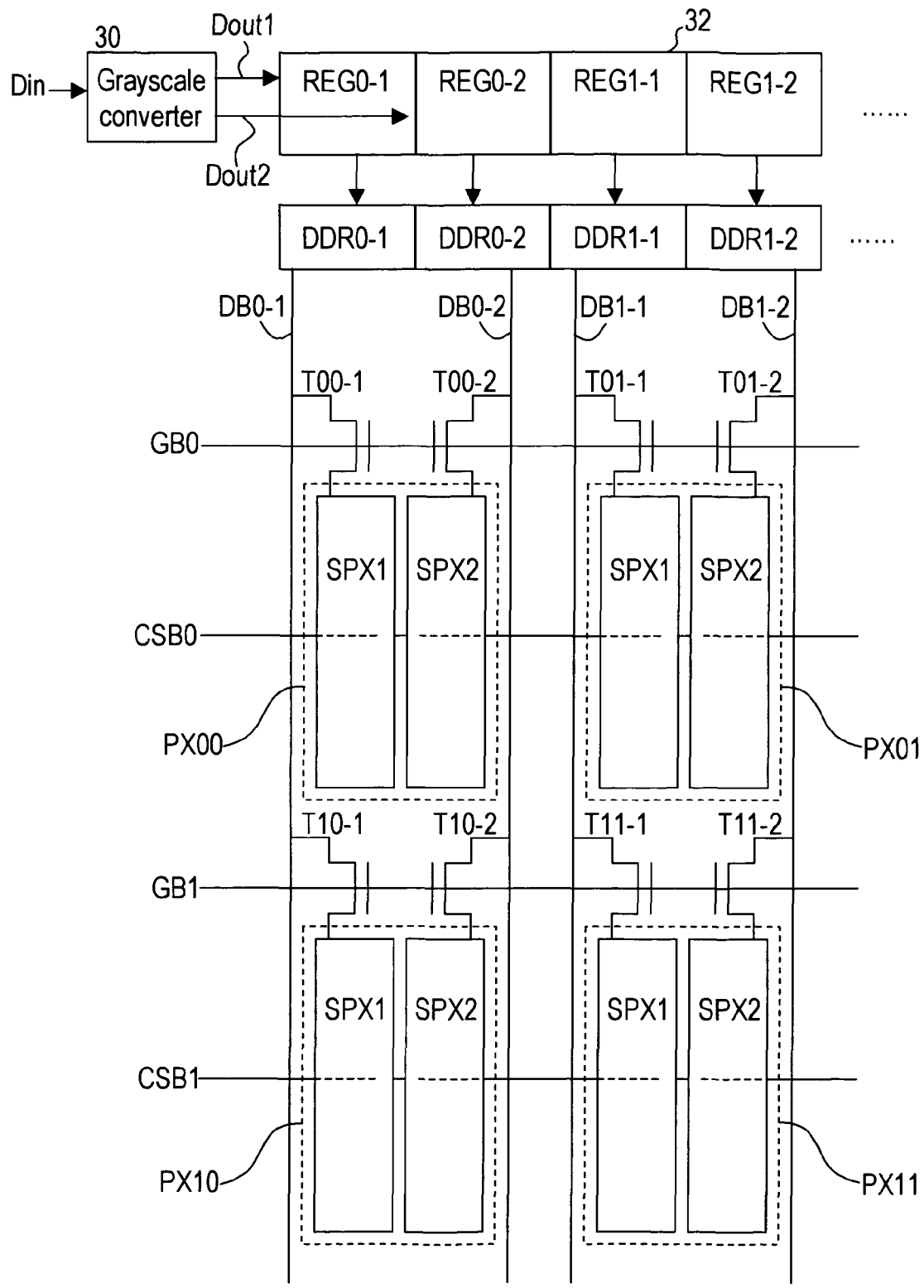
FIG. 10 is a view of a liquid crystal display device in a first embodiment.

FIG. 10 is a view of a liquid crystal display device in a first embodiment. In this embodiment, a plurality of subpixel electrodes, for example first and second subpixel electrodes SPX1, SPX2, are provided in each of the pixels PX00, PX01, PX10, PX11 arranged in a matrix in the MVA type liquid crystal display panel. Thin film transistors Tij-1, Tij-2 (ij=00, 01, 10, 11) are provided, as switching means, to the first and second subpixel electrodes SPX1, SPX2. Also, a pair of data bus lines DB0-1, DB0-2 are provided, to which the thin film transistors T00-1, T10-1 and T00-2, T10-2 respectively of the pixels PX00, PX10 arranged in the vertical direction in the first column are connected; and a pair of data bus lines DB1-1, DB1-2 are provided, to which the thin film transistors T01-1, T11-1 and T01-2, T11-2 respectively of the pixels PX01, PX11 arranged in the vertical direction in the second column are connected. These pairs of data bus lines DB0-1, DB0-2 and DB1-1, DB1-2 are driven by the pairs of data bus driving circuits DDR0-1, DDR0-2 and DDR1-1, DDR1-2, respectively. That is, the first and second subpixel electrodes SPX1, SPX2 within each pixel are driven by applying a direct voltage from the data bus driving circuits, via the data bus lines and thin film transistors.

The input grayscales of the image signal Din are converted by the grayscale conversion circuit 30 into first and second output grayscale signals Dout1, Dout2, which are latched by the data register 32. The data register 32 has pairs of registers REG0-1, REG0-2 and REG1-1, REG1-2 for each vertical-direction pixel column; the first and second output grayscale signals Dout1, Dout2 converted by the grayscale conversion circuit 30 are latched by the respective pairs of registers. The latched first and second output grayscale signals are supplied to the data bus driving circuits DDR0-1, DDR0-2, which convert them into driving voltages, and drive the pair of data bus lines DB0-1, DB0-2.

Thus in this embodiment, two subpixel electrodes are provided in each pixel, and a driving signal is applied from a data bus driving circuit DDR to each of these subpixel electrodes directly. The data bus driving circuit DDR applies to the first subpixel electrodes SPX1 a first driving signal which changes from low luminance to high luminance in the low-grayscale region for the input grayscales of the image signal, and applies to the second subpixel electrodes SPX2 a second driving signal which changes from low luminance to high luminance in the high-grayscale region for the input grayscales of the image signal. By employing, as the driving signals input to the two subpixel electrodes, a first driving signal which rises in the lower grayscale region for input grayscales of the input image signal Din and a second driving signal which rises in the higher grayscale region of the input image signal Din, the luminance characteristics generated for the two subpixel electrodes are made different, and so the grayscale characteristics in the intermediate input grayscale region can be improved when viewed from the upward-60° direction. Below, the first and second driving signals are explained.

Figure 11:
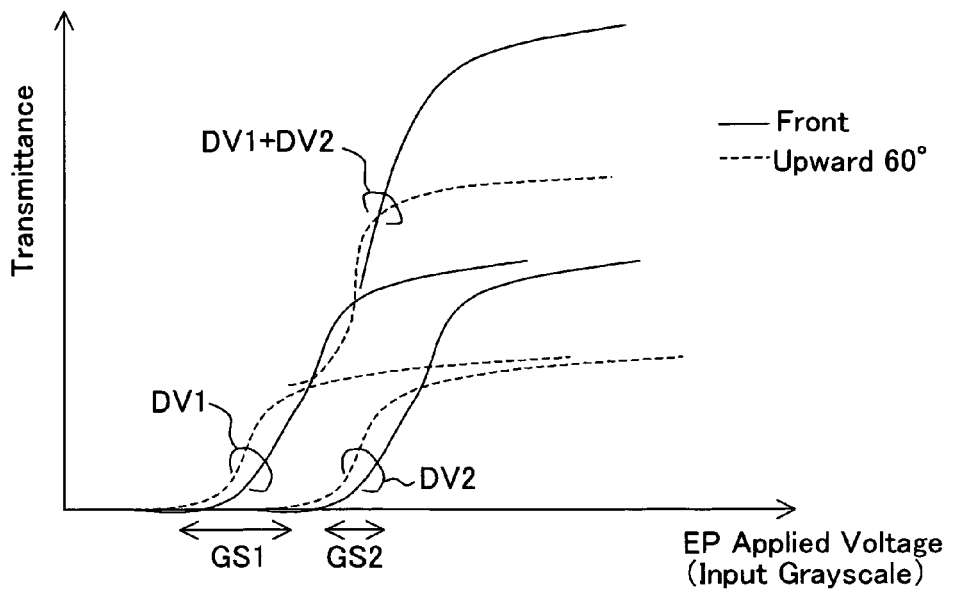
FIG. 11 shows the voltage characteristics of the driving signal applied to subpixel electrodes in this embodiment.

FIG. 11 shows the voltage characteristics of the driving signal applied to subpixel electrodes in this embodiment. Comparing to the voltage characteristics of FIG. 7, FIG. 11 shows a characteristics between an input grayscale and the transmittance. In FIG. 11 the first driving signal DV1 applied to the first subpixel electrode has a characteristic which changes from low voltage to high voltage in the lower input grayscale region so as to increase the transmittance at the subpixel electrode. On the other hand, the second driving signal DV2 applied to the second subpixel electrode has a characteristic which changes from low voltage to high voltage in the higher input grayscale region so as to increase the transmittance at the subpixel electrode. However, the characteristics of the first and second driving signals DV1, DV2 are set such that the sum of the luminancees corresponding to the transmittance at the first and the second subpixel electrodes results in an optimal gamma characteristic when viewing the liquid crystal display panel from the front.

As shown in FIG. 11, at the first subpixel electrode to which the first driving signal DV1 is applied, the transmittance as seen from the upward-60° direction, indicated by the broken line, has the same distortion characteristic as that explained in FIG. 7; however, the difference with the transmittance in the front direction accompanying this distortion characteristic is suppressed to approximately half if the areas of the subpixel electrodes are in a 1:1 ratio. At the second subpixel electrode also, to which the second driving signal DV2 is applied, the transmittance seen from the upward-60° direction, indicated by a broken line, has a distortion characteristic as in FIG. 7, but this also is suppressed to approximately half. Because the first and second subpixel electrodes are driven by the above-described different first and second driving signals, luminance is generated at the transmittance due to the first subpixel electrode to which the first driving signal DV1 is applied in the low input grayscale region, and at the transmittance due to the first and second subpixel electrodes driven respectively by the first and second driving signals DV1 and DV2 in the high input grayscale region. As a result, the transmittance as seen from the upward-60° direction is affected by the above-described distortion characteristics in the two input grayscale regions GS1 and GS2, but the extent of both distortions is reduced by half, and the characteristic of the transmittance from the upward-60° direction, indicated by a broken line, has a characteristic closer to the transmission characteristic seen from the front, indicated by the solid line.

Figure 12:
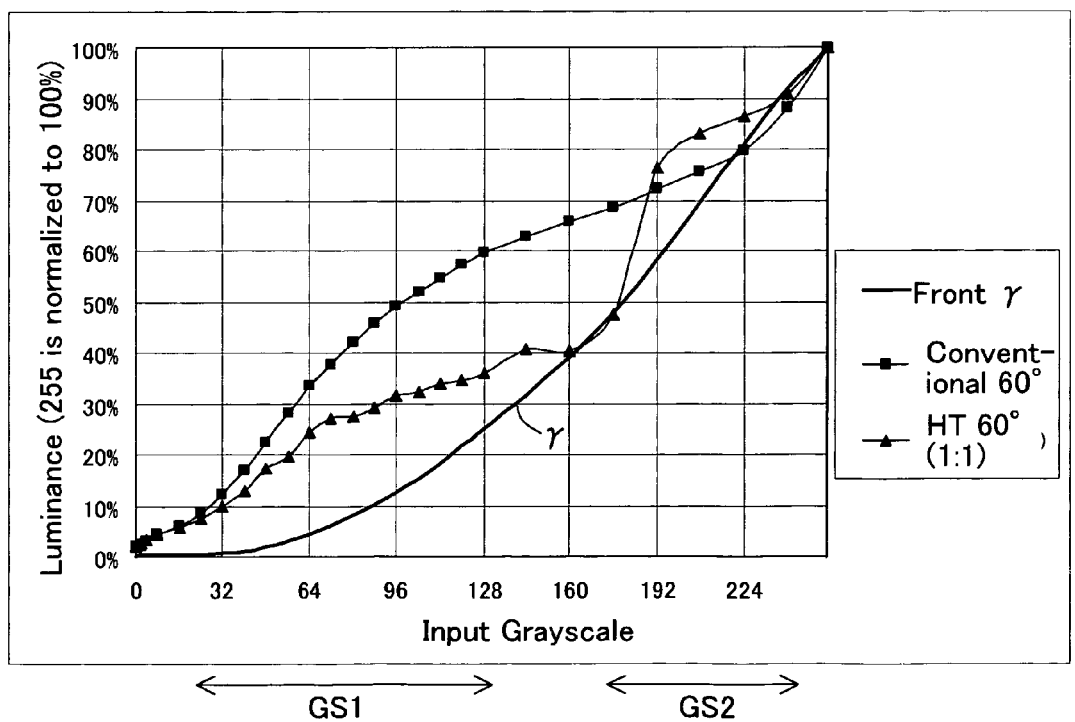
FIG. 12 shows the luminance as a function of input grayscale in the liquid crystal display panel of this embodiment.
Figure 13:
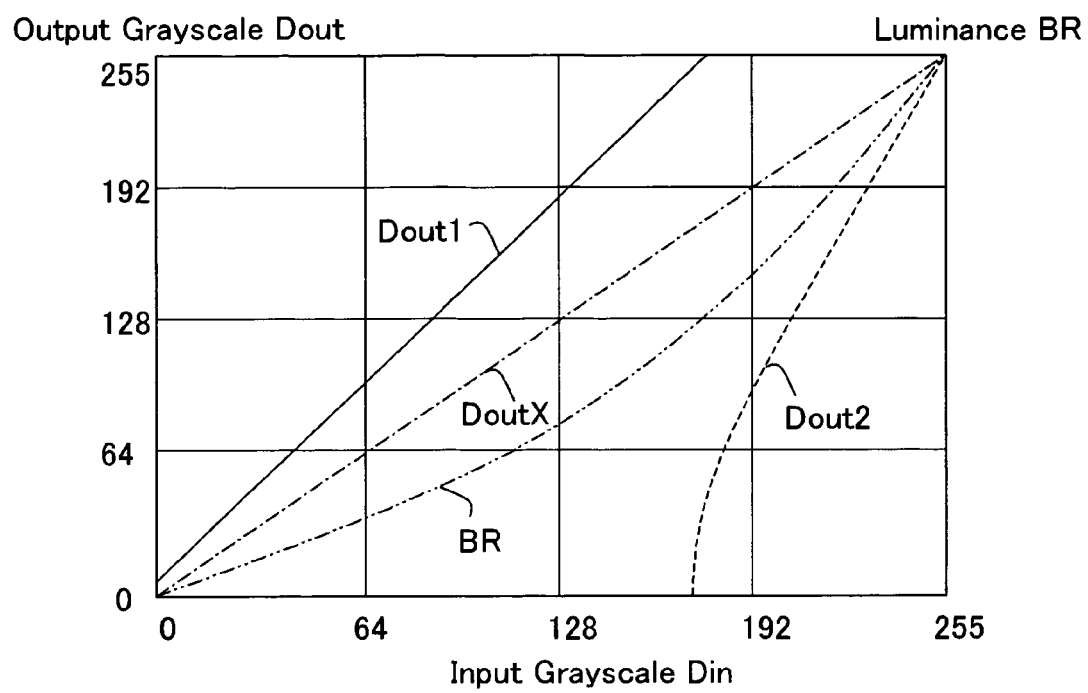
FIG. 13 shows a grayscale conversion table in the liquid crystal display device of this embodiment.

FIG. 12 shows the luminance as a function of input grayscale in the liquid crystal display panel of this embodiment. FIG. 12 shows the input grayscale-luminance characteristic corresponding to that of FIG. 8. FIG. 13 shows a grayscale conversion table in the liquid crystal display device of this embodiment. In FIG. 13, the horizontal axis corresponds to the input grayscale Din, and the vertical axis corresponding to the output grayscale Dout and to the luminance BR. As explained using FIG. 10, in a liquid crystal display device of this embodiment, the input grayscales of the input image signal Din are converted by the grayscale conversion circuit 30 into two output grayscales Dout1, Dout2. The first output grayscale Dout1 has a characteristic which rises from low grayscales to high grayscales in the region of low input grayscales Din; the second output grayscale Dout2 has a characteristic which rises from low grayscales to high grayscales in the region of high input grayscales Din. In particular, the second output grayscale Dout2 has a characteristic which rises after the first output grayscale Dout1 has risen to the highest output grayscale. The first and second driving signals DV1, DV2 corresponding to these first and second output grayscales Dout1, Dout2 are applied to the first and second subpixel electrodes by the data bus driving circuit DDR. That is, as the input grayscale Din rises, initially the luminance at the first subpixel electrode SPX1 rises to reach maximum luminance (maximum transmittance), and thereafter, the second subpixel electrode SPX2 begins to light, and the luminance rises to reach the maximum luminance.

The first and second grayscale conversion tables Dout1, Dout2 in FIG. 13 are set such that the luminance characteristic BR as seen from the front direction of the liquid crystal display panel has the optimum gamma characteristic. The conversion characteristic DoutX shown in FIG. 13 corresponds to a conversion table in which the input grayscale Din and output grayscale Dout are equal. The data bus driving circuit DDR converts the output grayscale into a driving signal (driving voltage) such that the luminance characteristic BR at the panel front direction has the above-described gamma characteristic when this output grayscale Dout drives a single pixel electrode. Hence in this embodiment, even if a pixel is divided into two subpixel electrodes which are driven by driving signals corresponding to different output grayscales Dout1, Dout2, the luminance characteristic BR from the panel front direction must be such that the gamma characteristic is ideal. This gamma characteristic of the luminance is shown as the characteristic γ in FIG. 12 also.

As is shown in the change in luminance with input grayscale of FIG. 12, a luminance characteristic at an upward-60° direction when driving single pixel electrodes (the "conventional 60°" case) has a higher luminance characteristic than the front-direction luminance characteristic γ in the comparatively low input grayscale region, and has a lower luminance characteristic than the front-direction luminance characteristic γ in the high input grayscale region. In contrast, the upward-60° luminance characteristic (HT60°) when driving signals for different output grayscales are applied to two subpixel electrodes, is closer to the ideal luminance characteristic γ than the conventional 60° characteristic. However, as explained in FIG. 11, while the luminance characteristic (HT 60°) in this embodiment is affected by a phenomenon of higher luminance due to a distortion characteristic in the low input grayscale region GS1 and high input grayscale region GS2 respectively, the luminance characteristic of the embodiment is improved over the characteristic (conventional 60°characteristic) for single pixel electrode driving.

The grayscale conversion circuit 30 in FIG. 10 generates, from an input grayscale Din, output grayscales Dout1, Dout2 which can in turn generate luminance at two subpixel electrodes with higher resolution. This is because in order to precisely generate the pixel luminance using a plurality of subpixel electrodes, the luminance of the subpixel electrodes must be generated with still higher resolution. In general, in order to raise the resolution it is sufficient to increase the number of bits of the output grayscale over that of the input grayscale. However, there are cases in which a driving circuit IC with higher resolution entails increased costs, and so is not preferable. In order to avoid such cost increase, it is desirable that the grayscale conversion circuit 30 adjust the output grayscales for each frame through frame modulation. That is, by means of the frame modulation, the input grayscales are converted into different output grayscales in, for example, four consecutive frames, so that the average luminance resolution over four frames can be increased. For example, by increasing the grayscale value for only one frame among the four frames, the luminance average can be raised by 0.25.

Figure 14A:
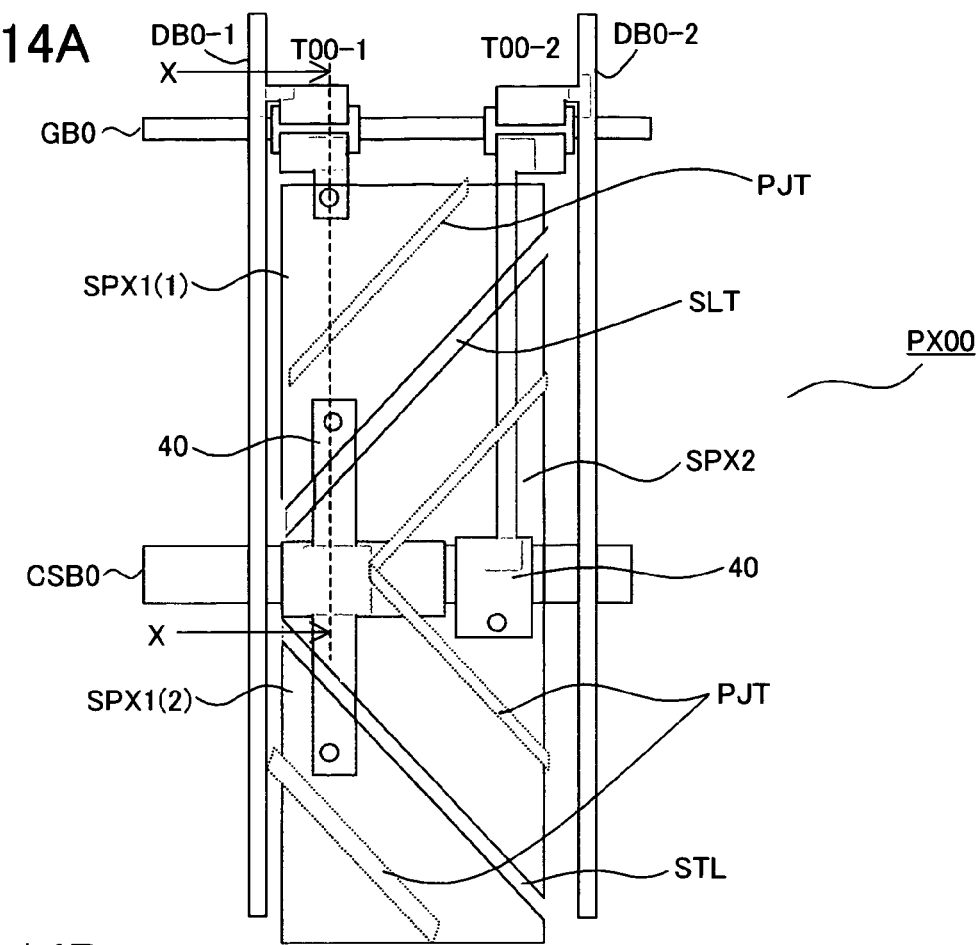
FIG. 14 is a plan view and circuit diagram showing the specific configuration of the liquid crystal display panel of the first embodiment.

FIG. 14 is a plan view and circuit diagram showing the specific configuration of the liquid crystal display panel of the first embodiment. In FIG. 14, the configuration of one pixel PX00 in FIG. 10 is shown; the same component elements are assigned the same reference numbers. As indicated in the plan view of FIG. 14A, the pixel electrode is divided into three by slits SLT, and the upper and lower subpixel electrodes SPX1(1), SPX1(2) are connected by the supplementary capacitance electrode wire 40 to form a single first subpixel electrode SPX1. The intermediate subpixel electrode forms the second subpixel electrode SPX2. Projections PJT are provided on both the subpixel electrodes SPX1, SPX2, and these, together with the slits SLT which divide the subpixel electrodes, regulate the alignment direction of the liquid crystal molecules as an alignment regulation structure.

The gate bus line GB0 extending in the horizontal direction controls conduction and non-conduction as gate electrodes of the thin film transistors T00-1 and T00-2, serving as switching means. On the other hand, the supplementary capacitance bus line CSB0 is positioned so as to extend in the horizontal direction at the central position of the pixel electrode. A supplementary capacitance is formed with the supplementary capacitance electrode 40.

Figure 14B:
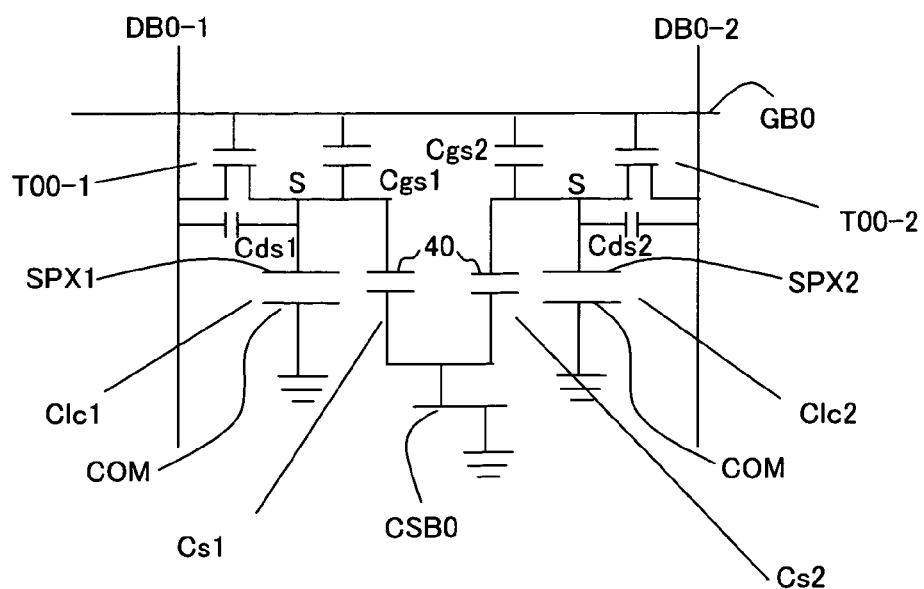

FIG. 14B is an equivalent circuit diagram of a pixel; pixel liquid crystal capacitances Clc1, Clc2 are formed between the subpixel electrodes SPX1, SPX2 and the common electrode COM, and supplementary capacitances Cs1, Cs2 are formed between the supplementary capacitance electrode 40 and the supplementary capacitance bus line CSB0. Also, gate-source capacitances Cgs1, Cgs2 are formed between the gate bus line GB0 and the source electrodes of the thin film transistors.

Figure 15:
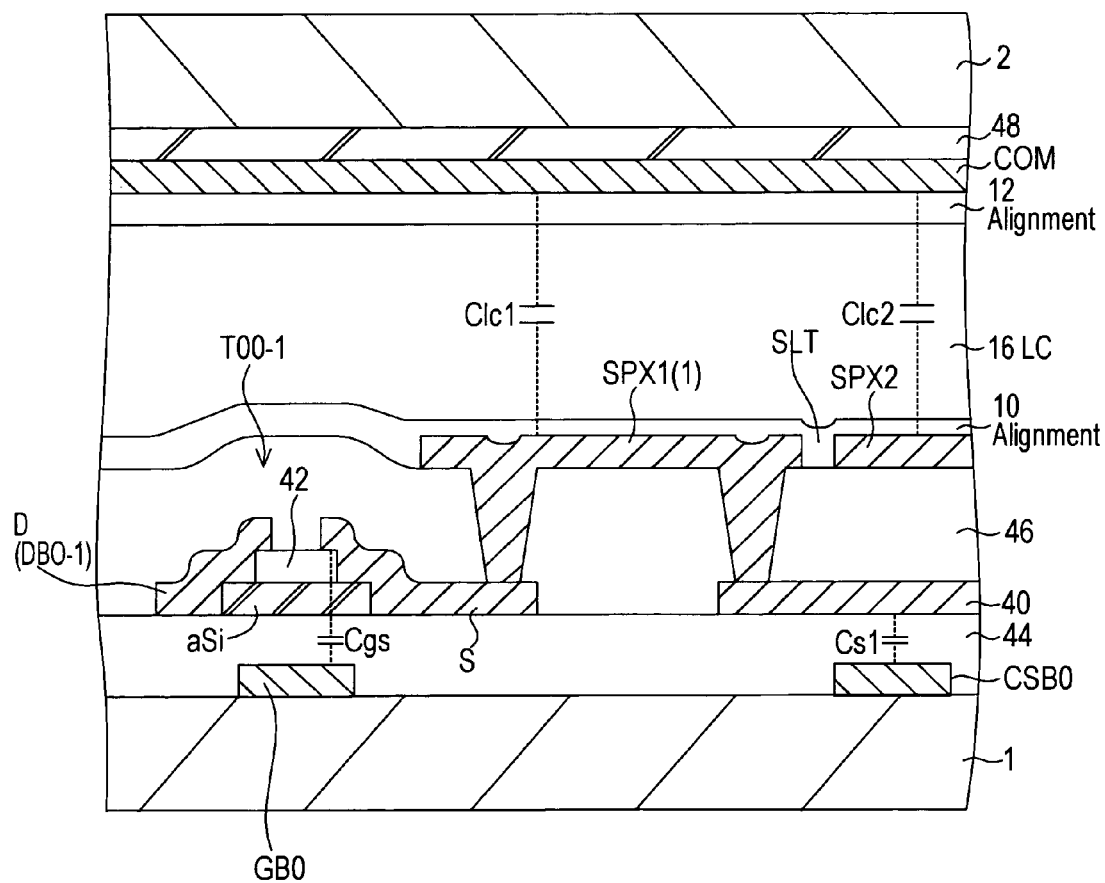
FIG. 15 is a partial cross-sectional view of the plan view of FIG. 14A.

FIG. 15 is a partial cross-sectional view of the plan view of FIG. 14A, and shows a cross-section of position X indicated by the broken line in the plan view of FIG. 14A. A gate bus line GB0 and supplementary capacitance bus line CSB0 are formed on the TFT substrate 1, and on top of this the gate insulating film 44 is formed. On the gate insulating film 44 are formed a semiconductor amorphous silicon layer aSi, a channel protection layer 42 formed by insulating film, drain electrode D for connection to the data bus line DB0-1, and source electrode S, in order to form the thin film transistor T00-1. Also, a supplementary capacitance electrode layer 40 is formed on the gate insulating film 44 so as to overlap with the supplementary capacitance bus line CSB0. On the insulating film 46 are positioned the first subpixel electrode SPX1(1) and second subpixel electrode SPX2, separated by a slit SLT. An alignment film 10 is formed on these subpixel electrodes. On the other hand, a color filter layer 48, common electrode layer COM, and alignment film 12 are formed on the opposing substrate 2, and a liquid crystal layer 16 is formed between the alignment films 10, 12.

In the cross-sectional view of FIG. 15 are shown the pixel liquid crystal capacitances Clc1, Clc2, the supplementary capacitance Cs1, and the gate-source capacitance Cgs explained using FIG. 14B.

Returning to FIG. 14B, in this embodiment the pixel electrode is divided into two subpixel electrodes SPX1 and SPX2. This entails the need to equalize the feedthrough voltages for the two subpixel electrodes. In order to render equal the feedthrough voltages of the subpixel electrodes, a configuration must be employed such that the ratios of the gate-source capacitances Cgs1, Cgs2 between gate bus electrode GB0 and source electrode S, of the liquid crystal capacitances Clc1, Clc2, and of the supplementary capacitances Cs1, Cs2 in the first and second subpixel electrodes be substantially equal. In other words, it is necessary that the subpixel electrodes be designed such that Cgs1:Clc1:Cs1=Cgs2:Clc2:Cs2.

Figure 16:
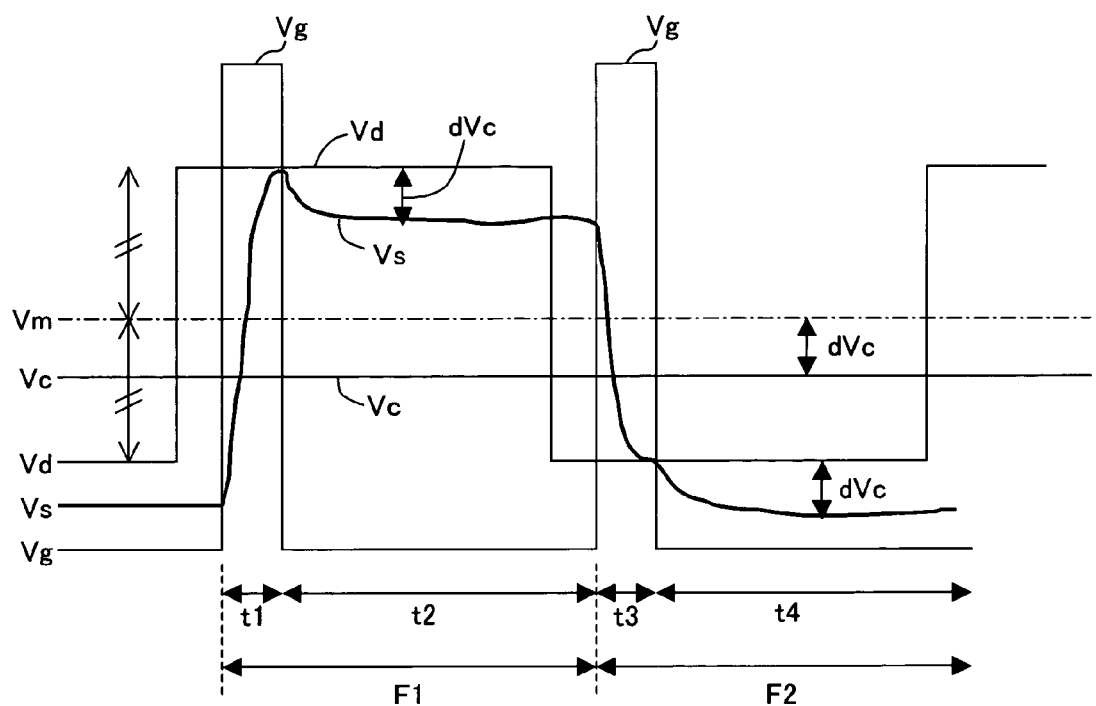
FIG. 16 explains the feedthrough voltage.

FIG. 16 explains the feedthrough voltage. In FIG. 16, the gate voltage Vg applied to the gate bus line GB0 and the data voltage Vd applied to the data bus line DB are shown. The data voltage Vd is controlled so as to be opposite polarity to the voltage Vc of the common electrode for the fields F1, F2, in order to prevent degradation of the liquid crystal molecules. That is, during the field interval F1 the data voltage Vd is made positive relative to the common voltage Vc, and during the field interval F2 the data voltage Vd is made negative relative to the common voltage Vc.

On the other hand, after the data voltage Vd is determined, the gate voltage Vg is raised to H level over the period t1. This is accompanied by a change in the pixel voltage Vs applied to the pixel electrode, as indicated by the bold line. That is, during the field interval F1 the pixel voltage Vs rises together with the rise in the gate voltage Vg in the period t1, and the pixel voltage Vs is maintained over the following hold period t2. In the next field interval F2, the pixel voltage Vs falls with the rise in the gate voltage Vg in the period t3, and in the following hold period t4 the pixel voltage Vs is maintained.

However, when the gate voltage Vg falls after rising, due to the capacitive coupling of the gate-source capacitance described above, the pixel voltage Vs falls by a voltage dVc (=dVg×Cgs/(Cgs+Clc+Cs)) equal to the voltage drop dVg of the gate voltage Vg times the ratio of the total capacitance (Cgs+Clc+Cs) and the gate-source capacitance Cgs. That is, the difference between the pixel voltage Vs determining the transmittance of the liquid crystal molecules and the common electrode voltage Vc is smaller than ½ the data voltage Vd when the polarity is positive, and is larger than ½ the data voltage Vd when the polarity is negative. Taking this feedthrough voltage dVc into account, the common electrode voltage Vc is reduced from Vm, which is ½ the data voltage Vd, by the amount of the feedthrough voltage dVc.

Hence in this embodiment, in order to apply a similar pixel voltage Vs relative to the common electrode voltage Vc to the first and second subpixel electrodes SPX1, SPX2, the two subpixel electrodes are designed such that Cgs1:Clc1:Cs1=Cgs2:Clc2:Cs2.

Modified Example 1 of the First Embodiment

Figure 17:
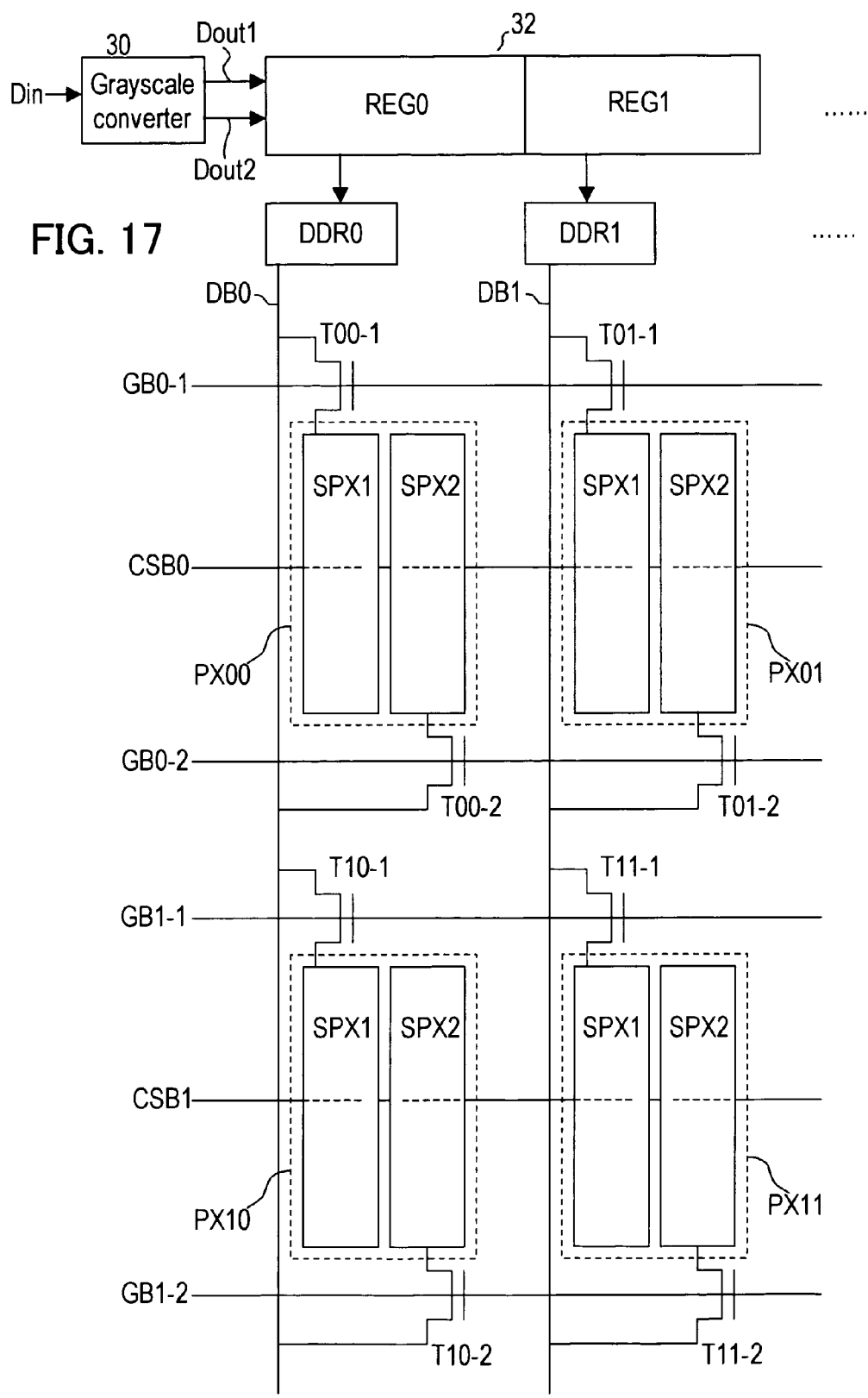
FIG. 17 is a diagram of another liquid crystal display device of the first embodiment.

FIG. 17 is a diagram of another liquid crystal display device of the first embodiment. In this modified example, a pair of gate bus lines GB0-1, GB0-2 is provided for the pixels PX00, PX01 in the horizontal direction, and a single data bus line DB0 is provided for the pixels PX00, PX10 in the vertical direction. The two subpixel electrodes SPX1, SPX2 within one pixel are connected, via the thin film transistors T00-1, T00-2, which are switching means, to the common data bus line DB0.

Similarly to the example of FIG. 10, the grayscale conversion circuit 30 converts the input grayscales of the image signal Din into first and second output grayscales Dout1, Dout2. In the first half of the horizontal sync period, first output grayscale signals Dout1 for one line are latched in the register 32, and the data driving circuits DDR0, DDR1 output to the data bus lines DB0, DB1 data voltages corresponding to the first output grayscale signals Dout1. At this time, the first gate bus line GB0-1 is driven, the first thin film transistor group T00-1, T01-1 become conductive, and a data voltage corresponding to the first output grayscale signal Dout1 is supplied to the first subpixel electrodes SPX1. Then, in the second half of the horizontal sync period, second output grayscale signals Dout2 for one line are latched in the register 32, and the data driving circuits DDR0, DDR1 supply a data voltage corresponding to the second output grayscale signals Dout2 to the data bus lines DB0, DB1. At this time the second gate bus line GB0-2 is driven, and the data voltage is supplied to the second subpixel electrodes SPX2 via the second thin film transistor group T00-2, T01-2.

In the next horizontal sync period, data voltages corresponding to the first output grayscale signals Dout1 are output to the pixel group PX10, PX11 of the second line by the data driving circuits DDR0 and DDR1 in the first half of the period, similarly to the process described above, and these are applied to the first subpixel electrodes SPX1 via the first thin film transistor group T10-1, T11-1 which become conductive due to driving by the first gate bus line GB1-1. In the second half, data voltages corresponding to the second output grayscale signals Dout2 are output by the data driving circuits DDR0, DDR1, and are applied to the second subpixel electrodes SPX2 via the second thin film transistor group T10-2, T11-2, which become conductive due to driving by the second gate bus line GB1-2.

That is, in the liquid crystal display device of FIG. 17, within the same horizontal sync period, data voltages corresponding to grayscale-converted first and second grayscale signals Dout1 and Dout2 are applied, with time division, to the first and second subpixel electrodes SPX1 and SPX2. In this case also, since the subpixel electrodes SPX1 and SPX2 are driven directly by the data driving circuits DDR via thin film transistors, there is no need for a high driving voltage, and an arbitrary data voltage generated by the grayscale conversion circuit 30 can be applied to the subpixel electrodes.

Modified Example 2 of the First Embodiment

In FIG. 12 and FIG. 13, the area ratio of the two subpixel electrodes was set to 1:1, and voltages corresponding to the first and second output grayscale signals Dout1, Dout2 obtained by conversion of the grayscale signal of the input image signal were applied to the two subpixel electrodes. However, as indicated in FIG. 11, the proportion of distortion of the luminance for the upward-60° direction in the low input grayscale region GS1 is relatively higher than the proportion of distortion in the luminance for the upward-60° direction in the high input grayscale region GS2. That is, whereas in the low-grayscale region GS1 the proportion of transmittance in the upward-60° direction relative to the ideal transmittance in the front direction is several hundred percent, in the high-grayscale region GS2 the proportion is low, at several tens of percent. Hence luminance distortion in the low-grayscale region is emphasized. Therefore, by reducing the area of the first subpixel electrode which lights in the region of low input grayscales compared with the area of the second subpixel electrode which begins to light in the region of high input grayscales, so that the area ratio of the subpixel electrodes is 1:2, 1:3, 1:6, 1:9 or similar, the extent of luminance distortion in the low-grayscale region can be effectively reduced.

Figure 18:
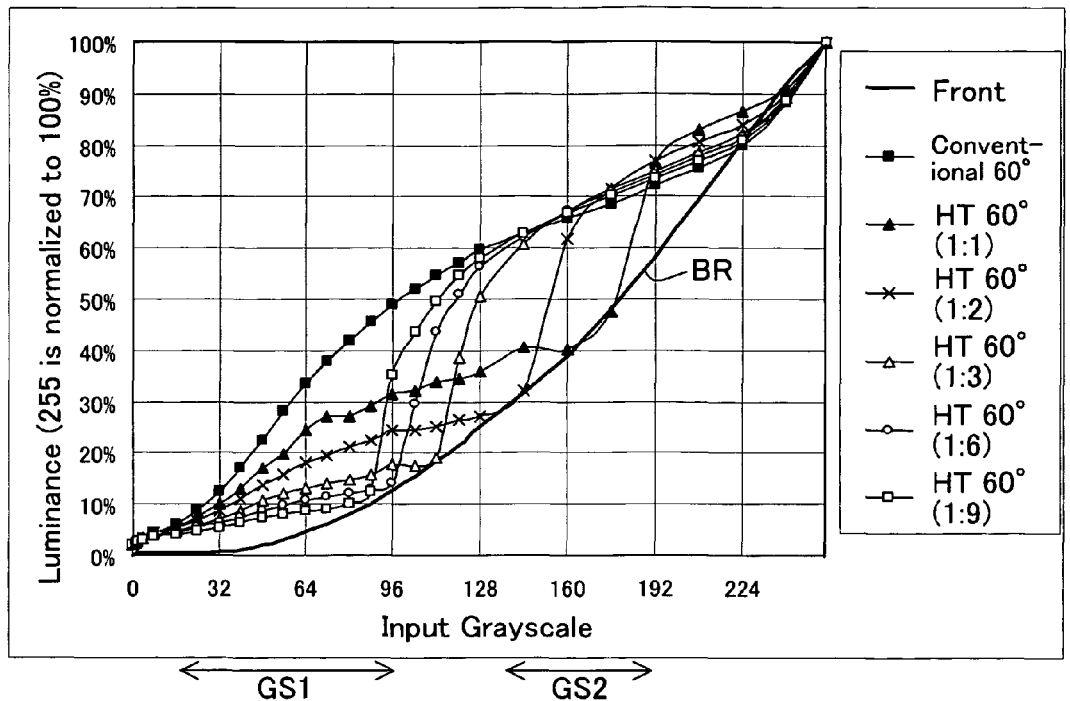
FIG. 18 shows the relation between input grayscale and luminance when the area ratio of subpixel electrodes is made different in the first embodiment.

FIG. 18 shows the relation between input grayscale and luminance when the area ratio of subpixel electrodes is made different in the first embodiment. As can be seen upon comparison with FIG. 12, when the area of the first subpixel electrode is made small compared with the second subpixel electrode, the luminance in the upward-60° direction in the low-input grayscale region GS1 can be brought close to the ideal luminance BR in the front direction. On the other hand, in the high-input grayscale region GS2, the luminance in the upward-60° direction is more distant from the front-direction luminance BR. That is, as the proportion of the area of the first subpixel electrode is made smaller, the upward-60° direction luminance can be brought closer to the ideal state of the front direction in the low-input grayscale region.

Figure 19:
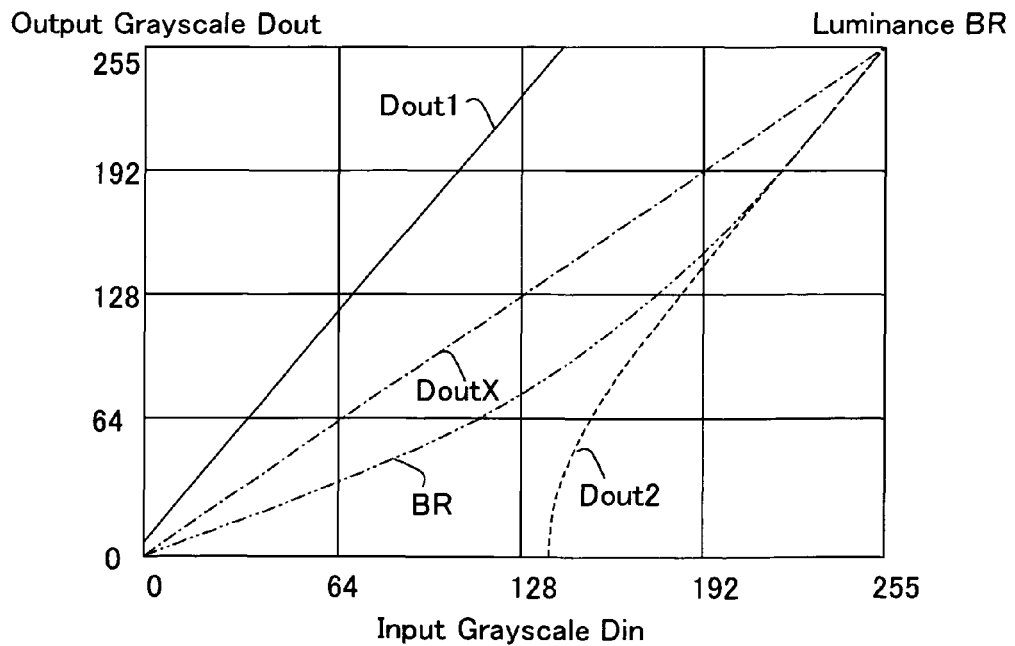
FIG. 19 shows a conversion table when the area ratio of subpixel electrodes is 1:2 in the first embodiment.
Figure 20:
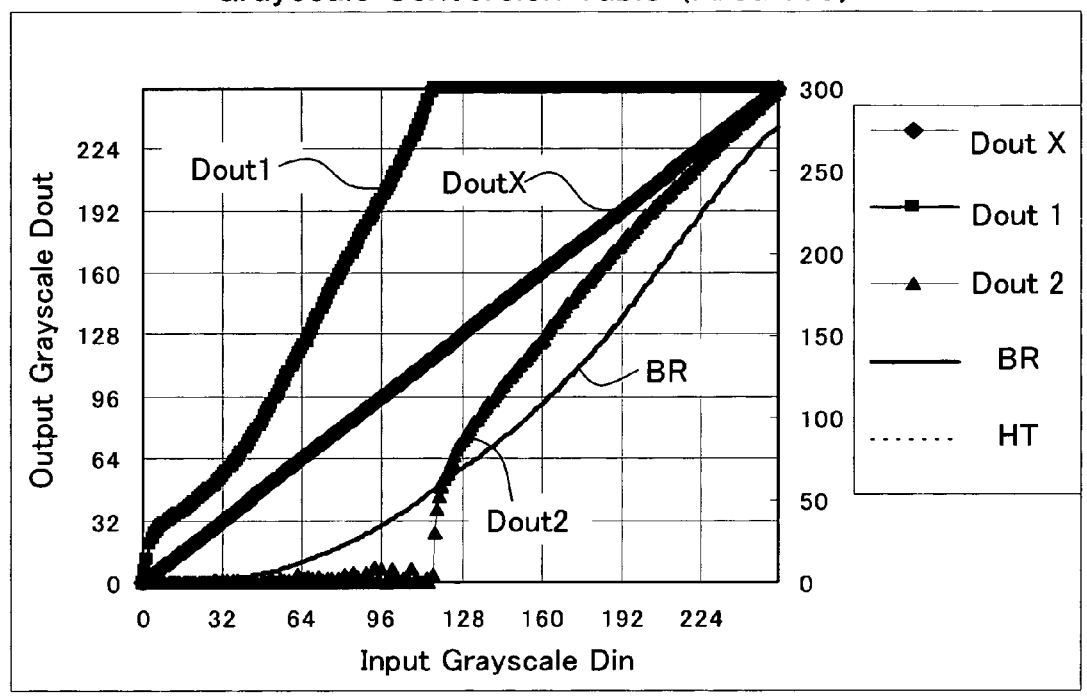
FIG. 20 shows a conversion table when the area ratio of subpixel electrodes is 1:3 in the first embodiment.

FIG. 19 shows a conversion table when the area ratio of subpixel electrodes is 1:2, and FIG. 20 shows a conversion table when the area ratio of subpixel electrodes is 1:3. As the area ratio of the first and second subpixel electrodes is changed, the conversion table of the grayscale conversion circuit must also be changed, to maintain the gamma characteristic BR of input grayscales and luminance in the front direction. Compared with the conversion table for an area ratio of 1:1 in FIG. 13, the conversion table for an area ratio of 1:2 in FIG. 19 is such that with increasing input grayscale signal Din, the first output grayscale signal Dout1 rises to the maximum grayscale in a lower input grayscale region, and the second output grayscale signal Dout2 starts rising from a lower input grayscale value. The reason for this is that the area of the first subpixel electrode is small. Similarly, the conversion table for an area ratio of 1:3 in FIG. 20 is such that with increasing input grayscale signal Din, the first output grayscale signal Dout1 rises to the maximum grayscale value in a still lower input grayscale region, and the second output grayscale signal Dout2 starts its rising from a still lower input grayscale value. The conversion tables of FIG. 19 and FIG. 20 are both designed such that, after the first output grayscale signal has risen, the second output grayscale signal starts rising. That is, with increasing input grayscale signal, the first subpixel electrode is initially lit and the grayscale value changes to the maximum luminance, and thereafter the second subpixel electrode lights and changes to the maximum luminance value. The grayscale conversion tables are designed such that the sum of the luminance values of the first and second subpixel electrodes has the ideal gamma characteristic BR for the front direction.

Figure 1:
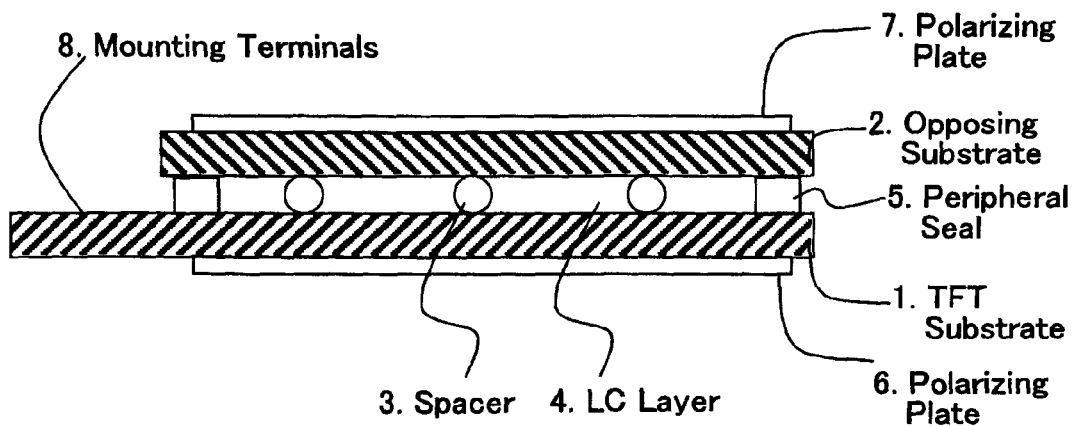
FIG. 1 is a cross-sectional view which explains an MVA type liquid crystal display device.
Figure 2:
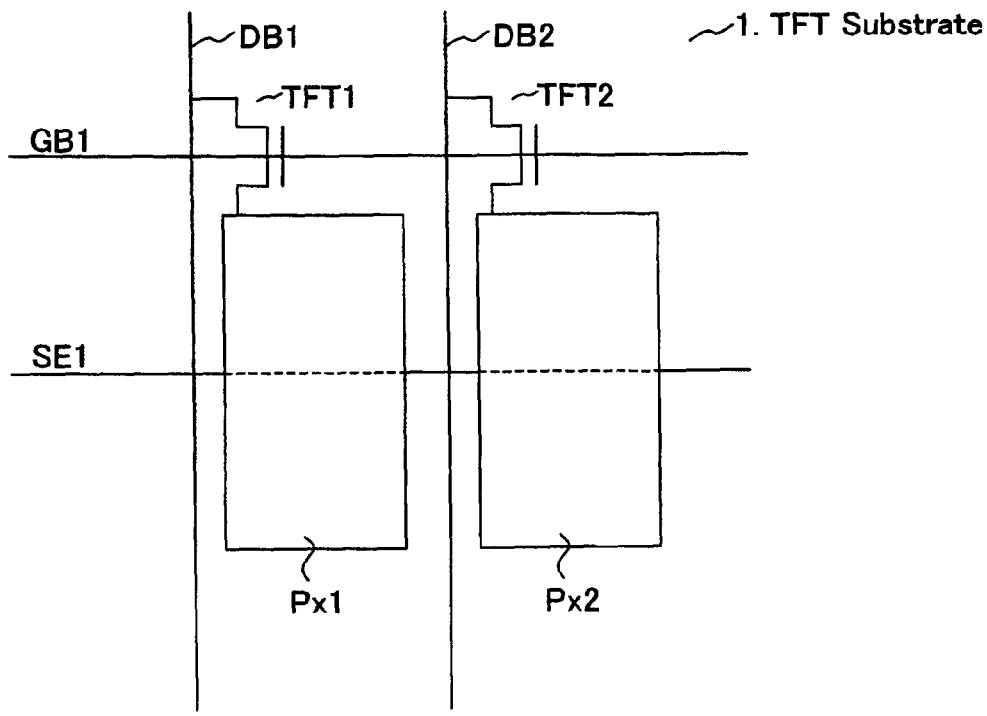
FIG. 2 is a plan view of a TFT substrate which explains an MVA type liquid crystal display device.
Figure 21A:
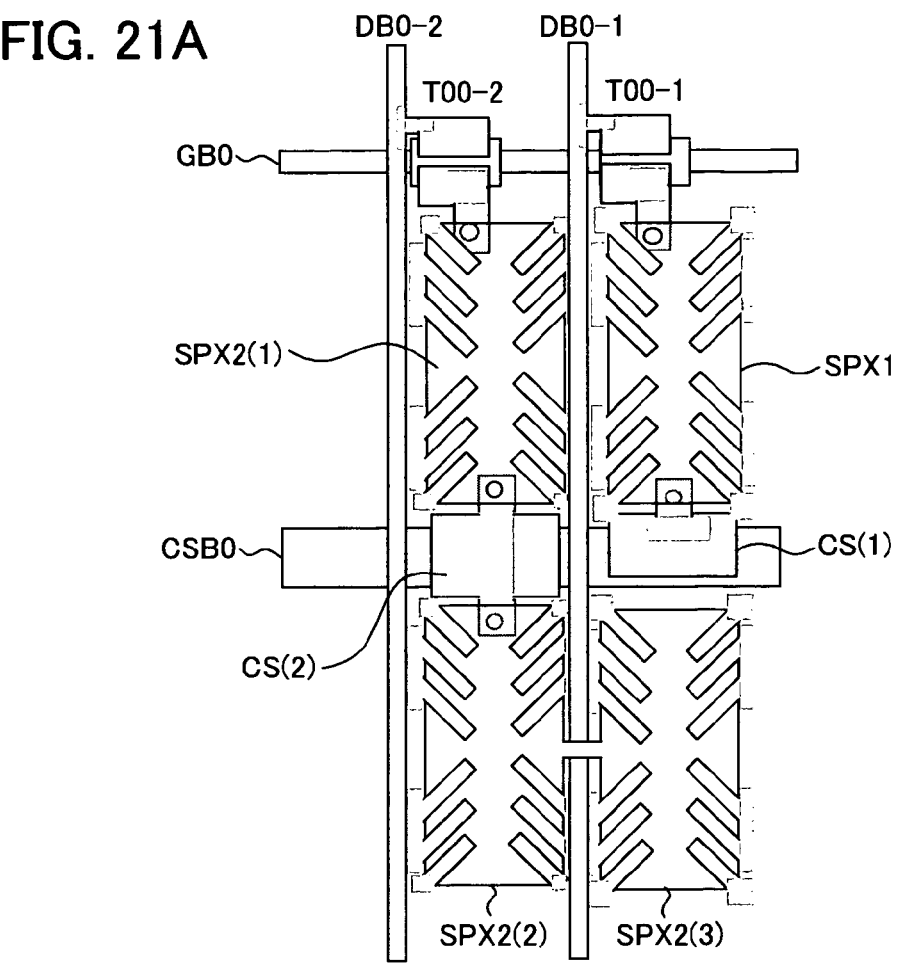
FIG. 21 shows an example of the configuration of subpixel electrodes with an area ratio of 1:3 in the first embodiment.
Figure 21B:
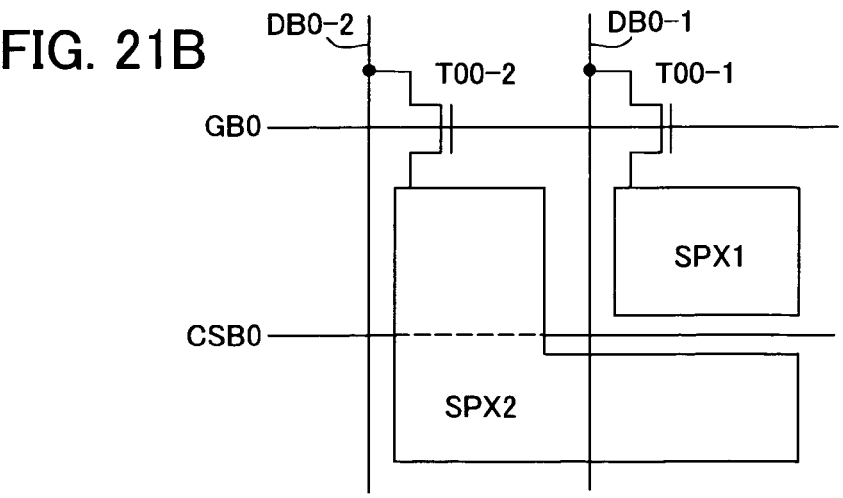

FIG. 21 shows an example of configuration of subpixel electrodes with an area ratio of 1:3 in the first embodiment. In this configuration example, the area ratio of the first subpixel electrode SPX1 and the second subpixel electrode SPX2 is set to 1:3, and data voltages corresponding to the output grayscale signals Dout1, Dout2 are applied to the subpixel electrodes SPX1, SPX2 respectively via the pair of data bus lines DB0-1, DB0-2 and pair of thin film transistors T00-1, T00-2. That is, the configuration example of FIG. 21 is similar to the data driver circuit, data bus line, and gate bus line configuration of FIG. 10, but the area ratio of the subpixel electrodes is different. In the plan view of FIG. 21A, the second subpixel electrode SPX2 comprises three electrodes SPX2(1), SPX2(2), SPX2(3); slits are formed in four directions in these subpixel electrodes as the structure of regulating the alignment direction of liquid crystal molecules. FIG. 2B is an equivalent circuit diagram.

FIG. 22 shows examples of the configuration of subpixel electrodes with an area ratio of approximately 2:1 in the first embodiment. This configuration example corresponds to the configuration example of FIG. 17 in which time-division application of the data voltage is performed; a single common data bus line DB0 is provided for the two subpixel electrodes SPX1, SPX2, and the thin film transistors T00-1, T00-2 of the two subpixel electrodes SPX1, SPX2 are driven by the gate bus lines GB0-1, GB0-2 with time division. In the example of FIG. 22A, the first and second subpixel electrodes SPX1 and SPX2 are formed so as to overlap with the common supplementary capacitance bus line CSB0. In the example of FIG. 22B, a portion of the first subpixel electrode SPX1 is formed to overlap, in the region 50, with the second gate bus line GB0-2 corresponding to the second subpixel electrode SPX2, to increase the aperture ratio. In order to suppress the above-described feedthrough voltage, the pixel electrodes are laid out so as not to overlap with the corresponding gate bus lines. This is because, when the capacitance between gate bus lines and pixel electrodes increases, the feedthrough voltage increases. In the example of FIG. 22B, the first subpixel electrode SPX1 overlaps in the region 50 with the gate bus line GB0-2, which is used to drive the other subpixel electrode SPX2, so that the feedthrough voltage does not rise.

In the example in FIG. 22C, the first and second subpixel electrodes SPX1, SPX2 overlap with the other subpixel's gate bus line GB0-2, GB1-1 in the regions 52 and 53, so that the overall aperture ratio is increased. Accompanying this, the supplementary capacitance bus lines CSB0-1, CSB0-2 overlap the first and second subpixel electrodes SPX1, SPX2, respectively. In the example of FIG. 22D, only the first subpixel electrode SPX1 overlaps the gate bus line GB0-2. And in the example of FIG. 22E, the first and second subpixel electrodes SPX1, SPX2 do not overlap gate bus lines.

Figure 23A:
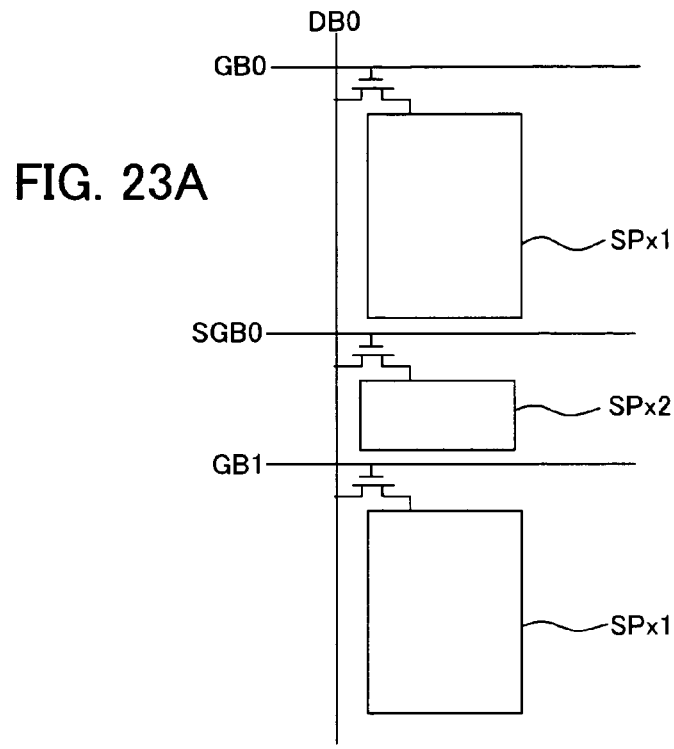
FIG. 23 shows examples of modification of the subpixel electrodes in the first embodiment.
Figure 23B:
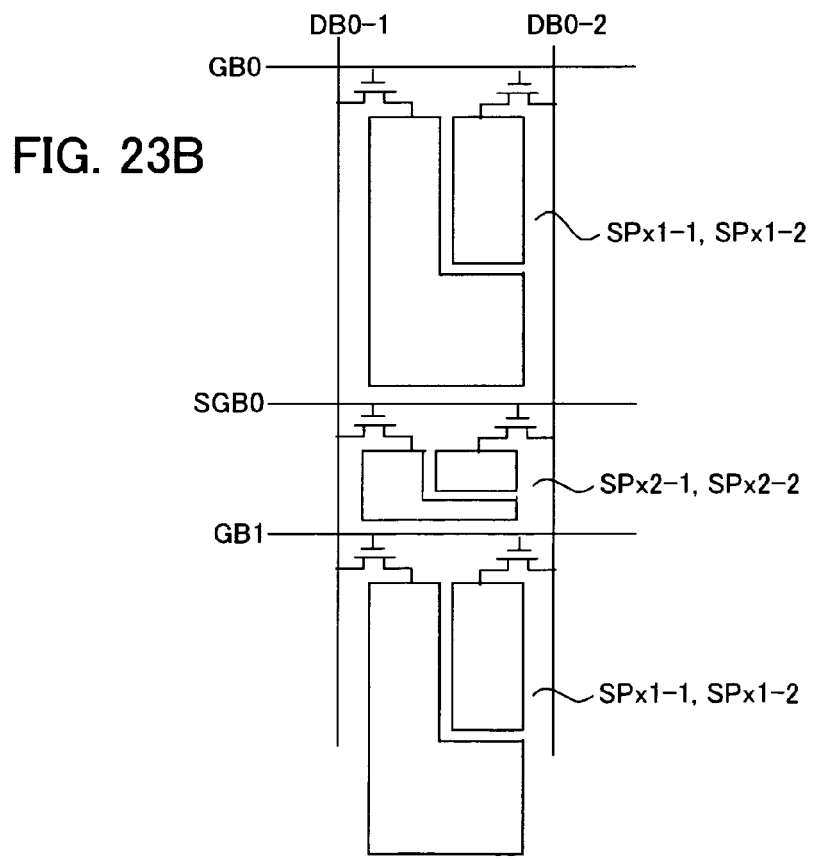

FIG. 23 shows examples of modification of the subpixel electrodes in the first embodiment. In the modified example of FIG. 23A, a pair of pixels adjacent in the vertical direction each have a first subpixel electrode SPX1, and share a second subpixel electrode SPX2. According to this a sub-gate bus line SGB0 and thin film transistor are provided for the common second subpixel electrode SPX2. A single data bus line DB0 is provided for these subpixel electrodes. To the two first subpixel electrodes and the shared second subpixel electrode are applied data voltages corresponding to three output grayscale signals, obtained by conversion of the input grayscale signals for the vertically adjacent pixels. In the modified example of FIG. 23B, the first subpixel electrode is further divided into two electrodes SPX1-1, SPX1-2 with different areas, and the common second subpixel electrode is also divided into two electrodes SPX2-1, SPX2-2 with different areas. Together with this, a pair of data bus lines DB0-1, DB0-2 are provided. Hence in this example, the input grayscale signals of the vertically adjacent pixels are converted to generate six output grayscale signals, and these are applied to the corresponding pixel electrodes.

Figure 24:
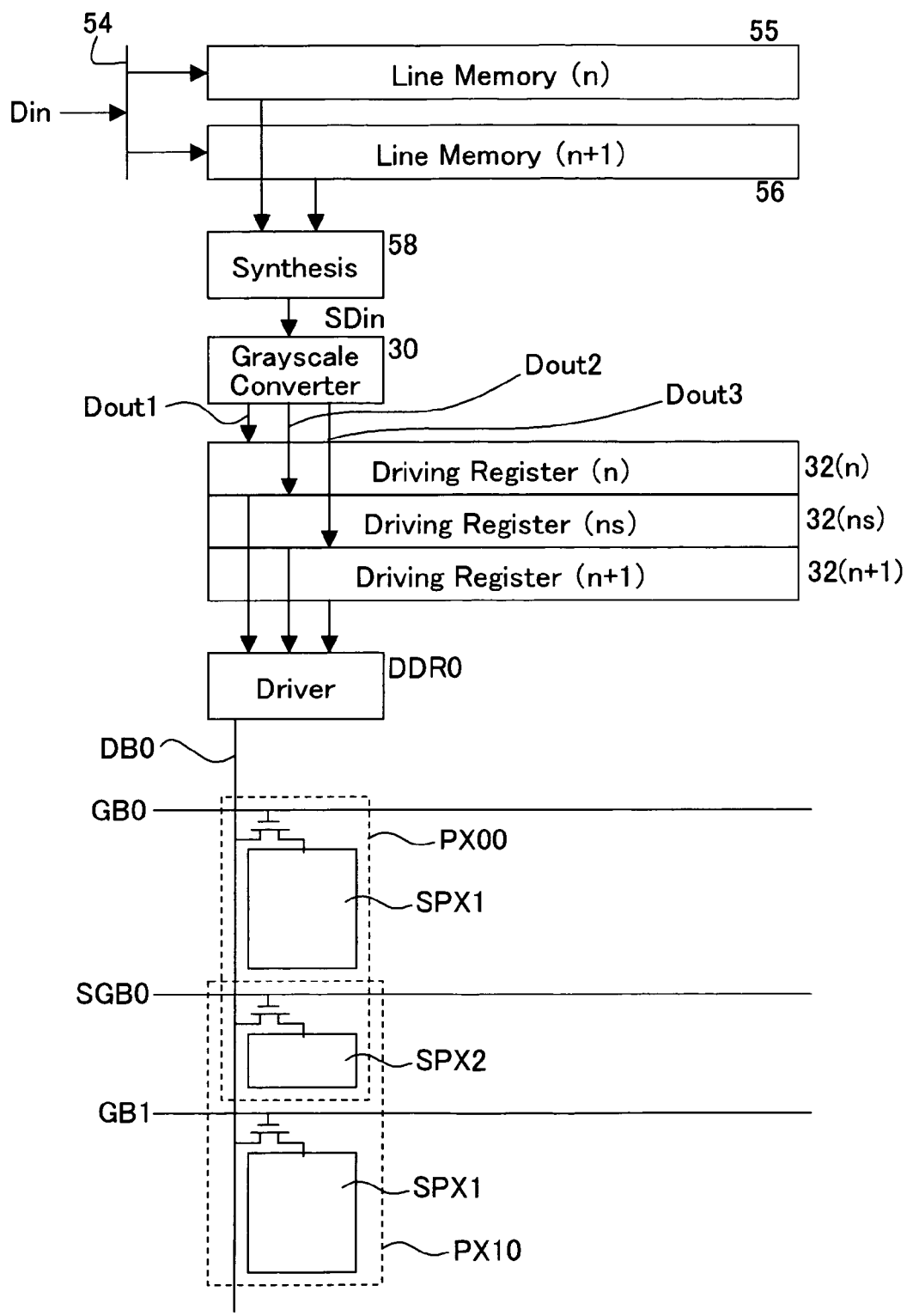
FIG. 24 shows the image signal processing circuit to drive the subpixel electrodes in FIG. 23A.

FIG. 24 shows the image signal processing circuit to drive the subpixel electrodes of FIG. 23A. The input image signal Din is stored in the line memory 55, 56 via the selector 52. For example, the input image signal Din for the nth line is stored in the line memory 55, and the input image signal Din for the n+1th line is stored in the line memory 56. When two lines' worth of input image signals Din are stored in the line memories, the synthesis circuit 58 takes the average of the input image signals for each column. This synthesized input image signal SDin is converted into three output grayscale signals Dout1,2,3 in the grayscale conversion circuit 30. The conversion tables of this grayscale conversion circuit are set so that luminance characteristics necessary for the pixel PX00 can be obtained by the output grayscale signals Dout1,2, and so that luminance characteristics necessary for the pixel PX10 can be obtained by the output grayscale signals Dout2,3.

The converted output grayscale signals Dout1,2,3 are stored in the driving registers 32(n), 32(ns), 32(n+1), respectively, and the driving circuit DDR0 drives the data bus line DB0 in sequence with data voltages corresponding to these output grayscale signals. The gate bus lines GB0, SGB0, GB1 are driven in sequence to correspond with this driving, and the corresponding transistors are made conductive. That is, in two horizontal sync periods, three gate bus lines are driven in sequence.

In the above modified example, the second subpixel electrode is shared by adjacent pixels, so that the configuration of the liquid crystal display panel can be simplified. That is, two pixels are formed from three subpixel electrodes, so that the number of subpixel electrodes can be reduced compared with a configuration in which one pixel comprises two subpixel electrodes, and consequently there are the advantages that the number of thin film transistors can be reduced, reduction of the aperture ratio can be avoided, and the panel construction can be simplified.

Second Embodiment

Figure 25:
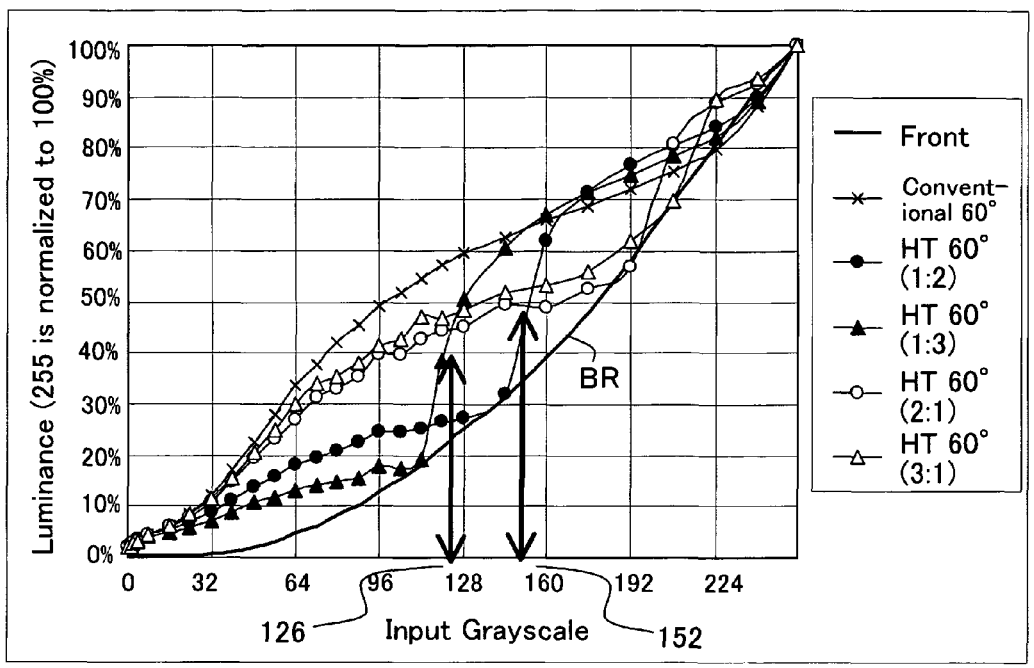
FIG. 25 shows the relation between input grayscale and luminance in the liquid crystal display device of a second embodiment.

FIG. 25 shows the relation between input grayscale and luminance in the liquid crystal display device of a second embodiment. The configuration of the liquid crystal display panel of the second embodiment is similar to that of the first embodiment; pixel electrodes are divided into a plurality of subpixel electrodes, to each of which a data voltage is applied corresponding to an output grayscale signal resulting from grayscale conversion of an input grayscale signal. In the first embodiment, the first subpixel electrode was made small, and the second subpixel electrode was made large. That is, the area ratio of the first and second subpixel electrodes was made 1:2, 1:3, or similar. In this case, a voltage was applied to the first subpixel electrode corresponding to a first output grayscale signal Dout1 which rises to the maximum grayscale value from the minimum grayscale value in the low grayscale region of the input grayscale signal, while a second output grayscale signal Dout2 remained at the minimum grayscale value in this low-grayscale region; and to the second subpixel electrode was applied a voltage corresponding to this second output grayscale signal Dout2, which starts rising from the minimum to the maximum grayscale value in a high input grayscale signal region. By this means, as shown in FIG. 18, the luminance in the upward-60° direction approached the luminance BR in the front direction in a comparatively low input grayscale region, so that washout phenomena in images viewed from the upward-60° direction could be suppressed. Such luminance characteristics are shown in FIG. 25 also as characteristics for area ratios of 1:2 and 1:3. However, in the cases of these luminance characteristics, the luminance in the upward-60° direction is extremely high compared with the front-direction luminance BR in the region of a high input grayscale signal.

On the other hand, when the first subpixel electrode is made larger in area than the second subpixel electrode, so that the area ratio with respect to the second subpixel electrode is 2:1 or 3:1, of course the upward-60° luminance will approach the front-direction luminance BR in the region of high input grayscale signal, as shown in FIG. 25. That is, if the area ratio is reversed, halftone luminancees can be made to approach the ideal value BR in the comparatively high grayscale region.

Hence in the second embodiment, in a first grayscale region with comparatively low input grayscale signal, a high-luminance output grayscale signal for which the luminance value is maximum in the low grayscale region and a low-luminance output grayscale signal for which the luminance value is minimum in the low grayscale region are respectively applied to the first (small-area) subpixel electrode and to the second (large-area) subpixel electrode, and in a second grayscale region with comparatively high input grayscale signal, a low-luminance output grayscale signal and high-luminance output grayscale signal which are the reverse of the above are respectively applied to the first (small-area) subpixel electrode and to the second (large-area) subpixel electrode. That is, if the area ratio of the first and second subpixel electrodes is 1:2, then the luminance characteristics indicated by black circles and the luminance characteristics indicated by white circles in FIG. 25 are switched at the input grayscale value 152, and for input grayscale values of 0 to 152 the luminance characteristic for an area ratio of 1:2 is used, whereas for input grayscale values of 153 to 255 the luminance characteristic for an area ratio of 2:1 is used. Or, if the area ratio of the first and second subpixel electrodes is 1:3, then the luminance characteristics indicated by black triangles and the luminance characteristics indicated by white triangles in FIG. 25 are switched at the input grayscale value 126, and for input grayscale values of 0 to 126 the luminance characteristic for an area ratio of 1:3 is used, whereas for input grayscale values of 127 to 255 the luminance characteristic for an area ratio of 3:1 is used.

Figure 26:
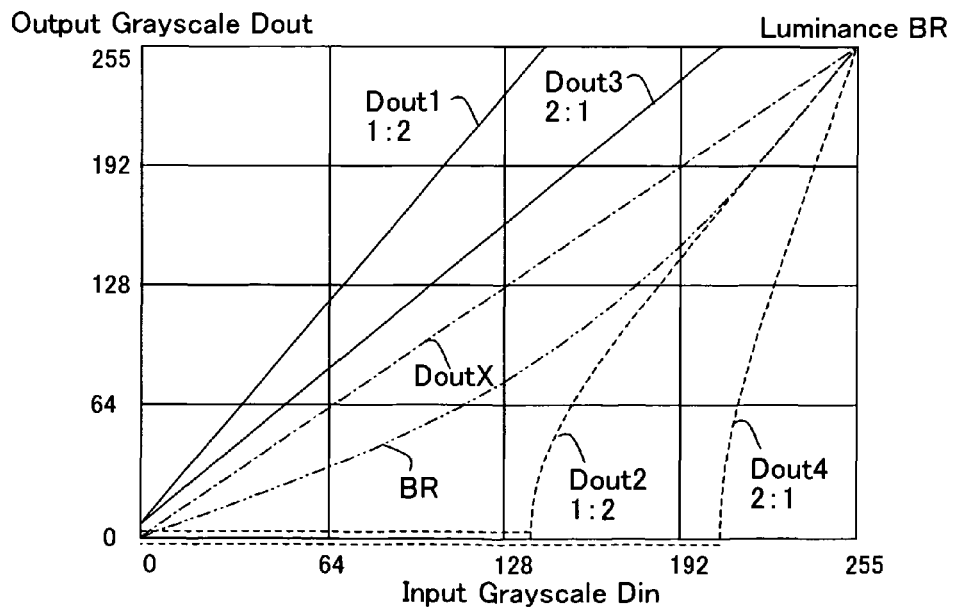
FIG. 26 explains a conversion table of the grayscale conversion circuit in the second embodiment.
Figure 27:
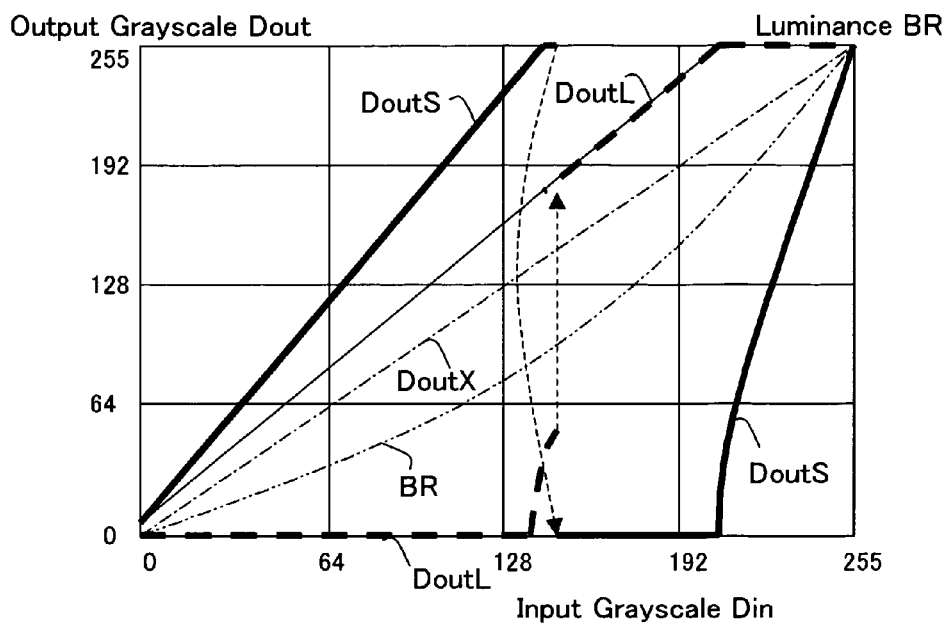
FIG. 27 is an example of a conversion table in the grayscale conversion circuit of the second embodiment.

FIG. 26 explains a conversion table of the grayscale conversion circuit in the second embodiment. And, FIG. 27 is an example of a conversion table in the grayscale conversion circuit of the second embodiment. All are examples for the case of a subpixel electrode area ratio of 1:2. As shown in FIG. 26, if the area ratio of the first and second subpixel electrodes is 1:2, and if a high-luminance output grayscale signal is applied to the first (small-area) subpixel electrode and a low-luminance output grayscale signal is applied to the second (large-area) subpixel electrode, then the high-luminance output grayscale signal Dout1 rises from the minimum grayscale value of 0 to the maximum grayscale value of 255 in the input grayscale signal range Din of 0 to approximately 135, as indicated in FIG. 26, and the low-luminance output grayscale signal Dout2 rises from the minimum grayscale value of 0 to the maximum grayscale value of 255 in the input grayscale signal Din range of 136 to 255, as shown in FIG. 26. By this means, the luminance characteristic BR from the front direction has an ideal gamma characteristic.

On the other hand, if the area ratio of the first and second subpixel electrodes is 2:1, and if a high-luminance output grayscale signal Dout3 is applied to the second (large-area) subpixel electrode and a low-luminance output grayscale signal Dout4 is applied to the first (small-area) subpixel electrode, then the high-luminance output grayscale signal Dout3 rises from the minimum grayscale value of 0 to the maximum grayscale value of 255 in the input grayscale signal range Din of 0 to approximately 200, and the low-luminance output grayscale signal Dout4 rises from the minimum grayscale value of 0 to the maximum grayscale value of 255 in the input grayscale signal Din range from 201 to 255. This also is to ensure that the luminance characteristic BR from the front direction has an ideal gamma characteristic.

Here, by switching the output grayscale signals Dout1, Dout2 to Dout3, Dout4 at the input grayscale value of 152 at which the luminance characteristics indicated by black and white circles intersect in FIG. 25, the two luminance characteristics for area ratios of 1:2 and 2:1 closest to the ideal front-direction luminance characteristic BR can be combined.

FIG. 27 is an example of a conversion table in the grayscale conversion circuit of the second embodiment. In order to obtain the above-described two luminance characteristic regions, the conversion table is formed by combining the four conversion tables Dout1-4 shown in FIG. 26. In this table, in the low-input grayscale region equal to or below a grayscale value of 152, the output grayscale signals DoutS, DoutL (the output grayscale signals Dout1, Dout2 of FIG. 26) are applied to the small-area subpixel electrode and large-area subpixel electrode, and in the high-input grayscale region above 152, the output grayscale signals DoutS, DoutL (Dout4, Dout3 in FIG. 26) are applied. By this means, at input grayscale signal values of 0 to 152 the luminance characteristic (black circles) for an area ratio of 1:2 in FIG. 25 is adopted, and at input grayscale signal values from 153 to 255 the luminance characteristic (white circles) for an area ratio of 2:1 in FIG. 25 is adopted. The grayscale conversion circuit 30 of FIG. 10 and FIG. 17 references the conversion table of FIG. 27, and generates the output grayscale signal DoutS for the small-area subpixel electrode and the output grayscale signal DoutL for the large-area subpixel electrode.

Figure 28:
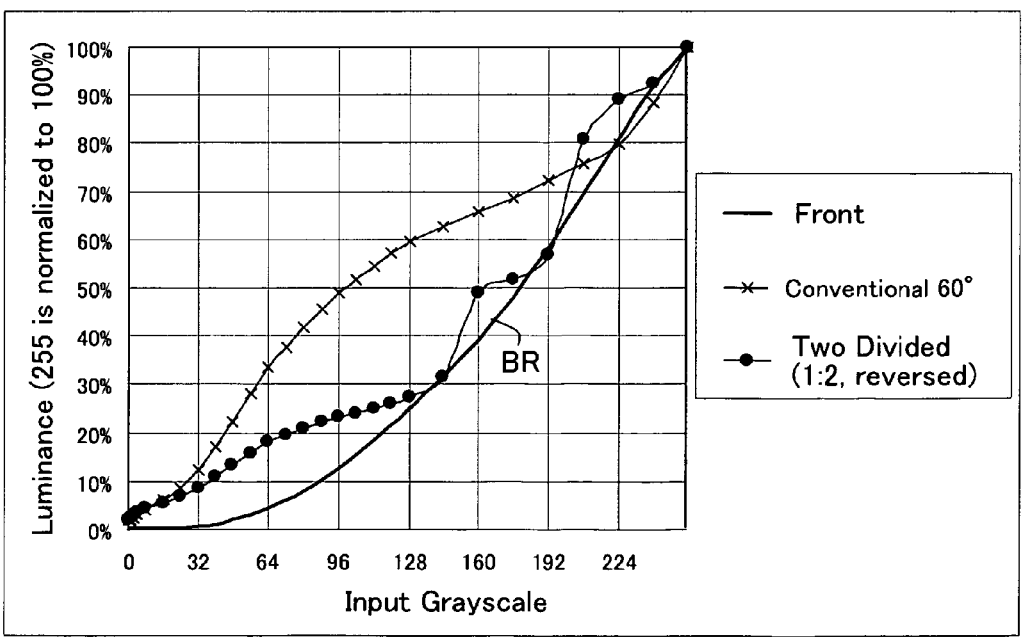
FIG. 28 shows the relation between input grayscale and luminance in the second embodiment.

FIG. 28 shows the relation between input grayscale and luminance in the second embodiment. That is, the characteristic indicated by black circles in FIG. 28 is a luminance characteristic which combines the black circles and white circles in FIG. 25. As is seen from FIG. 28, even in a low input grayscale region, it is possible to approach the characteristics to some extent toward the ideal luminance characteristic BR, and in the high-input grayscale region also, the characteristics can be approached the ideal luminance characteristic BR. Compared with the upward-60° characteristic when a single pixel electrode is used (the conventional upward-60° characteristic), the luminance characteristic of the second embodiment, in which the luminance characteristics of the two subpixel electrodes are switched over the entire input grayscale region (the black circles in FIG. 28), is seen to more closely approach the ideal front-direction luminance characteristic BR.

Figure 29:
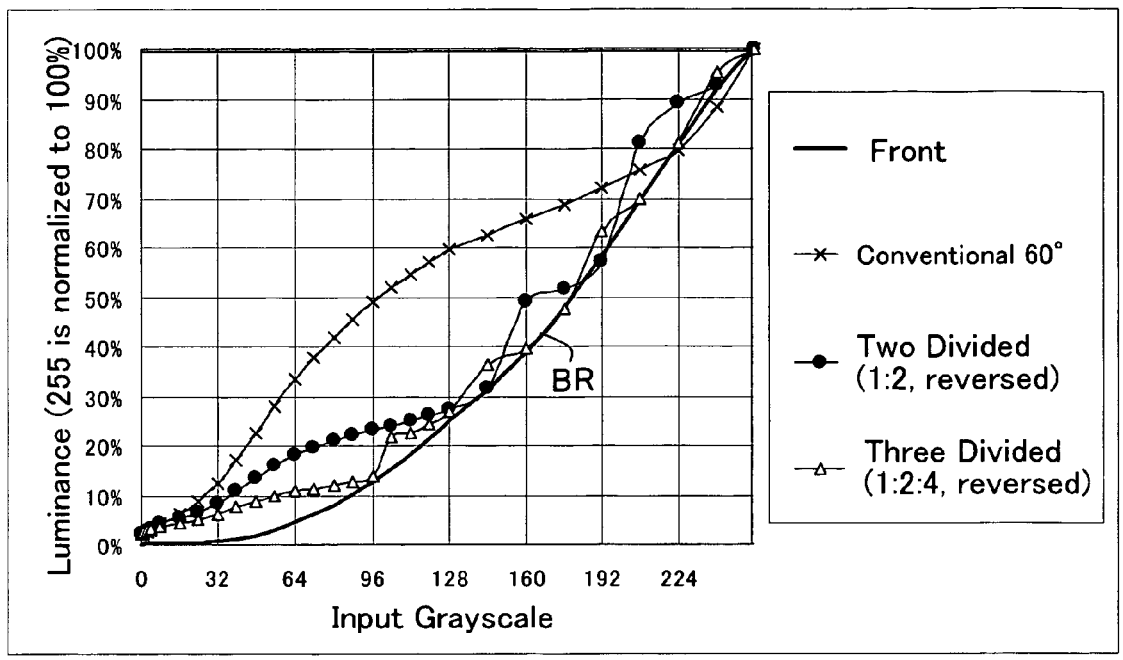
FIG. 29 shows the luminance characteristics of a modified example of the second embodiment.

FIG. 29 shows the luminance characteristics of a modified example of the second embodiment. In this modified example, as indicated by the characteristic denoted by white triangles, pixel electrodes are divided into three subpixel electrodes with an area ratio of 1:2:4, and seven conversion tables are combined to generate output grayscale signals to apply to these subpixel electrodes. That is, the applied voltages are controlled such that, with increasing input grayscale signal, the sum of the areas of lit subpixel electrodes rises in the proportion 1, 2, 3, 4, 5, 6, 7, 8. As shown in the figure, the luminance characteristic of the white triangles is close to the ideal front-direction luminance gamma characteristic BR.

Figure 30:
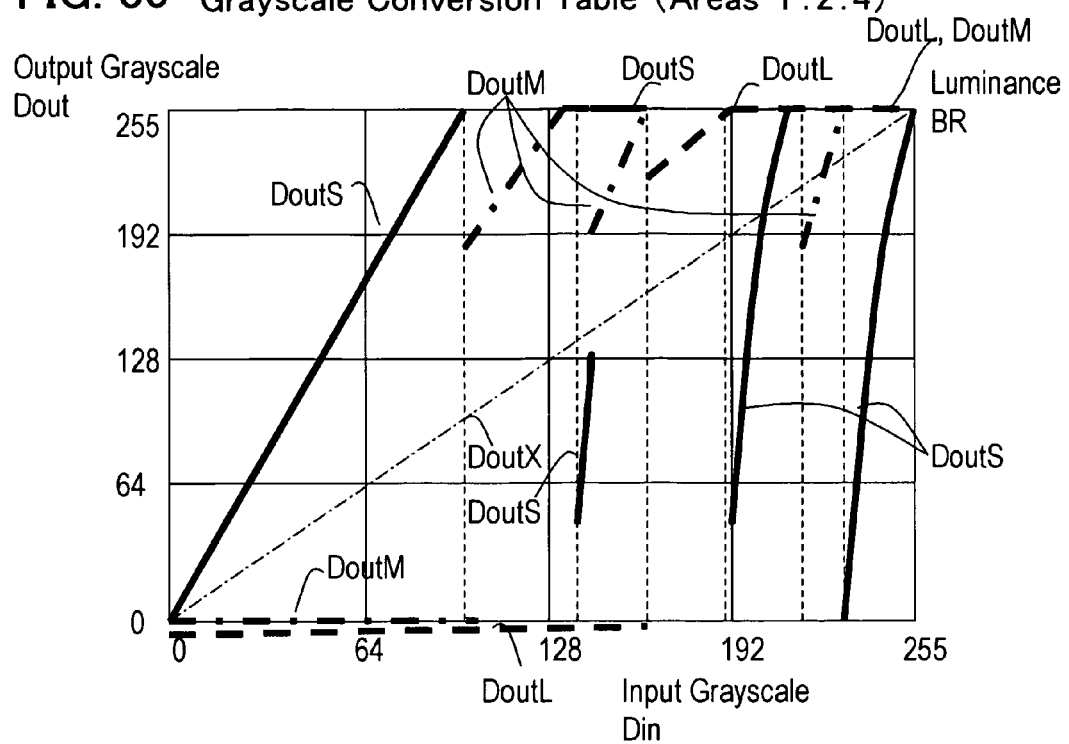
FIG. 30 is an example of a conversion table in the grayscale conversion circuit of a modified example of the second embodiment.

FIG. 30 is an example of a conversion table in the grayscale conversion circuit when the three subpixel electrodes of FIG. 29 are divided in the ratio 1:2:4. In the seven regions of the input grayscale Din, the output grayscale signal DoutS for the smallest subpixel electrode with proportional area 1, the output grayscale signal DoutM for the intermediate subpixel electrode with proportional area 2, and the output grayscale signal DoutL for the largest subpixel electrode with proportional area 4, rise and fall in alternation in binary fashion. At the boundaries of the regions AR1 to AR7, subpixel electrodes where the transmittance is high are switched. That is, in the region AR1 with the lowest input grayscale Din, only the output grayscale signal DoutS for the smallest subpixel electrode rises; in the next region AR2, only the grayscale signal DoutM for the intermediate subpixel electrode rises; in the next region AR3, the output grayscale signals DoutS and DoutM have high values; in the next region AR4, only the output grayscale signal DoutL for the largest subpixel electrode rises; in the region AR5 the output grayscale signal DoutS rises in addition to DoutL; in the region AR6 the output grayscale signals DoutL, DoutM rise; and in the region AR7, in addition to these, the output grayscale signal DoutS rises. In all cases, the output grayscale values are set so that the sum of the luminancees in the front direction equals to the ideal luminance BR.

However, increasing the number of subpixel electrodes as in FIG. 29 and FIG. 30 implies increasing the number of data bus lines and gate bus lines, with the disadvantage that the liquid crystal display panel configuration becomes complex. Hence it is desirable that the configuration be optimized with a balance struck between the luminance characteristic and the complexity of the panel construction.

Third Embodiment

Figure 31:
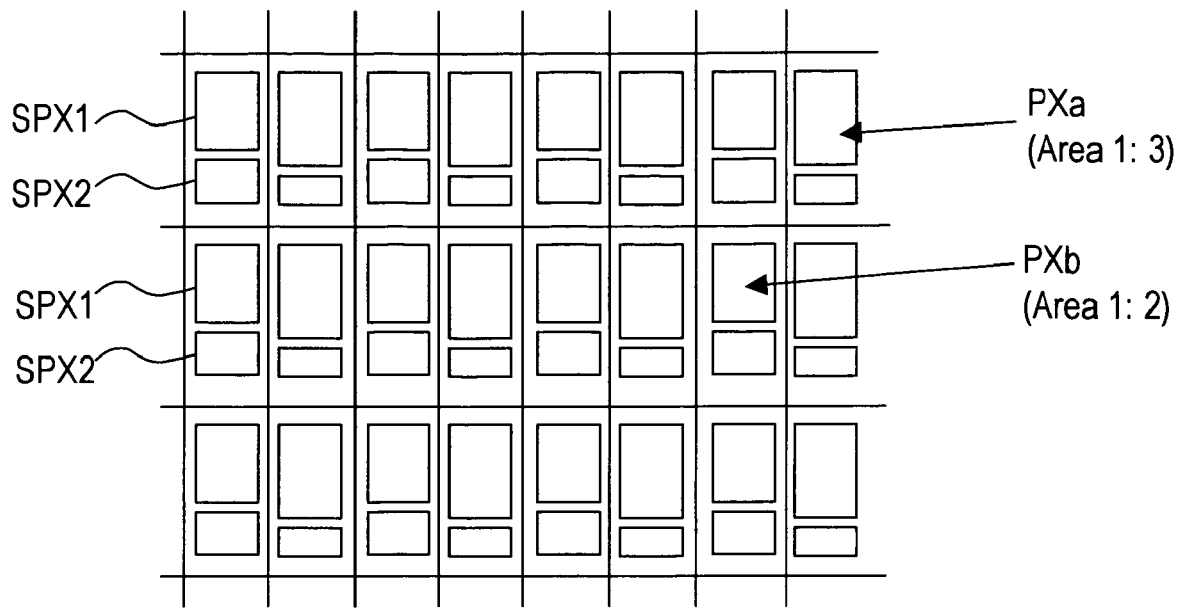
FIG. 31 is a schematic diagram showing an example of the configuration of subpixel electrodes in a third embodiment.

FIG. 31 is a schematic diagram showing an example of the configuration of subpixel electrodes in a third embodiment. In this example, each pixel is divided into a first and second subpixel electrode SPX1, SPX2, and combinations of area ratios of 1:2 and 1:3 are intermixed. That is, in the row direction, pixels PXa with an area ratio of 1:3 and pixels PXb with an area ratio of 1:2 are arranged in alternation. In this case, two data bus lines may be provided for each column, and there may be two gate bus lines in each row for one data line per column.

As shown in the luminance characteristic diagram of FIG. 18 in the first embodiment, when a high-luminance output grayscale signal which rises to the maximum grayscale value in a low-input grayscale region is applied to the small-area first subpixel electrode, and a low-luminance output grayscale signal which rises from the minimum grayscale value in a high-input grayscale region is applied to the large-area second subpixel electrode, given for example the luminance characteristic indicated by white triangles (subpixel electrode area ratio 1:3), the characteristic is divided into two, for the low-input grayscale region and the high-input grayscale region. That is, the upward-60° direction luminance characteristic is such that after small-area subpixel electrodes reach maximum luminance the large-area subpixel electrodes begin to light, so that when the luminance at the large-area subpixel electrodes is increased, a rapid increase in luminance tends to arise. Consequently a binary-converted image, i.e. dark or bright, is observed from the upward-60° direction.

In order to suppress such binary-converted images, the large-area subpixel electrodes should be made to begin lighting before the small-area subpixel electrodes reach maximum luminance. However, this method eliminates states of maximum luminance of small-area subpixel electrodes and minimum luminance of large-area subpixel electrodes, and to some extent sacrifices the advantageous result of bringing the upward-60° image closer to the front-direction image luminance.

Hence in the third embodiment, by intermixing pixels with different subpixel electrode area ratios as shown in FIG. 31, a luminance characteristic can be obtained which is the average of the characteristic (x's) for an area ratio of 1:2 and the characteristic (white triangles) for an area ratio of 1:3, as in FIG. 18. Sharp increases in luminance in halftone regions can be suppressed, and the phenomenon of binary-conversion of images can be alleviated.

Figure 32:
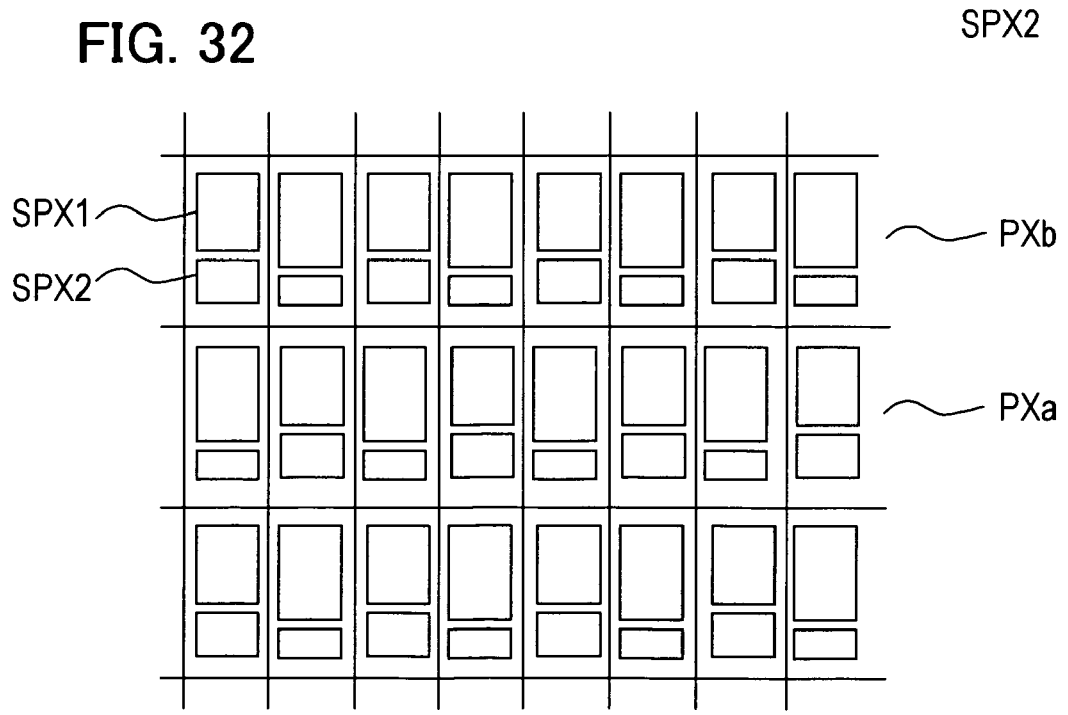
FIG. 32 is a schematic diagram showing another example of the configuration of subpixel electrodes in the third embodiment.

FIG. 32 is a modified example of the third embodiment, in which pixels PXa with an area ratio of 1:3 and pixels PXb with an area ratio of 1:2 are arranged in a diagonal-mesh pattern. That is, the pixels PXa and PXb alternate in both the row and column directions. By this means, the intermixing of the two pixel types can be made less prominent.

Figure 33:
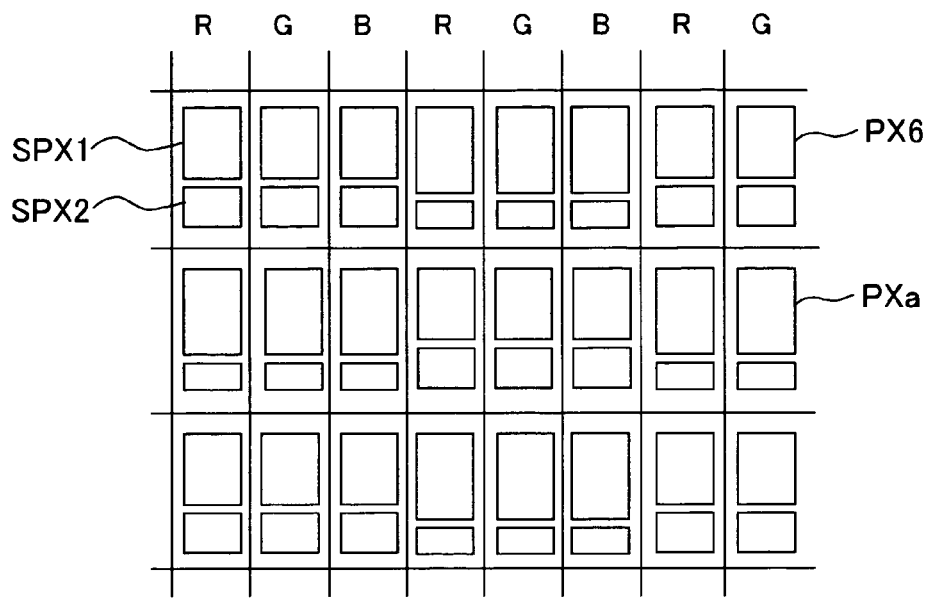
FIG. 33 is a schematic diagram showing another example of the configuration of subpixel electrodes in the third embodiment.

FIG. 33 is another modified example of the third embodiment, in which the pixels PXa and PXb are arranged in alternation for each RGB pixel group.

Fourth Embodiment

In a fourth embodiment, as a modification of the second embodiment, input grayscales for RGB input image signals are compared, and the conversion table of the grayscale conversion circuit is switched based on magnitude relationships of the input grayscales. That is, the conversion table for which grayscale differences of subpixel electrodes are smallest is used for pixels of the color having the highest input grayscales, and the conversion table for which grayscale differences of subpixel electrodes are greatest is used for pixels of the color having the lowest input grayscales. By this means, luminance differences in RGB colors in an image viewed from an oblique direction (upward-60°) can be rendered the same as the luminance differences in RGB colors of an image viewed from the front direction, so that an image viewed from an oblique direction can be brought closer to the image viewed from the front.

Figure 34:
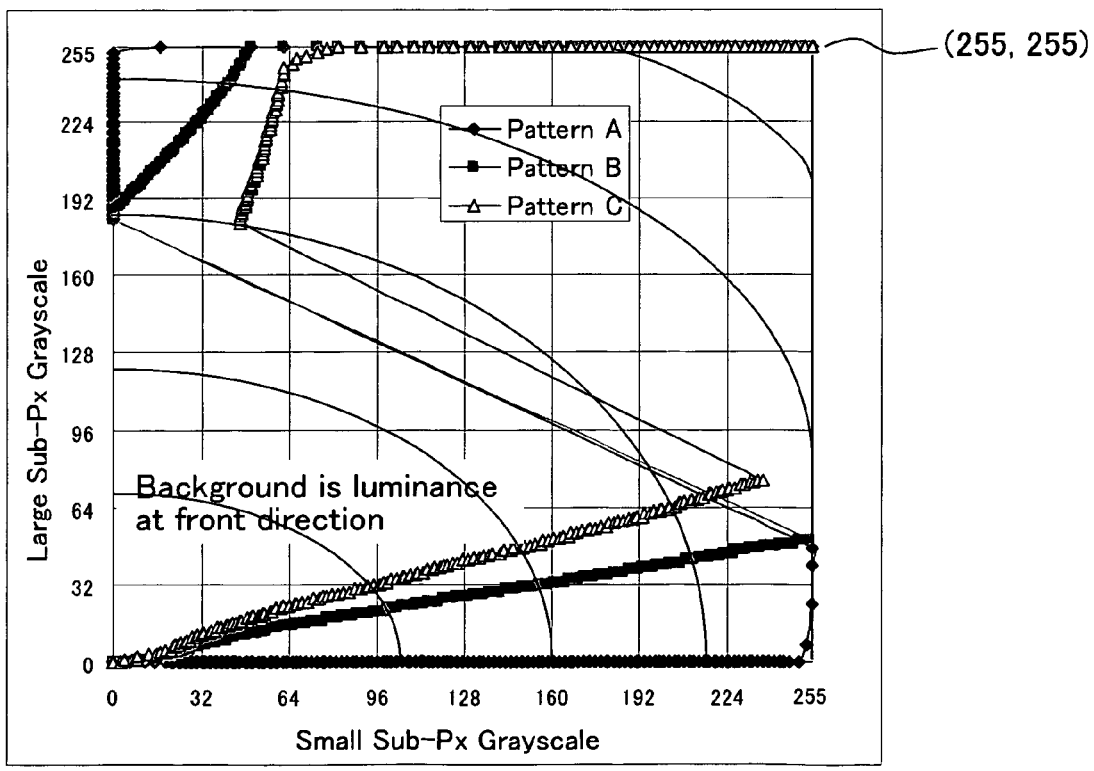
FIG. 34 explains the principle of a fourth embodiment.

FIG. 34 explains the principle of the fourth embodiment. In this figure, the horizontal axis corresponds to the luminance at the small-area subpixel electrodes, and the vertical axis to the luminance at the large-area subpixel electrodes. The graph background indicates the luminance distribution in the panel front direction. When a conversion table is used in which the luminance at two subpixel electrodes increases simultaneously with increasing input grayscale of the image signal, the change in luminance of the two subpixel electrodes describes a straight line connecting the origin (0,0) and the maximum luminance (255,255) in the graph of FIG. 34. This is equivalent to a driving control in which, for a single pixel electrode, the output grayscale and the luminance thereby increases according to the increase of input grayscale.

On the other hand, in order to suppress the distortion characteristic in the image halftone region for an oblique direction (upward-60°), it is preferable that a characteristic which deviates as far as possible from the above-described straight line connecting the origin (0,0) and the maximum luminance (255,255) be applied to the two pixel electrodes. According to this viewpoint, in the conversion characteristic of FIG. 27, as in pattern A in FIG. 34, with increasing input grayscale, the luminance at small-area subpixel electrodes initially rises, and after this ends the luminance at large-area subpixel electrodes rises and, taking the input grayscale value of 152 as a boundary, the luminance at large-area subpixel electrodes rises to the maximum value, after the end of which the luminance at small-area subpixel electrodes rises. Here, the luminance characteristic is the characteristic of pattern A (white triangles) in FIG. 35.

Figure 35:
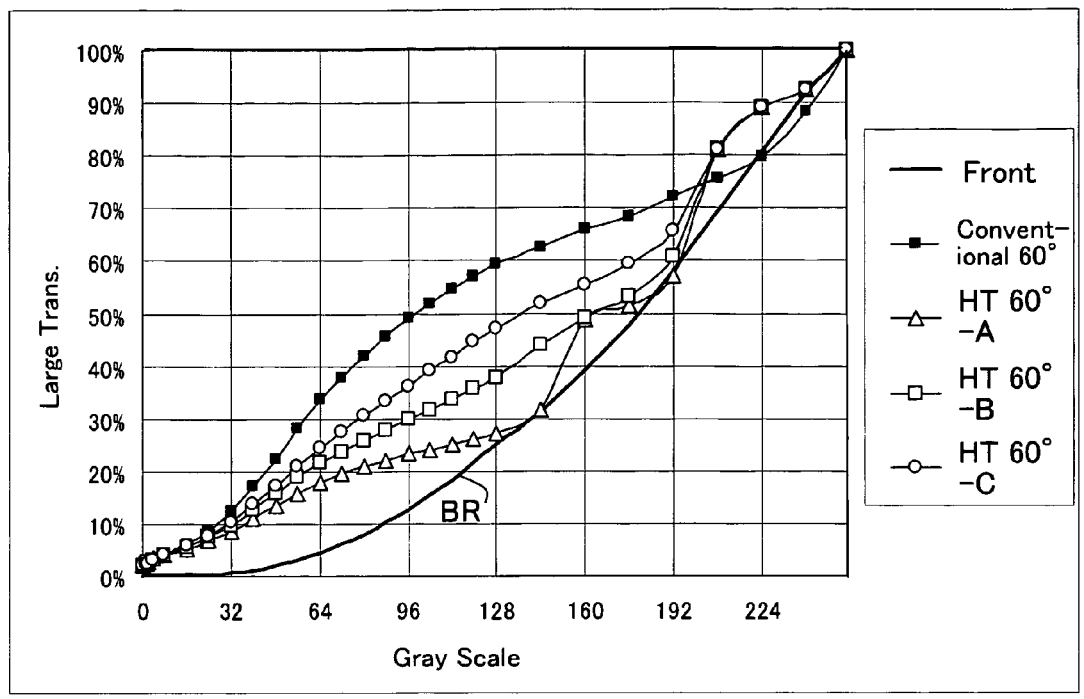
FIG. 35 shows the luminance characteristics versus input grayscale for patterns A, B and C.

In FIG. 34, luminance characteristic patterns B and C are shown in addition to pattern A; in FIG. 35, the luminance characteristic with input grayscale values for the cases of patterns A, B and C are shown. In FIG. 35, the horizontal axis indicates the input grayscale, and the vertical axis indicates the normalized luminance value.

Figure 36:
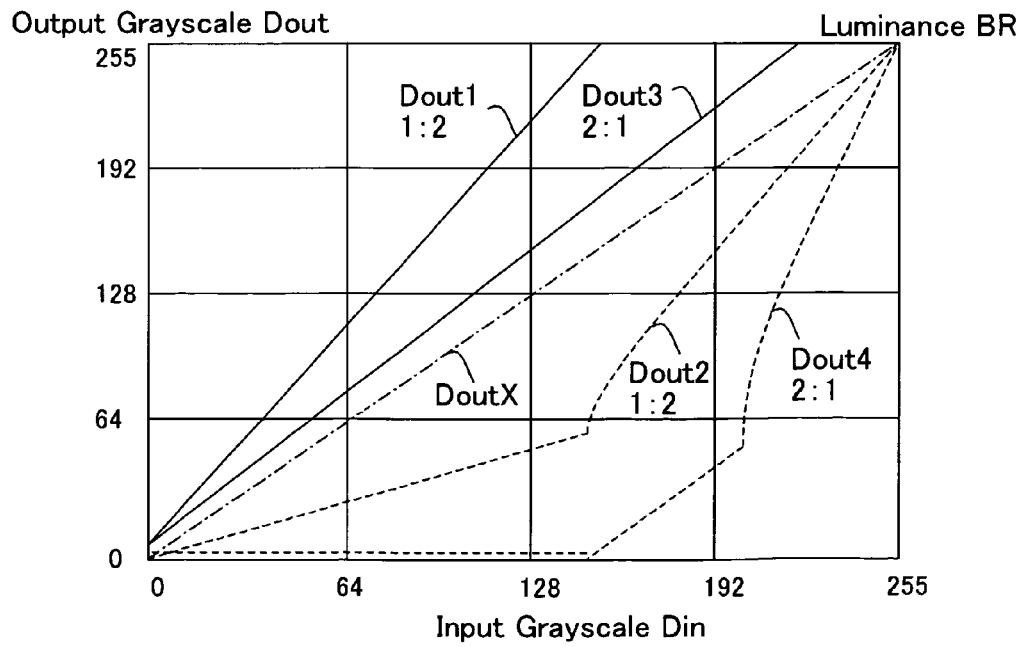
FIG. 36 shows four table examples constituting a conversion table for pattern B.

FIG. 36 shows four table examples constituting a conversion table for pattern B. In pattern B, the conversion characteristic is designed such that, when for subpixel electrodes with an area ratio of 1:2 the first output grayscale signal Dout1 rises from the minimum output grayscale value to the maximum output grayscale value, at the same time the second output grayscale signal Dout2 rises to a certain output grayscale value, and moreover, before the third output grayscale signal Dout3 reaches the maximum output grayscale value, the fourth output grayscale signal Dout4 begins to rise. Comparing this with the output grayscale signal of pattern A in FIG. 26, the output grayscale signal of pattern B is such that the inclination of the first output grayscale signal Dout1 is somewhat smaller, and so in order to secure the ideal luminance characteristic for the front direction, the second output grayscale signal Dout2 rises from the low-input grayscale Din region. That is, when compared with pattern A, pattern B entails a smaller difference between the first output grayscale signal Dout1 and the second output grayscale signal Dout2 at the same input grayscale Din, and has a characteristic which is closer to the grayscale characteristic DoutX for the sum of the two pixels. Similarly in the case of pattern B, the difference between the third output grayscale signal Dout3 and the fourth output grayscale signal Dout4 is smaller than for pattern A.

As in the second embodiment in FIG. 27, the conversion table is switched among these four tables in moving from low to high input grayscale regions. Using such a conversion mode, similarly to the case when the conversion table of FIG. 27 is adopted, the subpixel electrode luminance difference does not reach the maximum, the first grayscale region GS1 and second grayscale region GS2 of FIG. 11 overlap, and the image luminance for oblique (upward-60°) viewing is somewhat higher than the image luminance from the front direction over the entire input grayscale range. In other words, the result is as indicated by the characteristic curve described by white squares in FIG. 35.

Figure 38:
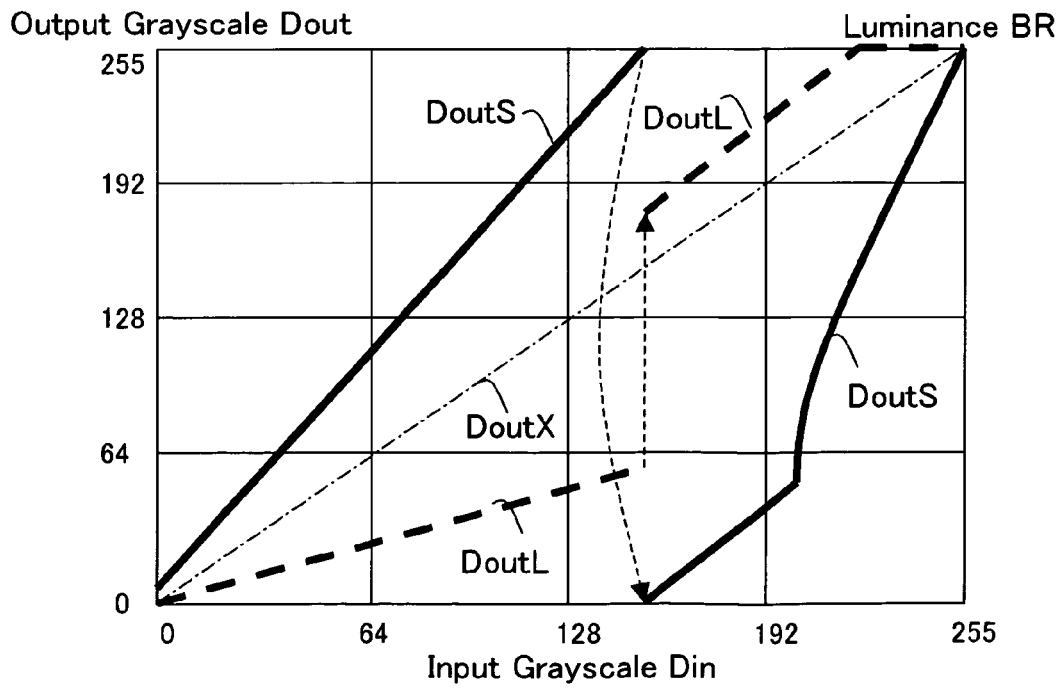
FIG. 38 shows a conversion table example for a grayscale conversion circuit for pattern B, combining the four conversion tables of FIG. 36.

FIG. 38 shows a conversion table example for a grayscale conversion circuit for pattern B, combining the four conversion tables of FIG. 36. In the first or low-input grayscale region, the output grayscale signals Dout1, Dout2 are employed as the small-area subpixel electrode output grayscale signal DoutS and the large-area subpixel electrode output grayscale signal DoutL, and in the second input grayscale region which is higher than the first input grayscale region, the output grayscale signals Dout3, Dout4 are employed as the large-area subpixel electrode output grayscale signal DoutL and the small-area subpixel electrode output grayscale signal DoutS. In this way, by using the conversion table of FIG. 38 which combines the four conversion tables of FIG. 36, the pattern B luminance characteristic B (denoted by white squares) of FIG. 35 can be obtained. When this pattern B is adopted, as indicated in FIG. 34, changes in luminance value at the two subpixel electrodes are closer to the diagonal line than pattern A. And as shown in FIG. 35, in the input grayscale halftone region (intermediate grayscale region), the luminance values moves somewhat higher than the luminance value BR of the image viewed from the front.

Figure 37:
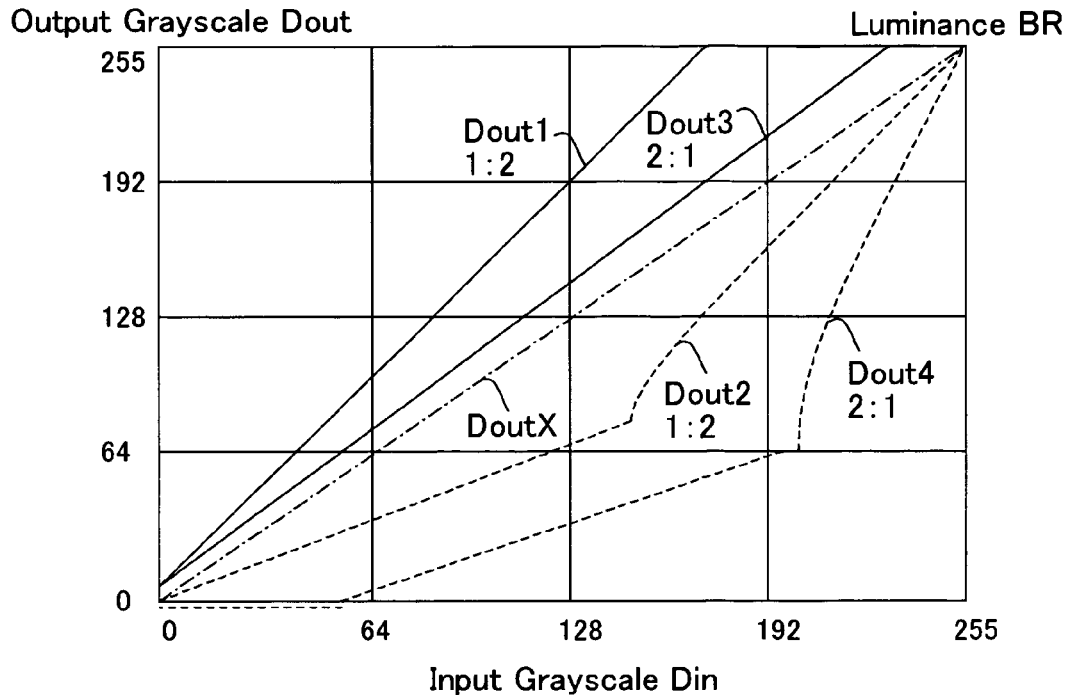
FIG. 37 shows four table examples constituting a conversion table for pattern C.

FIG. 37 shows examples of the four tables constituting the conversion table for pattern C. The relation between the first and second output grayscale signals Dout1, Dout2 and the relation between the third and fourth output grayscale signals Dout3, Dout4 for this pattern C are similar to those for pattern B in FIG. 36. That is, compared with patterns A and B, in the case of pattern C in FIG. 37 the difference between the first and second output grayscale signals Dout1 and Dout2 for the same input grayscale is smaller, and similarly, the difference between the third and fourth output grayscale signals Dout3 and Dout4 for the same input grayscale is also smaller. That is, the characteristic is closer to the characteristic DoutX for the subpixel total.

Figure 39:
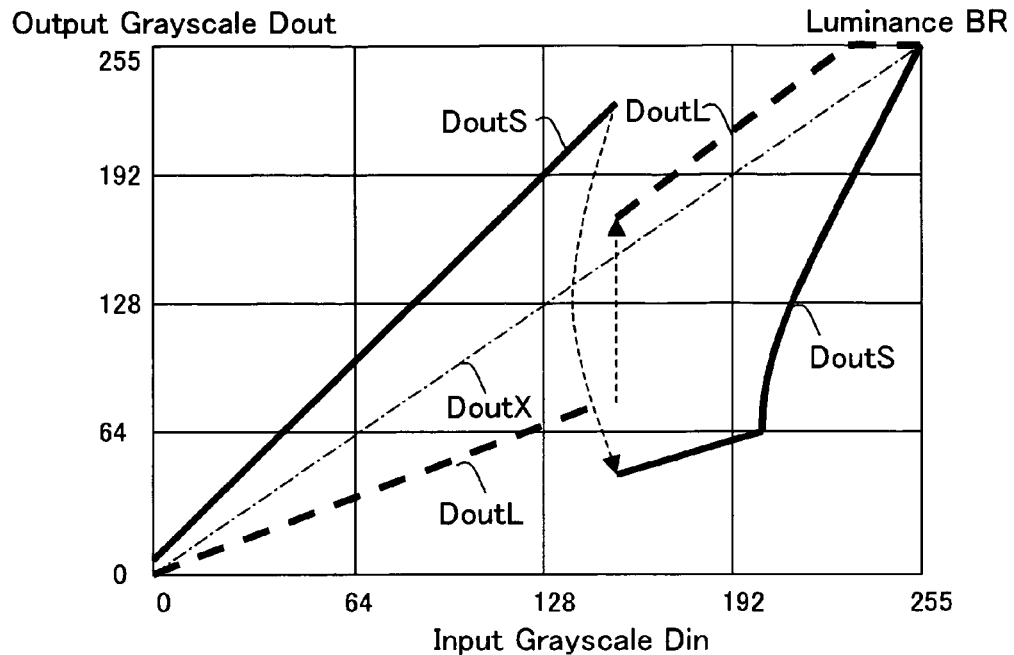
FIG. 39 shows a conversion table example for a grayscale conversion circuit for pattern C, combining the four conversion tables of FIG. 37.

FIG. 39 shows a conversion table example for a grayscale conversion circuit for pattern C, combining the four conversion tables of FIG. 37. The method of combination of the small-area subpixel electrode output grayscale signal DoutS and large-area subpixel electrode output grayscale signal DoutL is the same as in FIG. 27 and FIG. 38. By using the conversion table of FIG. 39, the luminance characteristic C (white circles) of FIG. 35 can be obtained. Using this pattern C, as indicated by FIG. 34, the characteristics of pattern C approaches to the diagonal line more closely than patterns A or B. Also, as indicated in FIG. 35, using pattern C the luminance value is shifted up somewhat higher than for the front-direction image luminance BR or for patterns A and B in the input halftone region, and the characteristic is closer to the conventional 60° characteristic (black squares).

Thus on comparing conversion tables for patterns A, B and C, it is found that the luminance of an image viewed obliquely (from the upward-60° direction) increases in the order A<B<C.

In the case of the luminance characteristic of the pattern A shown in FIG. 35, an adequate luminance difference cannot be generated for an input grayscale difference in the input halftone (intermediate grayscale) region, and particularly in the low-input grayscale region. That is, in an image A (white triangles) viewed obliquely (upward-60°), the amount of change in luminance for input grayscale in the low-grayscale region is small compared with the image BR viewed from the front. Hence a somewhat washed-out image is observed from an oblique direction. In order to suppress this, in the fourth embodiment, RGB input grayscales are compared and a grayscale conversion table based on pattern C (white circles, high luminance) is adopted for the color having the highest input grayscale value, a grayscale conversion table based on pattern B (white squares, intermediate luminance) is adopted for the color having intermediate input grayscale values, and a grayscale conversion table based on pattern A (white triangles, low luminance) is adopted for the color having the lowest input grayscale values. That is, the grayscale conversion table is changed according to the magnitude of the input grayscale values. By this means, differences in output grayscale values corresponding to the differences in the RGB input grayscale values can be reproduced in an image viewed obliquely (upward-60°), and differences in luminance values in an image observed obliquely (from the upward-60° direction) can be made similar to the differences in luminance values in an image viewed from the front direction, so that the image quality when viewed obliquely can be enhanced.

Figure 40:
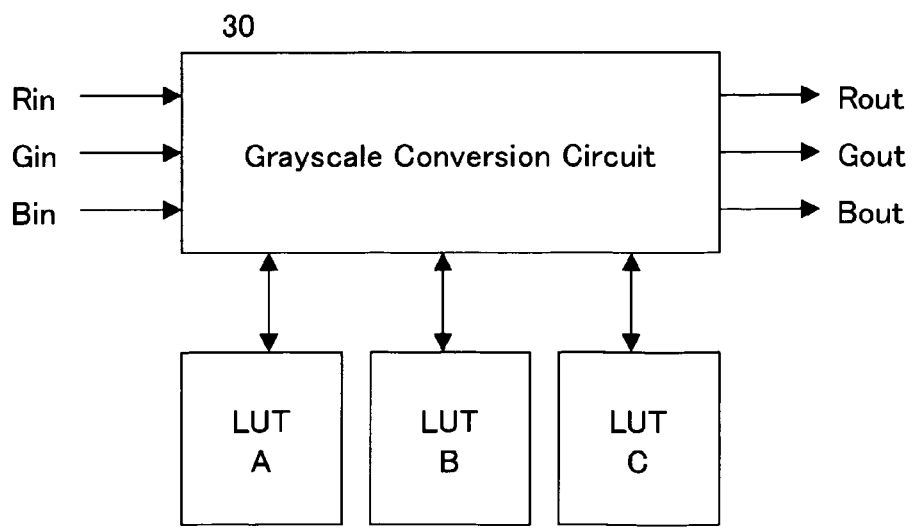
FIG. 40 shows the configuration of the grayscale conversion circuit in the fourth embodiment.

FIG. 40 shows the configuration of the grayscale conversion circuit in the fourth embodiment. The grayscale conversion circuit 30 converts the RGB input grayscale signals Rin, Gin, Bin into the respective RGB output grayscale signals Rout, Gout, Bout; but the respective input grayscale values are compared, and one of the conversion tables LUTA, LUTB, LUTC corresponding to the patterns A, B, C is selected to perform grayscale conversion.

Figure 41:
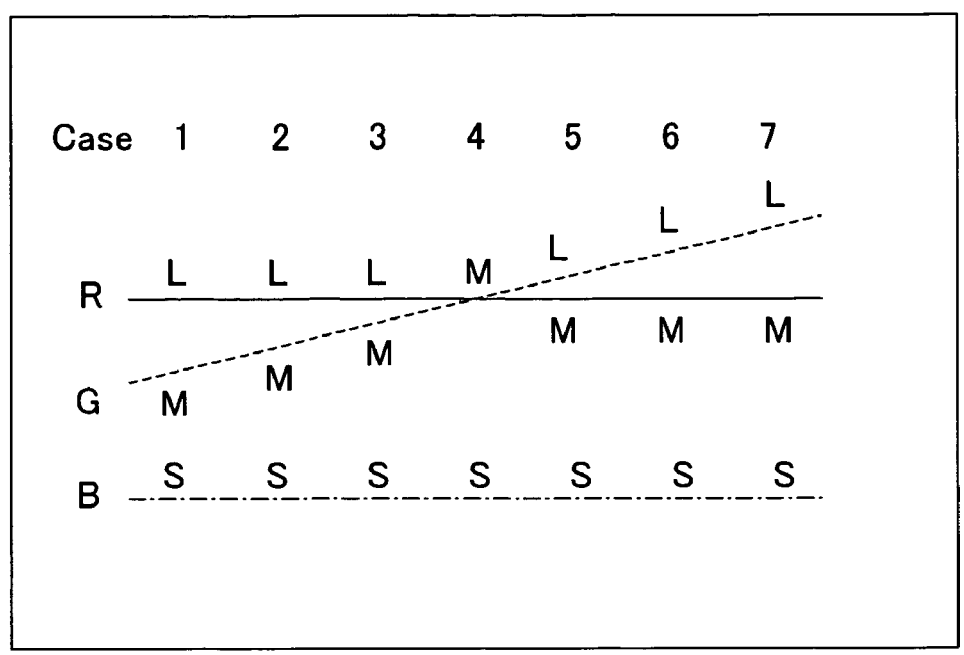
FIG. 41 shows an example of selection of a conversion table by the grayscale conversion circuit.

FIG. 41 and FIG. 42 show examples of selection of a conversion table by the grayscale conversion circuit. As one example, a case is explained in which blue B grayscale values are always lowest, and red R and green G grayscale values are different, as an example of RGB grayscales in seven display regions, as shown in FIG. 41 and in FIG. 42A.

As shown in FIG. 41 and FIG. 42B, in case 1 the red R is maximum, green G is second, and blue B is minimum, so that the input grayscale signal Rin for red R is converted into an output grayscale signal Rout based on the pattern C conversion table LUTC having the conversion characteristic with the greatest luminance; the input grayscale signal Gin for green G is converted into an output grayscale signal Gout based on the pattern B conversion table LUTB having the conversion characteristic with the second-highest luminance; and blue B is converted using the pattern A conversion table LUTA having the conversion characteristic with the lowest luminance. Cases 2 and 3 are processed similarly to case 1, using the conversion tables LUTC, LUTB, LUTA for the red R, green G and blue B grayscale signals.

In case 4, red R and green G have substantially the same input grayscale values, so that the conversion table LUTB with the conversion characteristic having the second-highest luminance is used for these colors, and conversion table LUTA is used for blue B.

In cases 5, 6 and 7, green G has the greatest input grayscale values, so that the conversion table LUTC is used; red R has the second-highest input grayscale values, so that the conversion table LUTB is used; and blue B has the lowest input grayscale values, so that conversion table LUTA is used.

In FIG. 42C, when the difference in input grayscale values for red R and green G is within a prescribed range, the input grayscales are regarded as the same, and the conversion table LUTB with second-highest luminance is used. Otherwise, treatment is the same as FIG. 42B.

As described above, by comparing the input grayscale values for the three RGB colors and performing grayscale conversion using the conversion table which converts to higher luminancees for the input grayscale values of a color having higher input grayscale values, luminancees can be expressed with the same relative magnitudes as the order of the input grayscale values for the three colors, so that the image quality of an image viewed obliquely can be made close to the image quality of the image viewed from the front direction.

Figure 43:
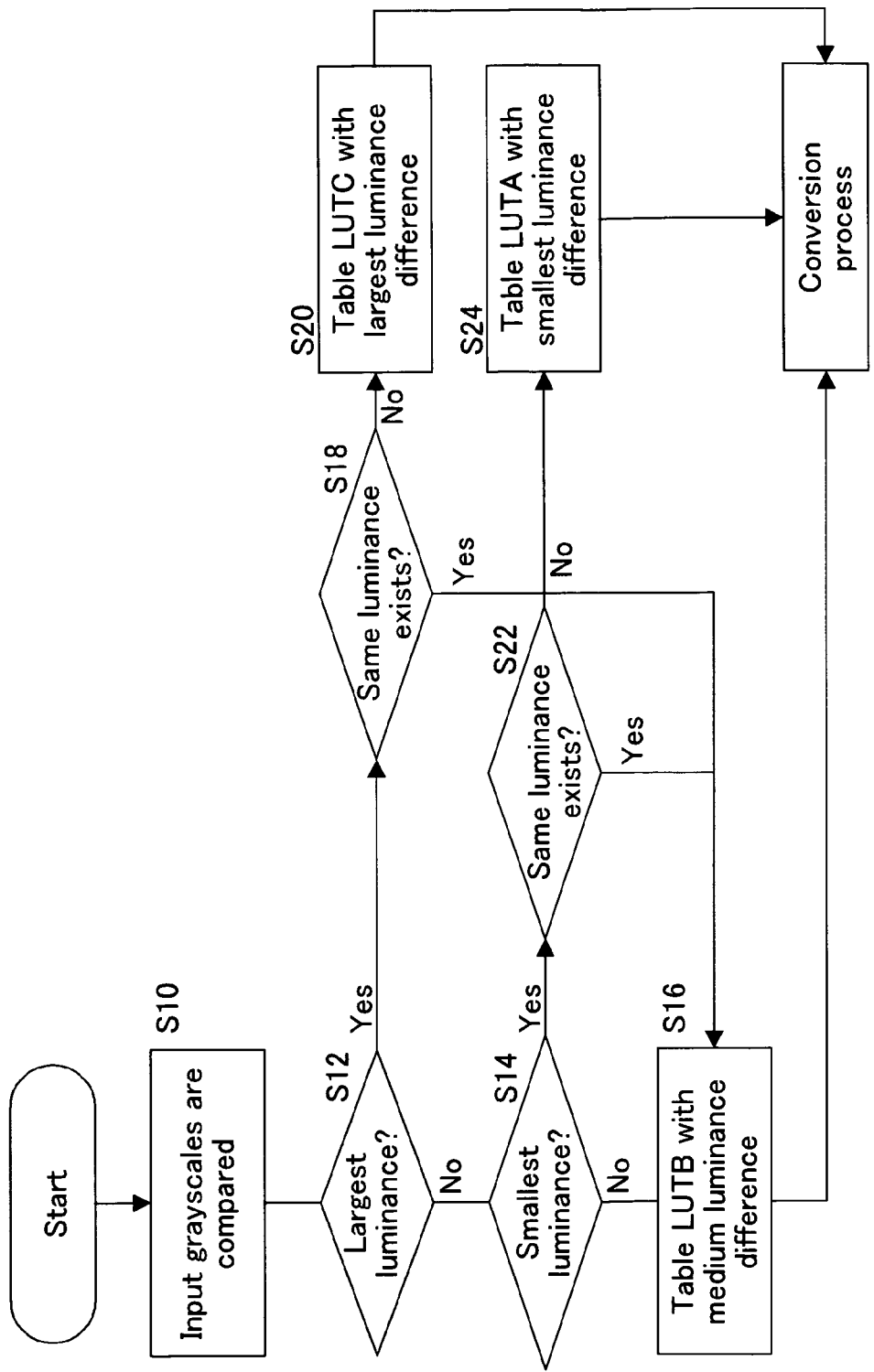
FIG. 43 is a flowchart showing the conversion table selection algorithm of the grayscale conversion circuit 30.

FIG. 43 is a flowchart showing the conversion table selection algorithm of the grayscale conversion circuit 30. The RGB input grayscale data for the same pixel is compared (S10), and the input grayscale data for a color to be converted is judged to be greatest, second-greatest, or smallest (S12, S14). If second-greatest, the conversion table LUTB for which luminance differences for the grayscale differences are intermediate is selected (S16). If the greatest, then if there does not exist input grayscale data for another color with the same input grayscale (S18), the table LUTC with greatest luminance difference is selected (S20), and if such input grayscale data exists, the conversion table LUTB for which luminance differences are intermediate is selected (S16). Similarly in the case of the smallest, if there does not exist input grayscale data for a color with the same input grayscale (S22), the conversion table LUTA with the smallest luminance difference is selected (S24), and if such input grayscale data exists, the conversion table LUTB for which luminance differences are intermediate is selected (S16).

The grayscale conversion circuit 30 selects conversion tables for each color according to this algorithm, and converts the input grayscale signal into an output grayscale signal based on the selected conversion table. Hence in an image viewed obliquely, a color image can be formed having luminance differences corresponding to the input grayscale differences.

Fifth Embodiment

The first through the fourth embodiments concern a vertical-alignment (VA) type liquid crystal display device in which each pixel comprises a plurality of subpixel electrodes, each subpixel electrode is directly driven through a data bus line and switching element, the input image signal is converted into first and second output grayscale values using a conversion table, and the subpixel electrodes are driven by first and second driving signals corresponding to the first and second output grayscale values. By this means, the image quality of an image viewed from a direction obliquely above the panel is improved, and viewing-angle characteristics are improved.

However, when a pixel is divided into subpixel electrodes, there is a need to separate the subpixel electrodes. In order to prevent reductions in the aperture ratio, it is preferable that subpixel electrodes be positioned with a slit intervening, such that the gap between subpixel electrodes is made as narrow as possible. As explained in FIG. 4, such slits have the alignment regulation function of a vertical-alignment type device, and contribute to the realization of a multi-domain vertical alignment (MVA) type liquid crystal display panel. However, the slits between subpixel electrodes must be of a predetermined size in order to provide alignment regulation functions; ordinarily approximately three times the thickness of the liquid crystal layer of a pixel is necessary. Hence in an MVA type liquid crystal display panel, if subpixel electrodes are divided by slits in an attempt to improve the viewing angle characteristics, a decrease in aperture ratio may result.

Hence in a fifth embodiment, driving voltages of opposite polarities are applied to adjacent subpixel electrodes separated by slits, so that even if the slit width is reduced, an adequate alignment regulation function is obtained.

FIG. 44 explains the slits between subpixel electrodes in the fifth embodiment. FIG. 44A is a cross-sectional view of an MVA type liquid crystal display panel; first and second subpixel electrodes SPX1, SPX2 are provided, with slits intervening, on substrate 1, and a common electrode COM is provided on substrate 2. The slit length SL is set to approximately three times the thickness of the pixel liquid crystal layer 4. If a driving voltage of the same polarity is applied to the first and second subpixel electrodes SPX1, SPX2 across the common electrode COM, the electric field is applied to the liquid crystal layer 4, as indicated by the arrows. By making the slit length SL sufficiently long, the electric field direction above the slit is strongly inclined in horizontal directions, on either side of the liquid crystal molecules LCX at the center of the slit, and an electric field in an oblique direction is applied to the liquid crystal molecules on the left and right sides which are vertically aligned, so that the liquid crystal molecules on the right side of the central liquid crystal molecules LCX are aligned in the rightward direction and the liquid crystal molecules on the left side are aligned toward the left. The liquid crystal molecules LCX at the slit center is strongly aligned in the vertical direction.

Figure 44A:
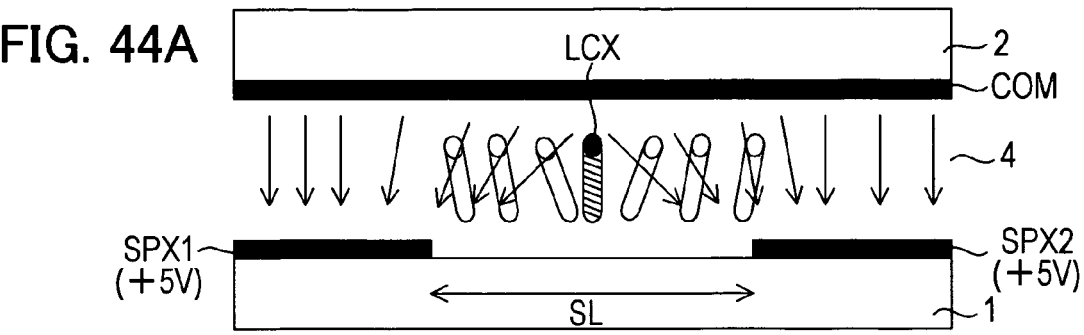
FIG. 44 explains the slits between subpixel electrodes in a fifth embodiment.
Figure 44B:
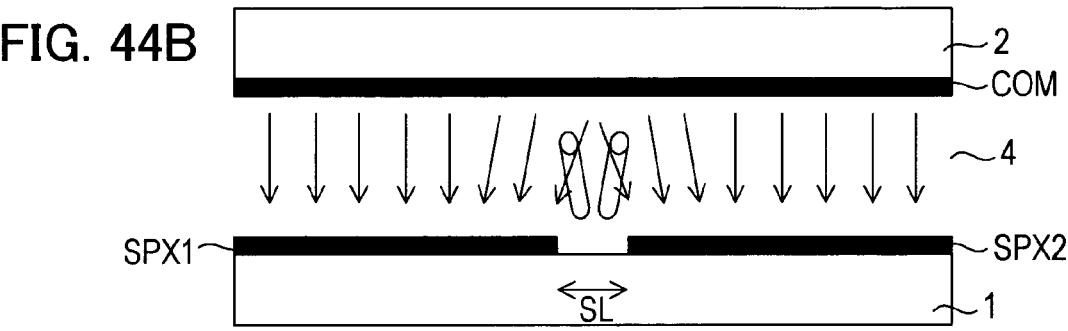
Figure 44C:
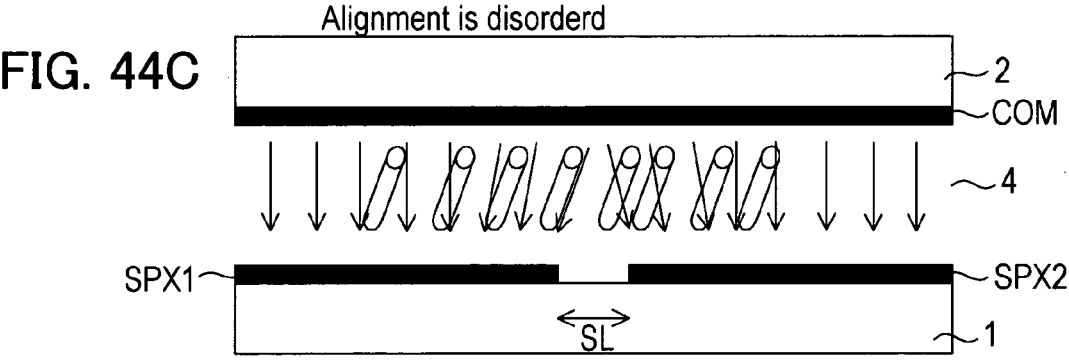

However, if the slit length SL is made narrow, as shown in FIG. 44B, then the inclination of the electric field above the slit is reduced, the electric field in the vertical direction is weakened in the vicinity of the slit center, and there is the possibility that liquid crystal molecules LCX which are regulated in the vertical direction, as in FIG. 44A, will no longer exist. Hence the alignment regulation effect of the slit is weakened. If, in consequence, the alignment of liquid crystal molecules once becomes disordered due to the application of pressure to the liquid crystal layer 4 or for other reasons, because of the weakened alignment regulation effect of the slit, the liquid crystal molecules cannot be restored to the original alignment direction, and unevenness appears in the transmittance.

Figure 44D:
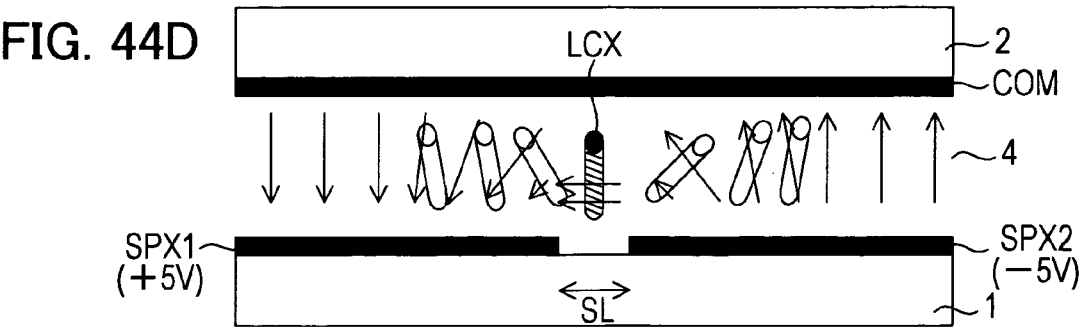

Hence in the fifth embodiment, as shown in FIG. 44D, driving voltages of opposite polarities are applied to the subpixel electrodes SPX1, SPX2 relative to the common electrode COM. In the example shown, the common electrode COM is at 0 V, +5 V is applied to the subpixel electrode SPX1, and −5 V is applied to the subpixel electrode SPX2. By thus applying driving voltages of opposite polarities, the electric field direction in the liquid crystal layer 4 above the slit is in the horizontal direction perpendicular to the thickness direction of the liquid crystal layer 4, and due to the electric field in this horizontal direction the liquid crystal molecules LCX in the center of the slit are strongly regulated in the vertical (perpendicular) direction. On either side of this liquid crystal molecule LCX, the liquid crystal molecules on the left and right sides are strongly regulated so as to be aligned inclining to the left or right, so that the alignment regulation function can be strengthened. Through this application of opposite polarities, while providing the slit between subpixel electrodes with a strong alignment regulation capability, the slit length SL can be reduced. Consequently the slits between the plurality of subpixel electrodes within pixels can be narrowed, and so reductions in the aperture ratio can be alleviated.

Figure 45:
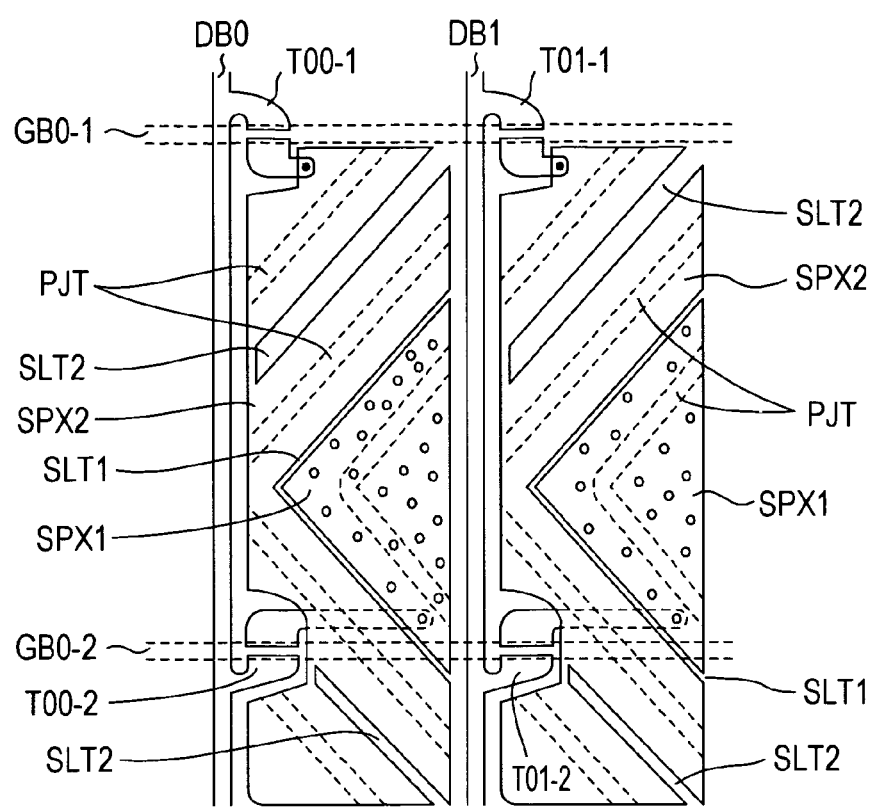
FIG. 45 shows the configuration of subpixel electrodes in the fifth embodiment.

FIG. 45 shows the construction of subpixel electrodes in the fifth embodiment. Two pixels are shown in FIG. 45; in this example, the configuration is similar to those shown in FIG. 17 and in FIGS. 22A and 22B. That is, each pixel comprises two subpixel electrodes SPX1, SPX2, and common data bus lines DB0, DB1 are provided for the two subpixel electrodes SPX1, SPX2 of each pixel. Gate bus lines GB0-1, GB0-2 and switching elements T00-1, T00-2, T01-1, T01-2 are provided for the two subpixel electrodes SPX2, SPX1 of each pixel.

Figure 3:
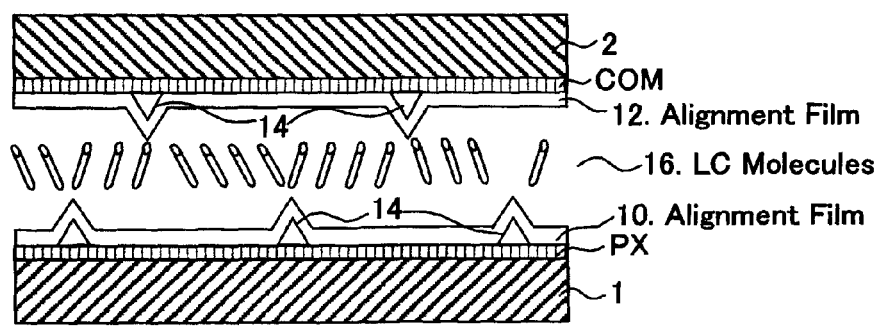
FIG. 3 is a cross-sectional view which explains the vertical alignment of liquid crystal molecules between pixel electrodes and a common electrode in an MVA type device.
Figure 4:
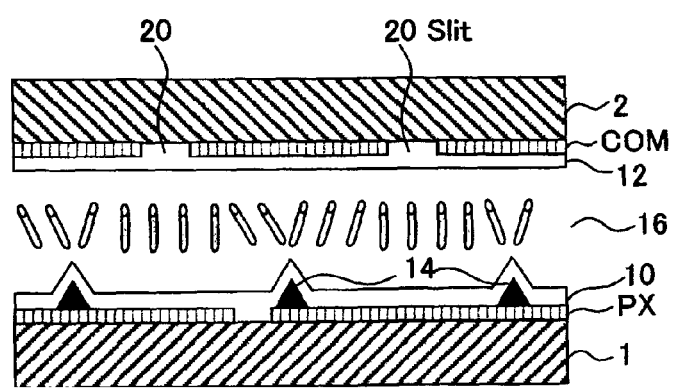
FIG. 4 is a cross-sectional view which explains the vertical alignment of liquid crystal molecules between pixel electrodes and a common electrode in another MVA type device.
Figure 5:
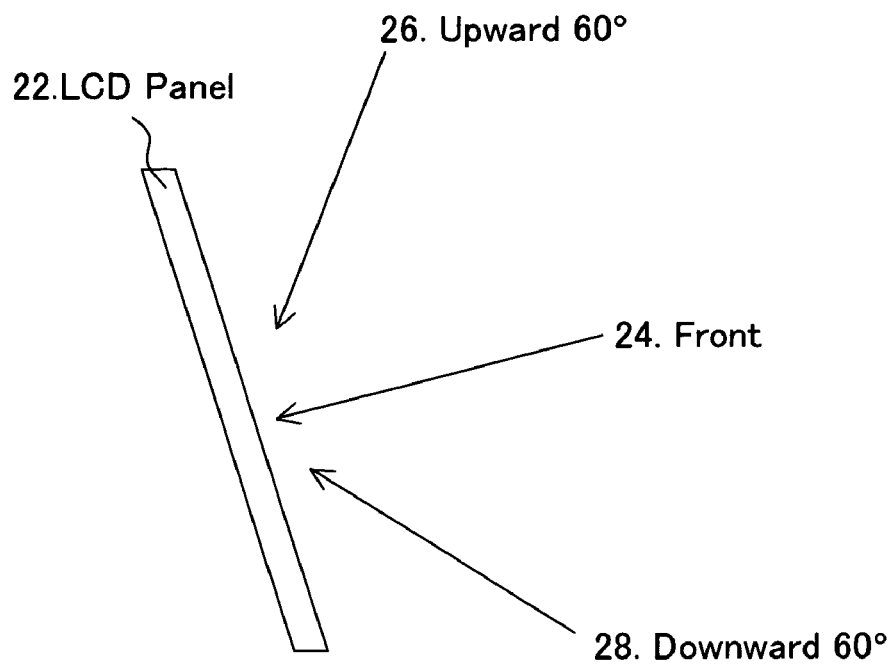
FIG. 5 shows the front direction and the upward-60° direction relative to a display panel.
Figure 6:
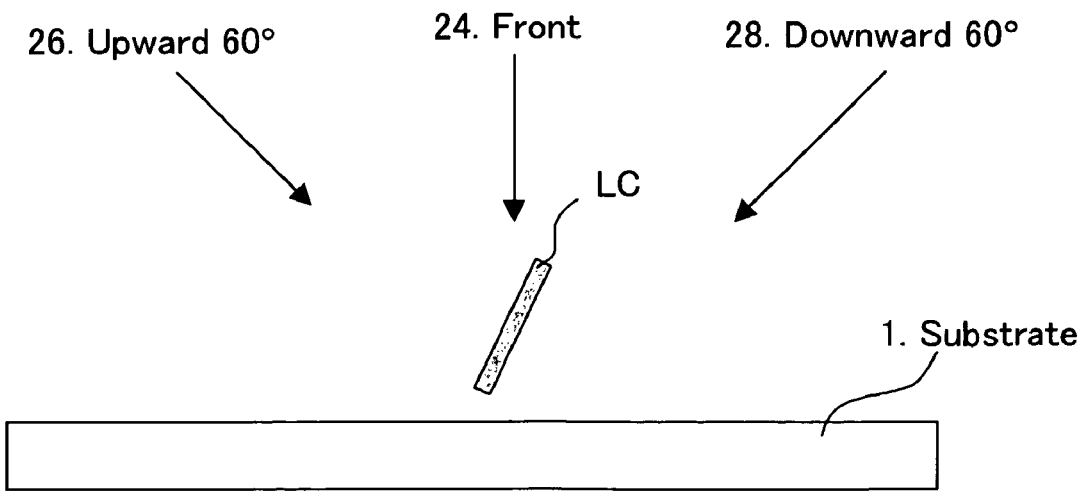
FIG. 6 shows the relation between liquid crystal molecules and the direction of observation.

In the example of FIG. 45, the area of the first subpixel electrode SPX1 is smaller than that of the second subpixel electrode SPX2, and the two subpixel electrodes are positioned with a first slit SLT1 intervening. Further, a second slit SLT2, wider than the slit width of the first slit SLT1, is formed in the second subpixel electrode SPX2. And, projections PJT as shown in FIG. 3 and FIG. 4 are formed on the first and second subpixel electrodes SPX1, SPX2, as indicated by the broken lines in the figure. These first and second slits SLT1, SLT2 and projections PJT are alignment regulation structure to regulate the alignment direction of liquid crystal molecules, and have an angle of approximately 45° with respect to the horizontal direction and the vertical (perpendicular) direction. By this means, liquid crystal molecule alignment is regulated in opposite directions on either side of the alignment regulation structure, and the alignment of liquid crystal molecules within a pixel is regulated in a plurality of directions.

Though not shown in the figure, polarizing plates with polarization axes intersecting at 90° are provided on both the substrates 1 and 2. When the driving voltage is zero and the liquid crystal molecules are aligned in the vertical direction, transmitted light of all polarization directions is blocked by the two polarizing plates, and black is displayed. On the other hand, when a driving voltage is applied and the liquid crystal molecules are inclined in an oblique direction, the polarization direction of transmitted light is rotated 90°, transmitted light passes through both polarizing plates, and white is displayed. Hence the direction of slits serving as alignment regulation structure must intersect at an angle of 45°, which is approximately half the angle of 90° of intersection of the polarization axes of the two polarizing plates.

Driving voltages of opposite polarities with respect to the potential of the common electrode, not shown, are applied to the first and second subpixel electrodes SPX1, SPX2. This is, in other words, as shown in FIG. 44. By this means, the slit width of the first slit SLT1 between the two subpixel electrodes can be made narrow. On the other hand, the same driving voltage is applied to the second subpixel electrode SPX2, so that the slit width of the second slit SLT2 used for alignment regulation and provided in the second subpixel electrode SPX2 is made wider, so as to have adequate alignment regulation functionality. As in the first through fourth embodiments, when applying different driving voltages to the two subpixel electrodes, the absolute values of the driving voltages are made different, and in addition the polarities are made to be opposite. Of course depending on the input grayscale value, a driving voltage may be applied to only one of the subpixel electrodes, but in this case the other subpixel electrode is held at the same potential as the common electrode, and the polarity is not opposite. That is, when simultaneously applying driving voltages to the two subpixel electrodes, the data bus driving circuit is controlled such that the polarities of the driving voltages are opposite.

Figure 46:
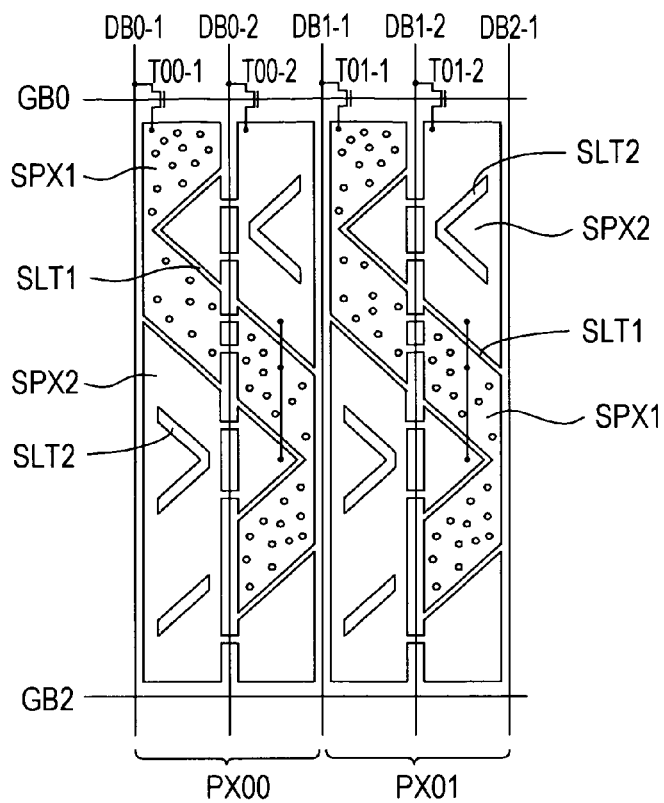
FIG. 46 shows another configuration of subpixel electrodes in the fifth embodiment.

FIG. 46 shows another configuration of subpixel electrodes in the fifth embodiment. In FIG. 46, two pixels PX00, PX01 are shown; in this example, the configuration resembles those shown in FIG. 10 and FIG. 14. That is, each of the pixels PX00, PX01 comprises two subpixel electrodes SPX1, SPX2, and a common gate bus line GB0 is provided for the two subpixel electrodes SPX1, SPX2 of each of the pixels; in addition, data bus lines DB0-1, DB0-2, DB1-1, DB1-2, and switching elements T00-1, T00-2, T01-1, T01-2 are respectively provided for the two subpixel electrodes SPX2, SPX1 of each pixel.

The area of the first subpixel electrode SPX1 in each electrode is smaller than that of the second subpixel electrode SPX2. Also, a first slit SLT1 with a narrow slit width is formed, as alignment regulation structure, between the first and second subpixel electrodes, and driving voltages of opposite polarity relative to the potential of a common electrode, not shown, are applied to the first and second subpixel electrodes SPX1, SPX2. Also, a second slit SLT2 of broad slit width is formed as alignment regulation structure in the second subpixel electrode SPX2. This second slit SLT2 is wider than the slit width of the first slit SLT1. And, although not shown, projections are formed as alignment regulation structure, parallel to the slits SLT1, SLT2. That is, the example of FIG. 46 is also a multi-domain vertical-alignment (MVA) type liquid crystal display device.

Figure 47:
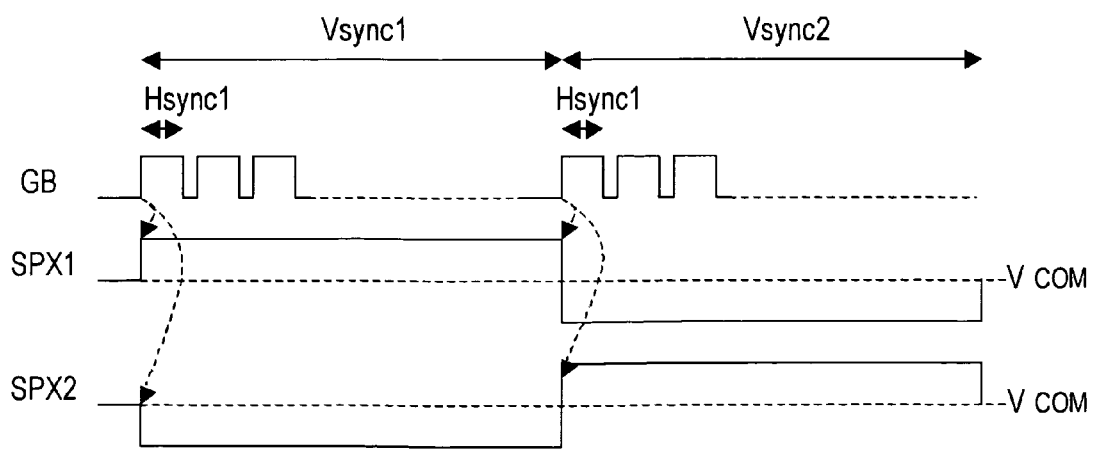
FIG. 47 shows a driving signal waveform in the fifth embodiment.

FIG. 47 and FIG. 48 show driving signal waveforms in the fifth embodiment. Both are examples of cases in which a comparatively high luminance is generated in a pixel; a comparatively high driving voltage is applied to both the first and second subpixel electrodes. FIG. 47 shows the driving signal waveform for FIG. 46. That is, the driving signal applied to the gate bus GB is at H level during the horizontal sync period Hsync, and in synchronization with this, the driving signals applied to the first and second subpixel electrodes SPX1 and SPX2 are given opposite polarities relative to the common voltage VCOM of the common electrode. In order to employ a frame-inverted driving method, the driving signals applied to the first and second subpixel electrodes SPX1, SPX2 are inverted in the vertical sync periods sync1 and sync2. During the vertical sync period Vsync1, Vsync2, the application of driving signals of opposite polarity to the first and second subpixel electrodes is maintained. In this way, driving voltages of opposite polarity are applied to the first and second subpixel electrodes, so that an electric field such as shown in FIG. 44D is applied across the slit between the electrodes, and so even if the slit width is narrow, the alignment regulation function can be strengthened.

FIG. 48 shows a driving signal waveform for the case of driving the first and second subpixel electrodes by time division in FIG. 45. A driving signal is applied to the first subpixel electrode SPX1 in synchronization with the first horizontal sync period Hsync1, after which a driving signal is applied to the second subpixel electrode SPX2 in synchronization with the second horizontal sync period Hsync2. That is, driving voltages of opposite polarity are applied to the first and second subpixel electrodes by time division, during the different time periods of the first and second horizontal sync periods Hsync1, Hsync2. And, the driving voltages of opposite polarity applied to the first and second subpixel electrodes are maintained during the vertical sync periods Vsync1,2. Hence in this case also, driving voltages of opposite polarity are applied to the first and second subpixel electrodes during substantially the entire interval of the long horizontal sync period, so that even if slit widths are narrow, a strong alignment regulation function can be maintained.

Sixth Embodiment

Figure 50:
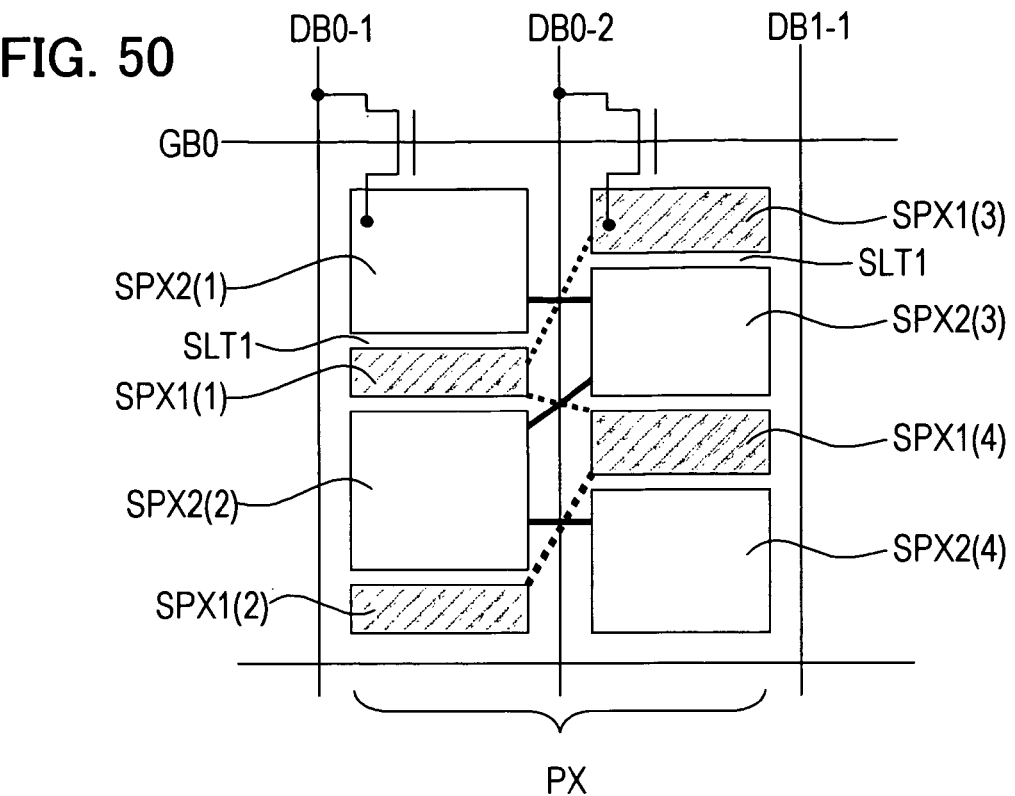
FIG. 50 shows the configuration of subpixel electrodes in the sixth embodiment.

FIG. 49 and FIG. 50 show configurations of subpixel electrodes in a sixth embodiment. In the first through fourth embodiments, each pixel is divided into a plurality of subpixel electrodes, and first and second driving voltages are applied to the first and second subpixel electrodes. Together with this, a driving voltage is applied only to one of the subpixel electrodes in specific halftone ranges, such as for example where the image signal input grayscales are low, so that in some cases the transmittance and therefore luminance are high only in the liquid crystal layer corresponding to one of the subpixel electrodes, while at the other subpixel electrode the luminance was zero (with black displayed). On the other hand, as the sizes of liquid crystal display panels increase, pixel region areas are also tending to grow in size, and subpixel electrode areas are also increasing. In such cases, when in the above-described halftone regions only one of the subpixel electrodes enters a high-luminance state, even for example a flesh color or other halftone is displayed, the high-luminance subpixel electrode becomes prominent among the subpixel electrodes displaying black, so that the halftone image quality appears rough and there is the problem of worsened "graininess". Hence in the sixth embodiment, the first and second subpixel electrodes are both divided into a plurality of electrodes, and the divided subpixel electrodes are distributed within the pixel region.

According to the subpixel electrode structure shown in FIG. 49, the first subpixel electrode SPX1 is divided into two (SPX1(1), SPX1(2)), and the second subpixel electrode SPX2 is also divided into two (SPX2(1), SPX2(2)); these divided subpixel electrodes are distributed and positioned on diagonals in the pixel region PX. By this means, even if the first subpixel electrode SPX1 along is in a high-luminance state, this is distributed within the pixel PX, so that worsening "graininess" due to the larger size of the pixel PX can be prevented. Because subpixel electrodes are positioned on diagonals, the same subpixel electrodes are connected across the data bus line DB0-2, and overlap the data bus line DB0-2 at the connection portions indicated by solid and broken lines.

According to the subpixel electrode structure shown in FIG. 50, the first and second subpixel electrodes SPX1, SPX2 are each divided into four electrodes. Each of the divided subpixel electrodes are distributed and positioned at lateral distances in the pixel PX. In this case also, the subpixel electrodes are distributed and positioned at lateral distances, so that electrodes of the same subpixel electrodes are connected over the data bus line DB0-2, and the connection portions indicated by solid and broken lines overlap with the data bus line DB0-2. In this example, the subpixel electrode is finely divided and the electrodes are distributed, so that when displaying halftones, even if only the first subpixel electrode is at high luminance, "graininess" is suppressed.

In the examples of arrangement of subpixel electrodes in FIG. 49 and FIG. 50, the first and second subpixel electrodes are adjacent to the data bus lines DB0-1, DB0-2 with the same area therebetween. The reason for this is as follows.

Figure 51:
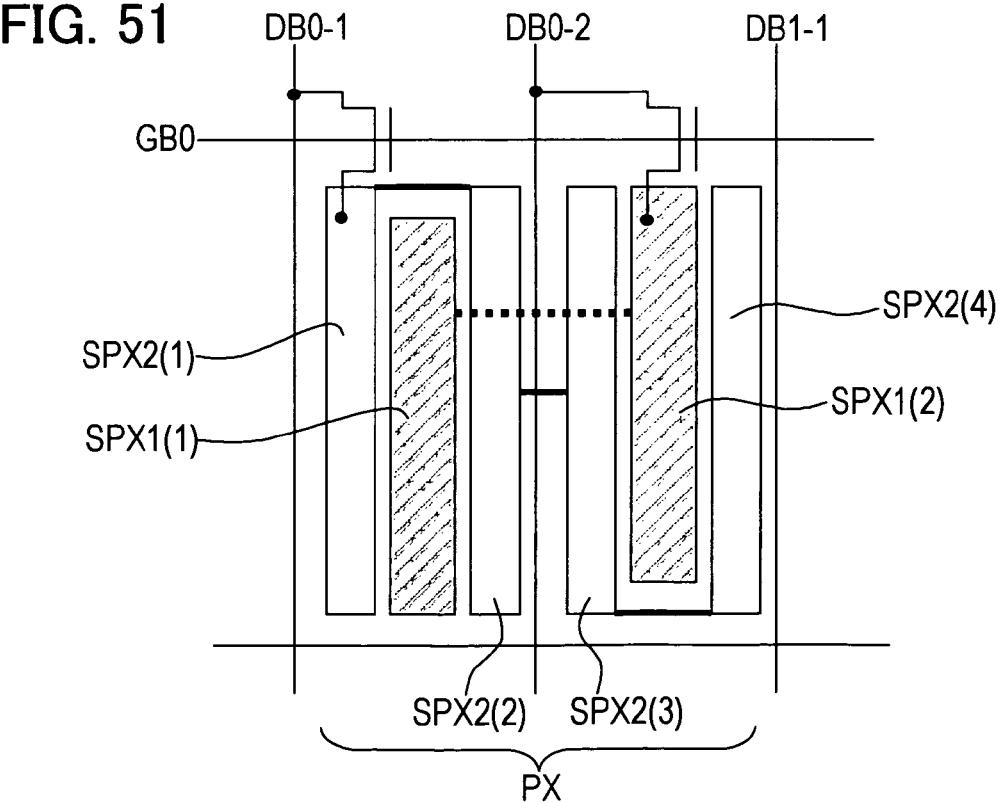
FIG. 51 shows another configuration of subpixel electrodes in the sixth embodiment.
Figure 52:
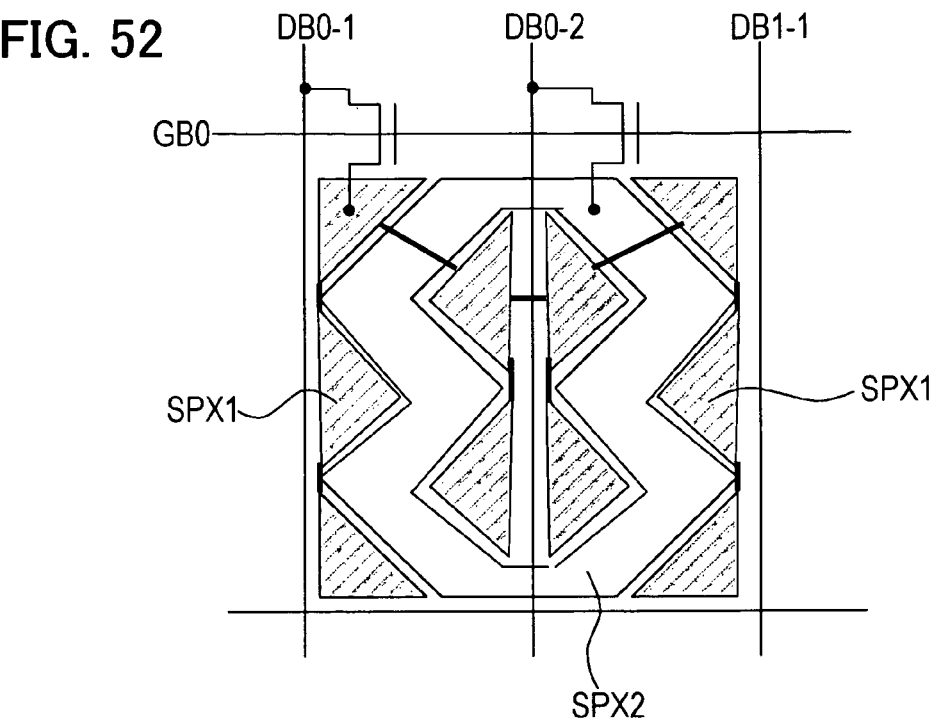
FIG. 52 shows another configuration of subpixel electrodes in the sixth embodiment.

FIG. 51 and FIG. 52 show another configuration of subpixel electrodes in the sixth embodiment. In the example of FIG. 51, the first subpixel electrode SPX1 is divided in two, the second subpixel electrode SPX2 is divided in four, the first subpixel electrode SPX1(1) is enclosed between the second subpixel electrodes SPX2(1), SPX2(2) between the data bus lines DB0-1, DB0-2, and the first subpixel electrode SPX1(2) is enclosed between the second subpixel electrodes SPX2(3), SPX2(4) between the data bus lines DB0-2, DB1-1. That is, in this example also the divided subpixel electrodes are distributed and arranged within the pixel PX, but the first subpixel electrode is positioned without being adjacent to data bus lines, while the second subpixel electrode is positioned adjacent to data bus lines.

In the example of FIG. 52, the positional relationship of the first and second subpixel electrodes SPX1, SPX2 adjacent to the data bus lines DB is opposite that in FIG. 51. That is, the second subpixel electrode SPX2 is positioned enclosed within the first subpixel electrode SPX1 between the data bus lines DB0-1, DB0-2, and similarly, the second subpixel electrode SPX2 is enclosed within the first subpixel electrode SPX1 between the data bus lines DB0-2, DB1-1. However, the divided subpixel electrodes are distributed and positioned within the pixel. In FIG. 51 and FIG. 52 also, the first subpixel electrode is distributed with the data bus line DB0-2 intervening, and the connection portion connecting the electrodes overlaps with data bus lines.

In the subpixel electrode configuration examples of FIG. 49 through FIG. 52, in order to suppress crosstalk in the (in-plane) vertical direction of the liquid crystal display panel, the parasitic capacitances Cds1, Cds2 between the subpixel electrodes and the data bus lines are made equal, or the parasitic capacitance Cds of the first subpixel electrode with the data bus lines compared with the parasitic capacitance Cds of the second subpixel electrode with the data bus lines is made extremely small.

Referring to the equivalent circuit diagram showing the parasitic capacitances within a pixel in FIG. 14B, drain-source parasitic capacitances Cds1, Cds2 exist between the subpixel electrodes SPX1, SPX2 and the data bus lines DB0-1, DB0-2. The data bus potential normally changes according to the displayed image, and the subpixel electrodes are affected through the source-drain parasitic capacitances Cds1, Cds2. For example, when an image is displayed at low luminance overall, but a square of high luminance is displayed in the center, in the low-luminance regions above and below the high-luminance square, the data bus voltage is effected through the drain-source parasitic capacitances Cds1, Cds2 during the interval of writing to the high-luminance square region. As a result a somewhat higher driving voltage is applied in the low-luminance regions above and below the high-luminance square, so that the low-luminance image changes to a higher luminance. This is vertical-direction crosstalk.

Hence in the fifth embodiment, driving voltages of opposite polarity are applied to the first and second data bus lines corresponding to the subpixel electrodes. If polarity is opposite, the above coupling effects are cancelled, and therefore, by balancing the parasitic capacitances between the subpixel electrodes and the pair of data bus lines, or by reducing the parasitic capacitance to zero, the above-described vertical-direction crosstalk can be eliminated.

In the embodiment shown in FIG. 49 and FIG. 50, the divided subpixel electrodes are positioned such that the parasitic capacitances Cds1, Cds2 between the subpixel electrodes and the data bus lines are balanced, that is, are substantially equal. In the example of FIG. 49, the first subpixel electrode SPX1(1) is adjacent to the data bus lines DB0-1, DB0-2 with the same area. Similarly, the second subpixel electrode SPX2(1) is also adjacent to the data bus lines DB0-1, DB0-2 with the same area. The remaining subpixel electrodes are positioned similarly. In the example of FIG. 50, each of the subpixel electrodes is adjacent to a pair of data bus lines with the same area. By this means, the effect of coupling with the subpixel electrodes through the parasitic capacitances with the pair of data bus lines to which voltages of opposite polarity are applied can be canceled, so that vertical-direction crosstalk can be suppressed.

In the example of FIG. 46, subpixel electrodes divided similarly to the above-described example of FIG. 49 and FIG. 50 are positioned. In a pixel PX00, the subpixel electrode SPX1 on the left side is positioned adjacent to the data bus lines DB0-1, DB0-2 with the same area intervening; similarly, the subpixel electrode SPX1 on the right side is positioned adjacent to the data bus lines DB0-2, DB1-1 with the same area intervening. Together with this, the second subpixel electrode SPX2 is similarly positioned adjacent to a data bus line pair.

On the other hand, in the embodiment shown in FIG. 51, the first subpixel electrode SPX1 is positioned at a distance from data bus lines, so that the parasitic capacitances Cds1, Cds2 are extremely small, and the problem of vertical-direction crosstalk is minimal. The second subpixel electrode SPX2 is positioned adjacent to the data bus lines on both sides with the same area intervening, so that vertical-direction crosstalk is suppressed. In the example of FIG. 52, the parasitic capacitances Cds1, Cds2 with the second subpixel electrode are made small, and the parasitic capacitances Cds1, Cds2 with the first subpixel electrode SPX1 are balanced.

In the above embodiments, a pixel comprises a plurality of subpixel electrodes, and subpixel electrodes are further divided and positioned. A color filter layer with different colors for these divided subpixel electrodes can be provided. By thus providing a color filter layer with different colors for the subdivided subpixel electrodes, the colors of the color filter are distributed, so that the effective sizes of RGB pixels are reduced, and a more finely detailed image with enhanced quality can be provided.

In general, a black matrix film is provided in the regions between different colors of the color filter. However, in the above-described embodiments, liquid crystal molecules LCX which are strongly aligned in the vertical (perpendicular) direction appear in the first slit region between subpixel electrodes in a pixel, and are controlled so as to be opaque (black is displayed). Hence there is no need to provide a black stripe film over the regions of first slits between subpixel electrodes.

Seventh Embodiment

Figure 53:
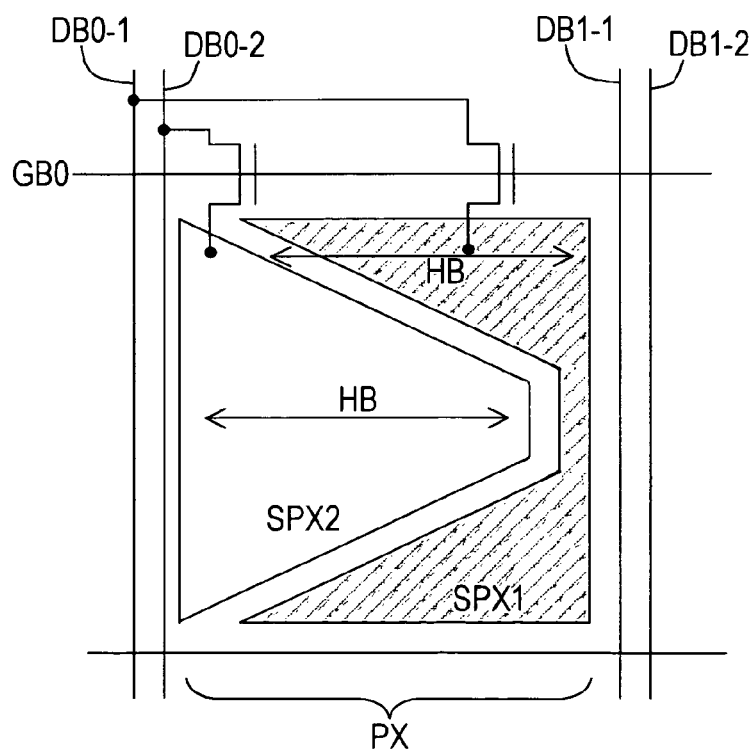
FIG. 53 shows the configuration of subpixel electrodes in a seventh embodiment; and, FIG. 54 shows the configuration of subpixel electrodes in the seventh embodiment.
Figure 54:
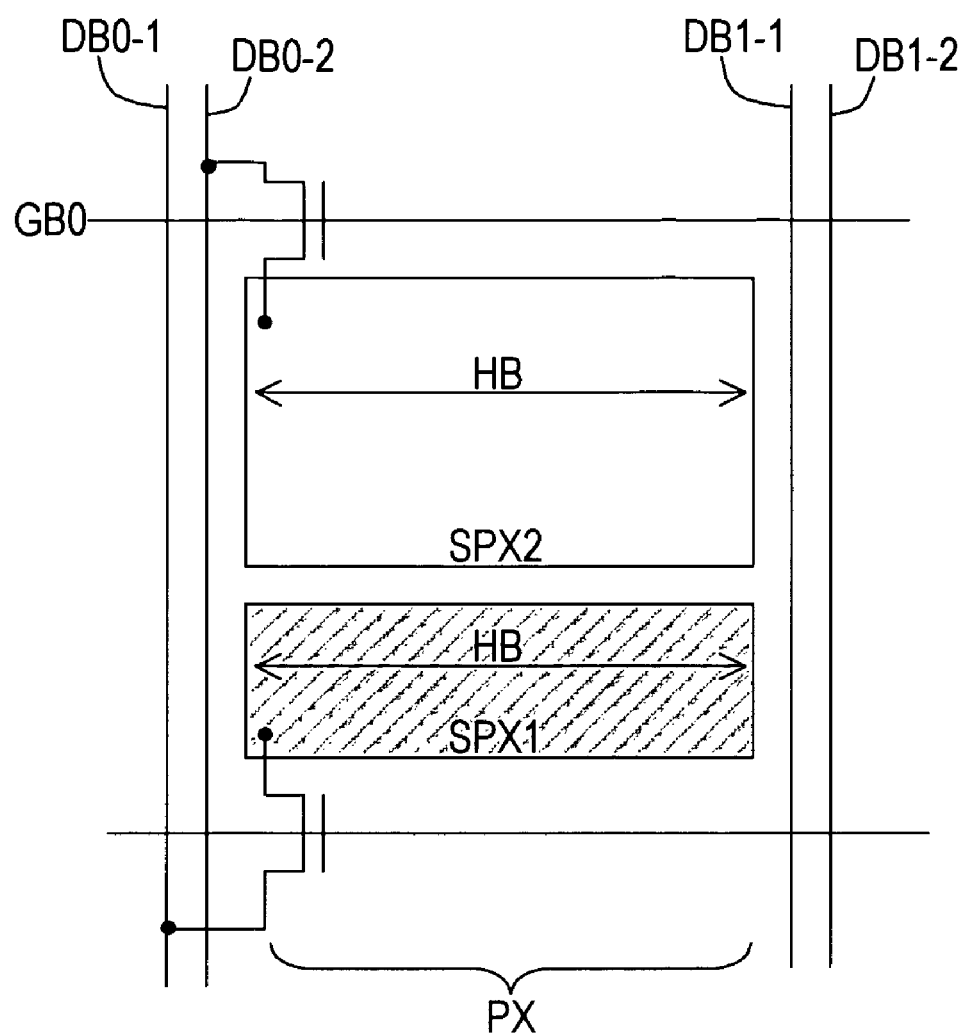

FIG. 53 and FIG. 54 show the configuration of subpixel electrodes in a seventh embodiment. In the subpixel electrode configuration examples of FIG. 49 through FIG. 52, the data bus line DB0-2 is positioned within the pixel region PX, and the subpixel electrode is divided by this data bus line. In contrast, in the subpixel electrode examples of FIG. 53 and FIG. 54, pairs of data bus lines DB0-1, DB0-2 and DB1-1, DB1-2 are positioned on either side of the pixel region PX, and no data bus lines are provided within the pixel region. By using this layout, subpixel electrodes can provide a high-transmittance region in a sufficiently large region HB. That is, by applying prescribed driving voltages to subpixel electrodes, the liquid crystal molecules are aligned and transmittance is increased. However, because appropriate alignment regulation structure cannot be provided at the edges of subpixel electrodes and for other reasons, it may not be possible to obtain a high transmittance at the edges. Hence if the data bus lines are positioned within the pixel region as in FIG. 49 through FIG. 52, the subpixel electrodes are thereby divided, and the low-transmittance regions at either edge are expanded.

If however data bus lines are positioned at both edges of the pixel region PX as in FIG. 53 and FIG. 54, subpixel electrodes can be positioned across the entire lateral extent of the pixel region PX. Consequently the subpixel electrodes are not divided by data bus lines, the low-transmittance regions at either edge can be reduced, and the high-transmittance region HB can be broadened. This makes possible the display of brighter images.

In the example of FIG. 53, even if the first and second subpixel electrodes SPX1 and SPX2 are combined, there are only two edges for each subpixel electrode within the pixel region. In this example, the first slit between the subpixel electrodes has an alignment regulation function, and so the first slit portion controls the high-luminance region. Similarly in the example of FIG. 54, the subpixel electrodes are formed over the entire lateral extent of the pixel region, so that there are only two edges for the first and second subpixel electrodes SPX1, SPX2. Consequently the high-luminance region HB can be made more broad.

What is claimed is:
1. A liquid crystal display device, having a liquid crystal layer provided between a pair of substrates and in which liquid crystal molecules in the liquid crystal layer are aligned substantially perpendicularly in a state in which no voltage is applied, and said liquid crystal display device further comprising:
   a plurality of pixels, arranged in a matrix on one of said substrates, and each having a plurality of subpixel electrodes;
   a plurality of switching elements, each connected to said plurality of subpixel electrodes;
   a plurality of data bus lines connected to said switching elements;
   a plurality of gate bus lines connected to said switching elements for controlling the respective switching elements;
   a data bus driving circuit, which generates a driving signal from an image signal and supplies the driving signal to said data bus lines to apply the driving signal to said subpixel electrodes via said switching elements; and,
   alignment regulation structures, provided between said substrates, for regulating direction of alignment of said liquid crystal molecules in a plurality of directions; and
   wherein, within each pixel, a first subpixel electrode, and a second subpixel electrode with area larger than the first subpixel electrode, are provided, said first subpixel electrode and said second subpixel electrode displaying one color;
   wherein said data bus driving circuit, while input grayscale values of the image signal for said pixel is in a first grayscale region which is low, applies to said first subpixel electrode a first driving signal which changes from low voltage to high voltage to cause luminance at the first subpixel electrode to change from low luminance to high luminance in accordance with the increase of grayscale values for input grayscale values of said image signal, and applies to said second subpixel electrode a second driving signal which changes from low voltage to high voltage to cause luminance at the second subpixel electrode to change from low luminance to high luminance in accordance with the increase of grayscale values for input grayscale values of said image signal, and which is lower voltage than the first driving signal to cause the luminance to be lower than said first driving signal; and,
   wherein said data bus driving circuit, while input grayscale values of said image signal is in a second grayscale region higher than said first grayscale region, applies to said second subpixel electrode a third driving signal which changes from low voltage to high to cause luminance at the second subpixel electrode to change from low luminance to high luminance in accordance with the increase of grayscale values for input grayscale value of said image signal, and applies to said first subpixel electrode a fourth driving signal which changes from low voltage to high voltage to cause luminance at the first subpixel electrode to change from low luminance to high luminance in accordance with the increase of grayscale values for input grayscale value of said image signal, and moreover which is lower voltage than the third driving signal to cause the luminance to be lower than said third driving signal, luminance of the second subpixel electrode remaining the same or gradually increasing over substantially the entire grayscale values.

2. The liquid crystal display device according to claim 1, wherein said data bus line has first and second data bus lines for one pixel, and said data bus driving circuit applies said first and second driving signals to said first and second subpixel electrodes via said first and second data bus lines.

3. The liquid crystal display device according to claim 1, wherein said data bus driving circuit applies by time division to said first and second subpixel electrodes said first and second driving signals via a common data bus line.

4. The liquid crystal display device according to any of claims 1 through 3, further comprising a grayscale conversion circuit which converts input grayscale values of said image signal into output grayscale values corresponding to said first and second driving signals, and wherein said data bus driving circuit applies said first and second driving signals to subpixel electrodes according to the output grayscale values.

5. The liquid crystal display device according to claim 1, wherein first and second pixels, adjacent in a direction of said data bus line, each have said first subpixel electrode, and the adjacent first and second pixels share a common second subpixel electrode; driving of said first pixel is performed by driving the first subpixel electrode of the first pixel and the shared second subpixel electrode; and driving of said second pixel is performed by driving said shared second subpixel electrode and the first subpixel electrode of the second pixel.

6. The liquid crystal display device according to claim 5, further comprising a grayscale conversion circuit which converts input grayscale values of the image signal for said first and second pixels into output grayscale values corresponding to a driving signal for the first subpixel electrode of said first pixel, a driving signal for said shared second subpixel electrode, and a driving signal for the first subpixel electrode of said second pixel; and wherein said data bus driving circuit applies said driving signals to subpixel electrodes according to the output grayscale values.

7. The liquid crystal display device according to claim 5, wherein said data bus driving circuit applies by time division said first and second driving signals to said first and second subpixel electrodes via a common data bus line.

8. The liquid crystal display device according to claim 1, wherein characteristics of said first and second driving signals with respect to the input grayscales of said image signal are set such that, when said first and second subpixel electrodes are driven by the driving signals, luminance characteristic of an image observed from a front direction of said substrates has a prescribed gamma characteristic.

9. The liquid crystal display device according to claim 1, further comprising a grayscale conversion circuit which, in said first grayscale region, converts the input gray scale values of said image signal into first and second output grayscale values corresponding to said first and second driving signals, and in said second grayscale region, converts the input grayscale values of said image signal into third and fourth output grayscale values corresponding to said third and fourth driving signals, and supplies said output grayscale values to said data bus driving circuit.

10. The liquid crystal display device according to claim 1, further comprising a grayscale conversion circuit which, in said first grayscale region, converts the input grayscale values of said image signal into first and second output grayscale values corresponding to said first and second driving signals, and in said second grayscale region, converts the input grayscale values of said image signal into third and fourth output grayscale values corresponding to said third and fourth driving signals, and supplies said output grayscale values to said data bus driving circuit; and wherein the grayscale conversion circuit has a first conversion mode, in which said first and second driving signals have a first difference for the same input grayscale value and said third and fourth driving signals have a second difference for the same input grayscale value, and a second conversion mode, in which said first and second driving signals have a third difference for the same input grayscale value which is smaller than said first difference and said third and fourth driving signals have a fourth difference for the same input grayscale value which is smaller than said second difference; and, the grayscale conversion circuit compares the input grayscale values of the image signals of a plurality of colors for each pixel, converts the input grayscale value of a first color having a first input grayscale value into said first through fourth output grayscale values in said first conversion mode, and converts the input grayscale value of a second color having a second input grayscale value higher than said first input grayscale value into said first through fourth output grayscale values in said second conversion mode.

11. The liquid crystal display device according to claim 10, wherein:

the number of said plurality of colors is at least three;

said grayscale conversion circuit further has a third conversion mode, in which said first and second driving signals have a fifth difference for the same input grayscale value which is smaller than the third difference, and moreover said third and fourth driving signals have a sixth difference for the same input grayscale value which is smaller than the fourth difference; and, the grayscale conversion circuit compares the input grayscale values of the image signals for said plurality of colors, converts the input grayscale value of a first color having a first input grayseale value into said first through fourth output grayscale values in said first conversion mode, converts the input grayseale value of a second color having a second input grayscale value higher than said first input grayscale value into said first through fourth output grayscale values in said second conversion mode, and converts the input grayscale value of a third color having a third input grayscale value higher than said second input grayscale value into said first through fourth output grayscale values in said third conversion mode.

12. The liquid crystal display device according to claim 1, wherein characteristics of said third and fourth driving signals with respect to the input grayscale values of said image signal are set such that a luminance characteristic of an image observed from a front direction of said substrate has a prescribed gamma characteristic when said first and second subpixel electrodes are driven by the driving signals.

13. The liquid crystal display device according to claim 1, wherein said pixels comprise first pixels, said first and second subpixel electrodes of which are in a first areal magnitude relationship, and second pixels, said first and second subpixel electrodes of which are in a second areal magnitude relationship different from said first areal magnitude relationship; and, the first and second pixels are positioned adjacently.

14. The liquid crystal display device according to claim 1, wherein characteristics of said first and second driving signals with respect to the input grayscales of said image signal, and characteristics of said third and fourth driving signals with respect to the input grayscales of said image signal, are both set such that, when said first and second subpixel electrodes are driven by the driving signals, a luminance characteristic of an image observed from a front direction of said substrates has a prescribed gamma characteristic.

* * * * *